US011552352B2

(12) United States Patent
Mulder et al.

(10) Patent No.: US 11,552,352 B2
(45) Date of Patent: Jan. 10, 2023

(54) HYBRID BATTERY AND ELECTROLYSER

(71) Applicant: Battolyser Holding B.V., Schiedam (NL)

(72) Inventors: Fokko Marten Mulder, AA Delft (NL); Bernhard Weninger, AA Delft (NL)

(73) Assignee: Battolyser Holding B.V., Schiedam (NL)

( * ) Notice: Subject to any disclaimer, the term of this patent is extended or adjusted under 35 U.S.C. 154(b) by 451 days.

(21) Appl. No.: 16/472,137

(22) PCT Filed: Dec. 22, 2017

(86) PCT No.: PCT/NL2017/050870
§ 371 (c)(1),
(2) Date: Jun. 20, 2019

(87) PCT Pub. No.: WO2018/117839
PCT Pub. Date: Jun. 28, 2018

(65) Prior Publication Data
US 2020/0028227 A1    Jan. 23, 2020

(30) Foreign Application Priority Data
Dec. 23, 2016  (NL) ........................ 2018056

(51) Int. Cl.
*C25B 1/10* (2006.01)
*C25B 9/18* (2006.01)
(Continued)

(52) U.S. Cl.
CPC .............. *H01M 16/00* (2013.01); *C25B 1/04* (2013.01); *C25B 9/70* (2021.01); *C25B 9/73* (2021.01);
(Continued)

(58) Field of Classification Search
CPC .......................................... H01M 2300/0014
See application file for complete search history.

(56) References Cited

U.S. PATENT DOCUMENTS

| 608,290 A | 8/1898 | Johnston | |
| 6,080,290 A * | 6/2000 | Stuart | ........................ C25B 9/73 |
| | | | 204/269 |

(Continued)

FOREIGN PATENT DOCUMENTS

| CA | 2590477 A1 | 11/2008 |
| CN | 101680778 A | 3/2010 |

(Continued)

OTHER PUBLICATIONS

CN 102610874 A—machine translation (Year: 2012).*

(Continued)

*Primary Examiner* — Haroon S. Sheikh
(74) *Attorney, Agent, or Firm* — Occhiuti & Rohlicek LLP

(57) ABSTRACT

The invention provides a method of storing varying or intermittent electrical energy and one or more of hydrogen ($H_2$) and oxygen ($O_2$) with an energy apparatus, the method comprising: providing the first cell aqueous liquid, the second cell aqueous liquid, and electrical power from an external power source to the functional unit thereby providing an electrically charged functional battery unit and one or more of hydrogen ($H_2$) and oxygen ($O_2$) stored in said storage system, wherein during at least part of a charging time the functional unit is charged at a potential difference between the first cell electrode and the second cell electrode of more than 1.37 V.

27 Claims, 30 Drawing Sheets

(51) Int. Cl.
  *H01M 10/30* (2006.01)
  *H01M 10/44* (2006.01)
  *H01M 16/00* (2006.01)
  *H01M 2/26* (2006.01)
  *H01M 2/36* (2006.01)
  *H01M 4/24* (2006.01)
  *C25B 1/04* (2021.01)
  *C25B 9/70* (2021.01)
  *C25B 9/73* (2021.01)
  *H01M 50/60* (2021.01)
  *H01M 50/531* (2021.01)

(52) U.S. Cl.
  CPC ............ *H01M 4/24* (2013.01); *H01M 10/30* (2013.01); *H01M 10/44* (2013.01); *H01M 50/531* (2021.01); *H01M 50/60* (2021.01)

(56) References Cited

U.S. PATENT DOCUMENTS

| | | |
|---|---|---|
| 2008/0296171 A1 | 12/2008 | Davidson |
| 2015/0069836 A1 | 3/2015 | Beekmann |
| 2017/0077555 A1 | 3/2017 | Hayashi et al. |

FOREIGN PATENT DOCUMENTS

| | | |
|---|---|---|
| CN | 102610874 A | 7/2012 |
| CN | 105849960 A | 8/2016 |
| JP | 2001507406 A | 6/2001 |
| JP | 2002141101 A | 5/2002 |
| JP | 2007100187 A | 4/2007 |
| JP | 2015151561 A | 8/2015 |
| WO | 9829912 A2 | 7/1998 |
| WO | 2015074637 A1 | 5/2015 |
| WO | 2016006349 | 1/2016 |
| WO | 2016006649 A1 | 1/2016 |
| WO | 2016176564 A1 | 11/2016 |
| WO | 2016178564 | 11/2016 |

OTHER PUBLICATIONS

Posada Jorge Omar Gil et al: "Aqueous batteries as grid scale energy storage solutions", Renewable and Sustainable Energy Reviews, vol. 68, Mar. 16, 2016 (Mar. 16, 2016), pp. 1174-1182.

F. M. Mulder et al:, "Efficient electricity storage with a battolyser, an integrated Ni—Fe battery and electrolyser" Energy & Environmental Science, vol. 10, No. 3, Dec. 14, 2016 (Dec. 14, 2016), pp. 756-764.

First Office Action dated Sep. 16, 2021 in CN Application No. 201780086570.9.

* cited by examiner

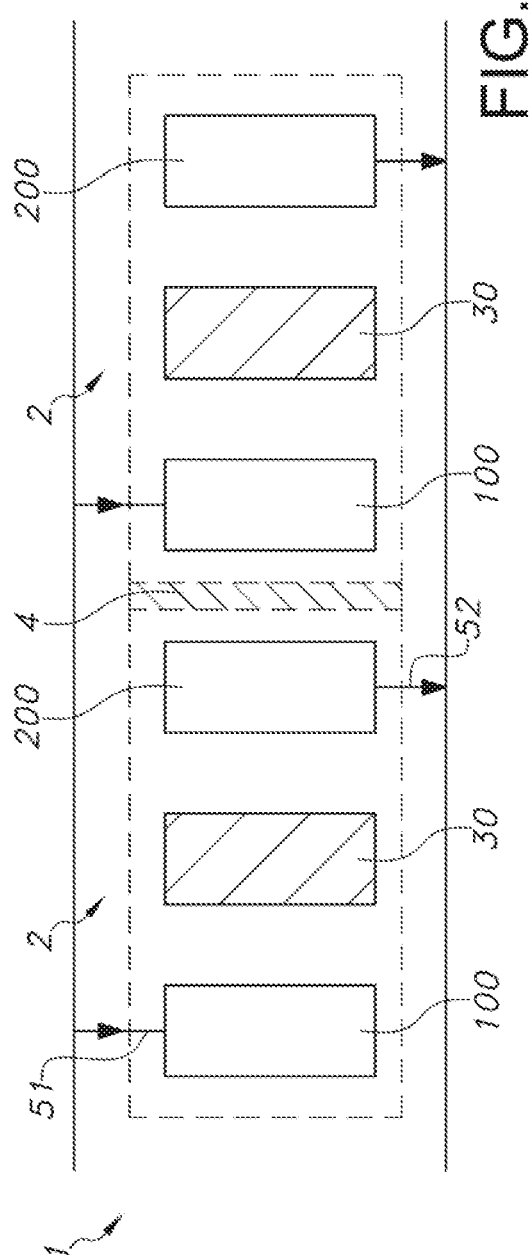
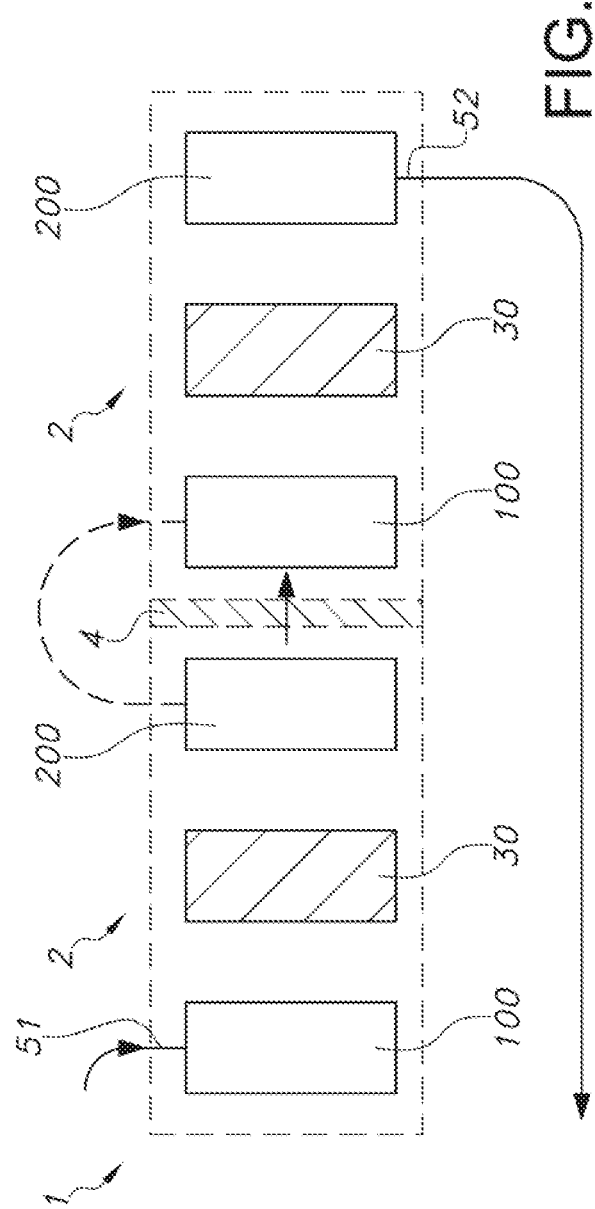
FIG. 1C
FIG. 1D

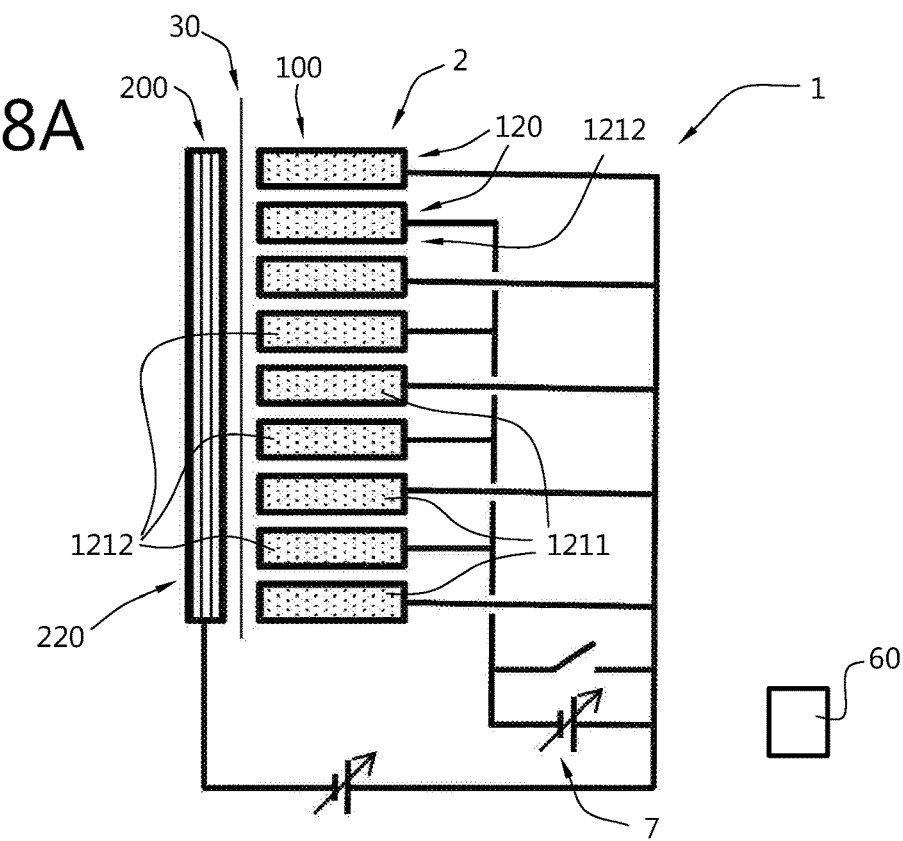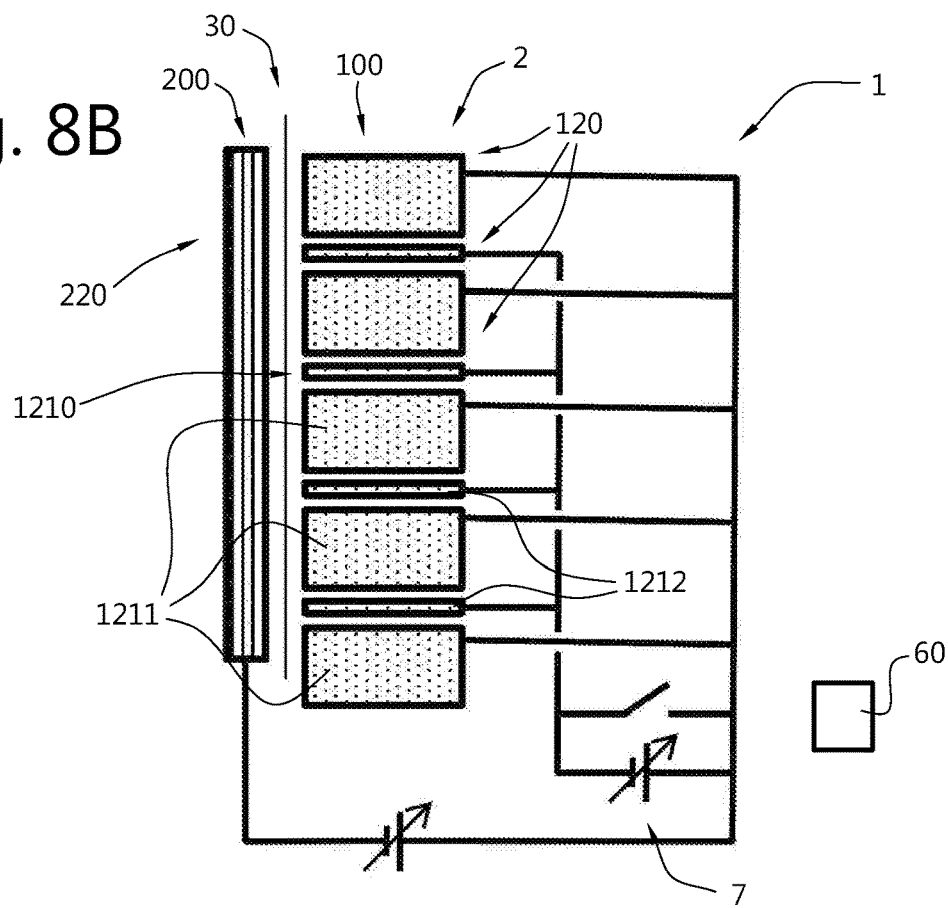

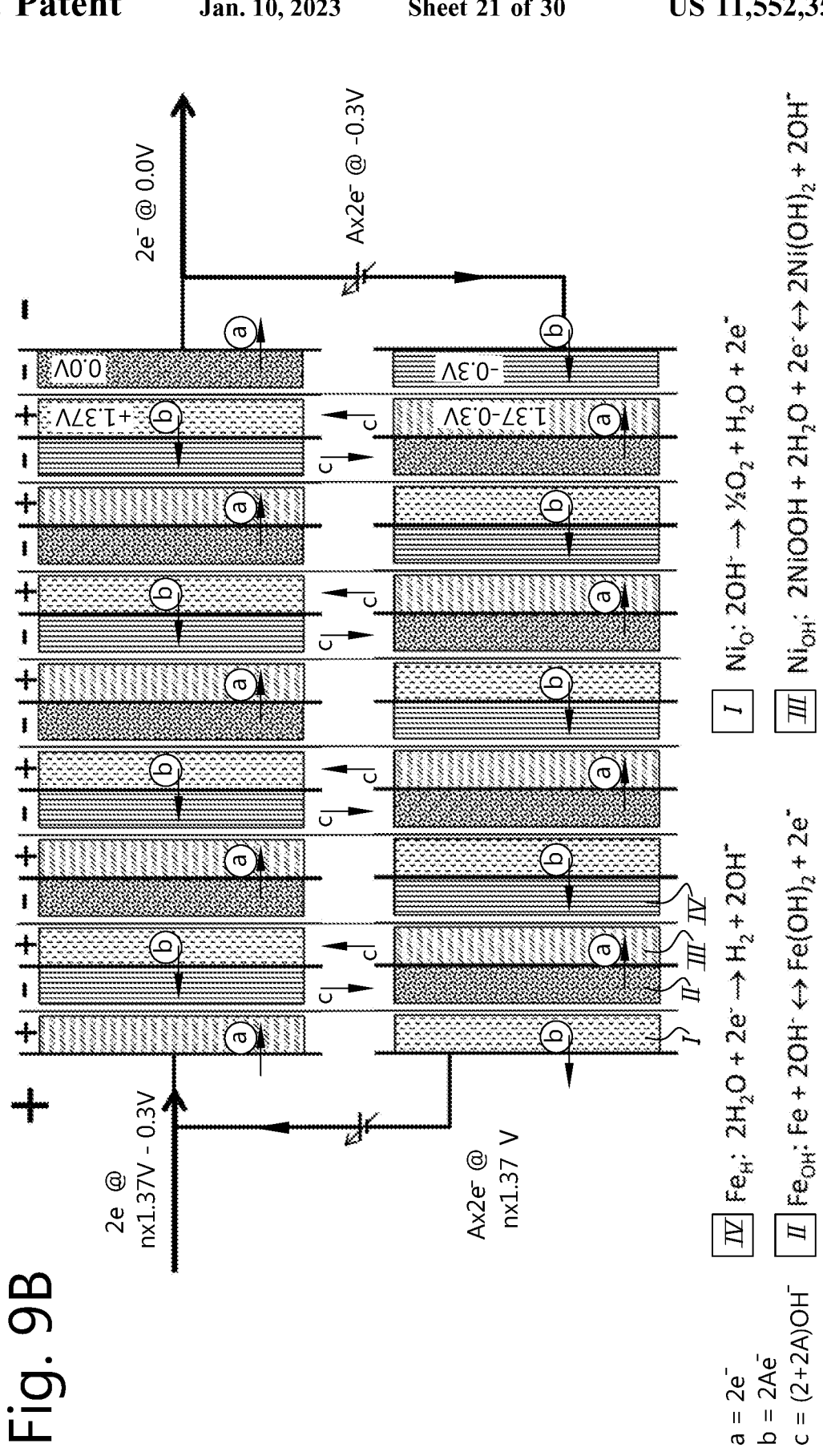

HYBRID BATTERY AND ELECTROLYSER

CROSS REFERENCE TO RELATED APPLICATIONS

This application is a National Phase under 35 U.S.C. 371 of International Application No. PCT/NL2017/050870 filed on Dec. 22, 2017, which claims priority to Dutch Application No. 2018056 filed Dec. 23, 2016, the contents of all of which are hereby incorporated by reference in their entireties.

FIELD OF THE INVENTION

The invention relates to an apparatus for providing electrical energy and/or an energy carrier (such as $H_2$). The invention also relates to an energy system comprising such apparatus. Further, the invention relates to a method for providing electrical energy and/or an energy carrier (such as $H_2$). Yet, the invention also relates to the use of the apparatus and/or the energy system.

BACKGROUND OF THE INVENTION

Electrolysers are known in the art. US2015069836, for instance, describes a method for controlling a feed arrangement having a wind energy installation for feeding electrical power into an electrical supply system, comprising the following steps: generating electrical power using the wind energy installation from wind, feeding a first proportion of the generated electrical power into the electrical supply system, supplying a second proportion of the generated electrical power to an electrical consumer for consuming the supplied second proportion of the generated electrical power, and wherein depending on at least one monitored system state and/or depending on the prevailing wind, the second proportion of the generated electrical power which is supplied to the consumer is reduced wholly or partially and the first proportion of the electrical power fed into the electrical supply system is increased correspondingly, and to a corresponding feed arrangement.

SUMMARY OF THE INVENTION

To accommodate increasing amounts of renewable electricity from wind and solar power, grid scale electricity storage on diurnal and seasonal scales is required. The realisation of affordable solutions for different types of storage suffer from life time issues, low energy efficiencies, conversion losses, and/or too high cost when taking into account the limited full operational time throughout the year due to the varying renewable electricity supply.

Hence, it is an aspect of the invention to provide an alternative energy apparatus, which preferably further at least partly obviates one or more of above-described drawbacks. Yet, it is also an aspect of the invention to provide an alternative energy system, comprising such energy apparatus, which preferably further at least partly obviates one or more of above-described drawbacks. Further, it is also an aspect of the invention to provide an alternative method for storing and regenerating electricity and/or an energy carrier, which preferably further at least partly obviates one or more of above-described drawbacks. Further, it is also an aspect of the invention to provide a flexible system and apparatus that may provide a large freedom in storing electricity and/or hydrogen gas.

The diurnal electricity storage would be most energy efficient in batteries, while seasonal storage scales require the conversion to artificial fuels based on abundant elements. These two directions have always been treated as separate or even competing solutions.

Here we show that the Ni—Fe battery can be modified to operate as highly efficient integrated battery-electrolyser. We found that in addition to the full capacity of the battery an equal or larger amount of charge can be used to produce hydrogen at an overall energy efficiency of $\geq 81\%$. The charged battery electrodes consisting of nanostructured NiOOH and reduced Fe act as efficient oxygen and hydrogen evolution catalysts respectively, generating hydrogen when the battery is full. In this way the operational time of the device is extended beyond the charge time of the battery and can thus still perform useful energy storage in the form of gas production. When the renewable produced electricity production decreases the battery is charged and available to discharge and supply electricity. Full term operation of the device even with varying electricity supply thus becomes possible, in contrast with a singular battery or a singular electrolyser that are not integrated in one device. Furthermore, the heat dissipated in overpotentials of the battery is directly used in the generation of hydrogen, especially when thermal insulation is applied to reduce the heat loss to the environment. Note in this respect that hydrogen and oxygen production by electrolytic water splitting requires the supply of heat. The thermal insulation and thermal management system may include thermal insulation around the integrated battery and electrolyser as well as optionally cooling. Such thermal insulation and management enables heating by the currents that run up to e.g. 60° C. during periods of charge and hydrogen evolution and may limit the temperature to remain below 60° C. Hence, especially the energy apparatus may further include a thermal management system configured to maintain the functional unit (see also below) at a temperature selected from the range of 5-95° C., especially 10-75° C., such as in the range of 15-70° C., such as at maximum 60° C.

Our results demonstrate an integrated battery and electrolyser based on the abundant elements Fe, Ni and a KOH (with optionally LiOH and NaOH) water based electrolyte that addresses both diurnal and seasonal electricity storage. This may provide a robust grid scale energy storage solution in a low cost intrinsically flexible device that has close to full time applicability: as daytime unlimited switchable power storage, as night time electricity source.

The Ni—Fe battery was introduced by Jungner and Edison. At the negative electrode $Fe(OH)_2$ is present which is reduced to Fe upon charge: $Fe(OH)_2 + 2\ e^- \rightarrow Fe + 2OH^-$ (−0.877V vs SHE) while at the positive electrode $Ni(OH)_2$ is present that upon charge releases a proton: $Ni(OH)_2 + OH^- \rightarrow NiOOH + H_2O + e^-$ (+0.49V vs SHE). The open circuit potential of the battery is 1.37 V, which is higher than the minimum potential required to split water from the 6M KOH electrolyte. For this reason, there is under normal operation already a risk to split water in hydrogen and oxygen, leading to energy loss, and a slow loss of electrolyte. At the positive electrode then the reaction $4OH^- \rightarrow O_2 + 2H_2O + 4e^-$ can take place (+0.40 vs. SHE), while at the negative electrode $2H_2O + 2e^- \rightarrow H_2 + 2OH^-$ can take place (−0.83 vs. SHE). Also the reaction $Fe + 2H_2O \rightarrow Fe(OH)_2 + H_2$ is known to lead to spontaneous self discharge. The $Ni(OH)_2$ and $Fe(OH)_2$ are nanostructured for enabling faster (dis-)charge rates. The theoretical capacity for storing $H^+$ in $Ni(OH)_2$ in the reaction above corresponds to 289 mAh/g. The theoretical capacity for storing $OH^-$ in $Fe(OH)_2$ corresponds to 596 mAh/g.

Alkaline electrolysers may be used for the generation of hydrogen and oxygen at a typical efficiency of 71% (HHV (higher heating value) of produced hydrogen divided by the applied electrical energy). The main active components are a Ni metal based positive electrode and a Ni (or Ni coated Fe) negative electrode which is separated by a diaphragm or separator which separates hydrogen from oxygen while transmitting the ions in the alkaline electrolyte. The metal electrodes have an increased surface area from its porous structure (Raney nickel) for higher gas production rates. In addition precious metals like Pt or Pt—Ru can be incorporated in the negative electrode to decrease the required overpotentials for hydrogen production from 200 mV to 50 mV at currents of 0.5 A/cm$^2$ electrode surface, for instance at 80° C. The diaphragm can be a ceramic composite, while the electrolyte is again a strongly alkaline, especially KOH, solution. The efficiency of the alkaline electrolyser is limited by $O_2$ and $H_2$ generation overpotentials, the charge transport and the gas transport and bubble formation on the electrode surfaces.

Hence, in a first aspect the invention provides an energy apparatus (herein also indicated as "apparatus"), which apparatus may especially have an electrical energy storage functionality, and/or a hydrogen generation functionality, and/or an electrolysis functionality, the energy apparatus comprising one or more functional units, each functional unit comprising:

a first cell, comprising one or more first cell electrodes and one or more first cell openings for a (basic) first cell aqueous liquid ("liquid" or "first liquid") and for a first cell gas;

a second cell, comprising one or more second cell electrodes and one or more second cell openings for a second cell aqueous liquid ("liquid" or "second liquid") and for a second cell gas;

a separator, wherein the first cell and the second cell share the separator, wherein the separator is especially configured to block transport of one or more of $O_2$ and $H_2$ from one cell to another while having permeability for at least one or more of hydroxide ions (OH$^-$) monovalent sodium (Na$^+$), monovalent lithium (Li$^+$) and monovalent potassium (K$^+$);

wherein the energy apparatus comprises one or more of (a) at least two or more first cell electrodes and (b) at least two or more second cell electrodes, wherein the energy apparatus further comprises an electrical element configured for applying one or more of (a) one or more potential differences between two or more first cell electrodes and (b) one or more potential differences between two or more second cell electrodes.

With such apparatus it is possible to discharge and generate $H_2$ at the same time. Further, with such apparatus it is possible to store electricity, when charging the apparatus, and generate hydrogen and oxygen.

As indicated above the invention provides an energy apparatus which may especially have an electrical energy storage functionality. Hence, when electrical energy is provided to the apparatus, electrical energy may be stored. Alternatively or additionally, the apparatus may have hydrogen generation functionality. With the present apparatus, it is possible to select between hydrogen generation and/or electrical energy storage and/or discharging when electricity is needed, but it is also possible to execute two of these at the same time, e.g. dependent upon the potential difference that can be applied between the first electrodes and the second electrodes. Hence, in fact at the same time hydrogen may effectively be stored and produced. Here, the term "effective storage" and similar terms indicate that by reducing e.g. Fe, this reduced Fe can subsequently be used to generate $H_2$. Hence, $H_2$ is "stored" in e.g. Fe and $H_2O$.

Yet further, in other embodiments the apparatus may have electrolysis functionality. Hence, when the apparatus is charged with the electrolysis function electrical energy stored in the apparatus can be used to electrolyze water, and generate thereby hydrogen. Of course, the electrical energy stored can also be used to provide electrical energy when desired.

The energy apparatus comprises one or more functional units. In embodiments, the energy apparatus may include a single functional unit; in other embodiments the apparatus may include a plurality of functional units. The functional units can be coupled parallel or in series. Each functional unit comprising a first cell, a second cell and a separator. Especially, a functional combination of a first cell and a second cell can be used as battery or electrolyzer.

The first cell, comprises one or more first cell electrodes and one or more first cell openings for a first cell aqueous liquid and for a first cell gas. Further, the second cell, comprises one or more second cell electrodes and one or more second cell openings for a second cell aqueous liquid and for a second cell gas. Yet further, functional unit comprises the separator. The first cell and the second cell share the separator, wherein the separator is especially configured to block transport of one or more of $O_2$ and $H_2$ from one cell to another while having permeability for at least one or more of hydroxide ions (OH$^-$) monovalent sodium (Na$^+$), monovalent lithium (Li$^+$) and monovalent potassium (K$^+$). Here, the term "cell" may actually refer to a half cell.

As indicated above, the energy apparatus comprises one or more of (a) at least two or more first cell electrodes and (b) at least two or more second cell electrodes. This configuration can be obtained with two main embodiments, which can optionally also be combined.

In first embodiments, the first cell or the second cell, or both the first cell and the second cell comprise a plurality of (first or second, respectively) electrodes. In second embodiments, two or more first cells provide said two or more first cell electrodes or two or more second cells provide said two or more second cell electrodes, respectively. Hence, any system includes a first cell electrode and a second cell electrode. The further first cell electrode to provide the two first cell electrodes, may also be indicated as third electrode. Likewise, the further second cell electrode to provide the two (or more) second cell electrodes, may also be indicated as third electrode. As will be clear from the above, there may be a plurality of third electrodes.

Hence, in the invention, two first cell electrodes may be used in identical ways or two first cell electrodes may be used in different ways. In specific embodiments, such as when both discharging the apparatus and producing hydrogen gas, the different ways the two first cell electrodes are used may occur simultaneously.

Likewise, two second cell electrodes may be used in identical ways or two second cell electrodes may be used in different ways. In specific embodiments, such as when both discharging the apparatus and producing hydrogen gas, the different ways the two second cell electrodes are used may occur simultaneously.

The number of first cell electrodes is not necessarily the same as the number of second cell electrodes, especially when e.g. a plurality of (larger and smaller) first cell electrodes, to which (two) different potential differences may be applied (to two different subsets of first cell electrodes, are used.

As further indicated above, the energy apparatus further comprises an electrical element configured for applying one or more of (a) one or more potential differences between two or more first cell electrodes and (b) one or more potential differences between two or more second cell electrodes. Hence, even there may be a plurality of electrodes which are indicated as first cell electrodes or second cell electrodes, respectively, the apparatus include the configuration allowing application of different potential differences between two different first cell electrodes and the second cell electrode, or allowing application of different potential differences between two different second cell electrodes and the first cell electrode, or allowing application of different potential differences between two different first cell electrodes and two different second cell electrodes, etc. With such configurations it is possible to discharge and generate $H_2$ (and/or $O_2$) at the same time.

As indicated above, in embodiments this may be achieved with a single functional unit or with a plurality of functional units wherein the effect may be achieved in one or more of those plurality of functional units.

Hence, in embodiments the energy apparatus comprises at least a functional unit comprising two or more first cell electrodes, and said electrical element is configured for applying a potential difference between a first subset of one or more first cell electrodes and a second subset of one or more first cell electrodes. The phrase "said electrical element is configured for applying a potential difference" may indicate that at a specific stage, this potential difference may be applied. For instance, when discharging (only), the potential difference will not be applied. However, when both discharging and hydrogen production takes place, especially the potential difference may be applied. Further, it may not always be necessary to generate $H_2$ and charge, e.g. when a peak volume of $H_2$ is necessary or when $H_2$ is not needed and all or most electrical energy can be used to charge the apparatus (i.e. functional unit) until it is charged (the, further charge can be used for $H_2$ generation).

As indicated above, the energy apparatus may further comprise an electrical element configured for applying one or more of (a) one or more potential differences between two or more first cell electrodes and (b) one or more potential differences between two or more second cell electrodes. The electrical element may also be configured for applying a potential difference between a subset of first electrodes and/or for applying a potential difference between a subset of second electrodes. Hence, the term electrical element may in embodiments also refer to a plurality of (different electrical elements).

Especially good results may be obtained in embodiments wherein the first cell electrodes of the first subset and the second subset comprise iron based electrodes. Hence, in such embodiments the first cell electrodes may essentially be identical in properties. However, in such embodiments the electrodes of the first subset may also differ in electrode surface area and/or thickness, and/or storage capacity (in Ah), etc.

The electrodes of the subsets may also essentially differ, such as comprising different materials. In such embodiments, a subset may e.g. be optimized to charge the apparatus and another subset may be optimized for $H_2$ generation. Hence, in embodiments the first cell electrodes of the first subset comprise iron based electrodes, and the first cell electrodes of the second subset comprise hydrogen gas generating electrodes (different from the first cell electrodes of the first subset). The electrodes from the first subset may differ in material from the second subset. For instance, in embodiments the first cell electrodes of the second subset comprise one or more of platinum (Pt), NiMo, $NiFe_x$, $FeMo_x$, NiCoFe, $LaNi_5$ and $LaNi_5$ type materials such as $MmNi_{5-x-y}Co_xAl_y$, where Mm stands for a mix of two or more lanthanides, and molybdenum sulfide ($MoS_x$). $MmNi_{5-x-y}Co_xAl_y$ is a $LaNi_5$ type compound. Mm may especially comprise one or more of Ce, La, Pr, and other rare earth elements (including Y). Further, x and y are chosen, as known in the art, to be equal or larger than zero. Especially, one or more electrodes of the first subset comprise Fe and one or more electrodes from the second subset comprise Pt. Other options can be tungsten sulfide ($WS_x$) or selenide ($WSe_x$), and molybdenum sulfide ($MoS_x$). Here, x is especially in the range of 1.9-2.1, or 1 to 3. Especially, these materials may be used as catalyst (for addition to e.g. Fe comprising electrodes). These sulfide materials are produced to have a high specific surface area larger than 1 $m^2$/g or 10-50 $m^2$/g, or up to 500 $m^2$/g.

As indicated above, the first subset may be comprised by a first functional unit and a second subset may be comprised by a second functional unit. In specific embodiment, the first subset and the second subset are comprised by the same functional unit. The apparatus may include a plurality of such units.

Above, especially examples are provided wherein there are a plurality of first electrodes in the functional unit, and at least a second electrode. There may be one or more second electrodes. Further, the number of first electrodes and second electrodes may be identical. However, the number of second electrodes may be lower, even including a plurality of first electrodes (optionally including a plurality of different subsets) and a single second electrode.

When there are different subsets, this allows different potentials, with the use of the electrical element. Hence, in such embodiments in a stage all electrodes may be configured at the same potential, such as to provide $H_2$, whereas in other embodiments electrodes of a first subset may be at a different potential than electrodes of a second subset (measured relative to a second electrode as "counter electrode"), allowing charging and generation of $H_2$.

However, in embodiments the apparatus comprises at least a functional unit comprising two or more first cell electrodes and two or more second cell electrodes.

Especially, such embodiments may be useful when using a bipolar plate comprising apparatus. A bipolar plate may connect and separate the cells of different functional units in series to form a stack with required voltage (when discharging, charging or generating hydrogen and oxygen). The bipolar plate may conduct electrical current from the anode of one cell of a unit to the cathode of the next cell of another functional unit. Further, the bipolar plate may facilitate water management within the functional unit and may support the membrane and electrodes etc. Hence, in embodiments the energy apparatus comprises at least two functional units, wherein a first electrode of a first functional unit and a second electrode of a second functional unit are separated from each other by a bipolar plate, wherein the bipolar plate is electrically conductive.

In yet further embodiments the bipolar plate comprises at least two bipolar plate sections which are configured electrically separated from each other, wherein one or more first cell electrodes are associated with a first bipolar plate section, wherein one or more first cell electrodes are associated with a second bipolar plate section, wherein one or more second cell electrodes are associated with said first bipolar plate section, and wherein one or more second cell electrodes are associated with said second bipolar plate section. This allows the use of the bipolar plate for apparatus with sections of first electrodes and sections of second electrodes. In this way, also with apparatus based on the bipolar plate principle the invention can be applied.

In the above embodiments, some examples of apparatus were given where one or more first electrodes are iron based. Especially good results may be obtained when one or more second electrodes are nickel based. Hence, in embodiments one or more second cell electrodes comprise nickel based electrodes.

The electrical element that can be used to provide different potential differences to different first electrodes (and second electrodes), may be a variable voltage supply or a variable potential DC-DC converter that can supply variable potential and/or variable current. Hence, in embodiments the electrical element comprises a variable voltage supply. In specific embodiments, the electrical element may comprise a plurality of variable voltage supplies. The electrical element may be configured to provide two status:
  one wherein there is no voltage difference between first electrodes (or between second electrodes; or mutually between first electrodes and mutually between second electrodes, respectively). This may e.g. be obtained with short circuiting the first electrodes (or the second electrodes). This may be done with the electrical element and/or with a switch (comprised by the electrical element);
  one where a voltage difference is applied between first electrodes (or between second electrodes; or between first electrodes and second electrodes, respectively). This may e.g. be obtained with the electrical element.

Further, in specific embodiments the apparatus comprises a connector element, with the connector element comprising said electrical element, with the connector element being switchable in a first setting wherein the first electrodes of the first subset and the first electrodes of the second subset are short circuited, and a second setting wherein different voltage differences can exist and/or different electrical currents can flow between (a) the second electrode and the first electrodes of the first subset and (b) the second electrode and the first electrodes of the second subset.

In a specific embodiment, which will further also elucidate below, of the energy apparatus at least one functional unit comprises:
  a first cell, comprising a plurality of first cell electrodes and one or more first cell openings for said first cell aqueous liquid and for said first cell gas, wherein the plurality of first electrodes comprise iron based electrodes, wherein the plurality of first cell electrodes comprise a first subset of the first cell electrodes and a second subset of the first cell electrodes;
  a second cell, comprising said second cell electrode and one or more second cell openings for said second cell aqueous liquid and for said second cell gas, wherein the second electrode comprises a nickel based electrode;
  said separator, wherein the first cell and the second cell share the separator, wherein the separator is configured to block transport of one or more of $O_2$ and $H_2$ from one cell to another while having permeability for at least one or more of hydroxide ions ($OH^-$) monovalent sodium ($Na^+$), monovalent lithium ($Li^+$) and monovalent potassium ($K^+$);
  a first electrical connection in electrical connection with a first subset of the first cell electrodes, a second electrical connection in electrical connection with a second subset of the first cell electrodes, and a third electrical connection in electrical connection with the second cell electrode; and
  a connector element, comprising said electrical element, switchable in a first setting wherein the first electrodes of the first subset and the first electrodes of the second subset are short circuited, and a second setting wherein different voltage differences can exist and/or different electrical currents can flow between (a) the second electrode and the first electrodes of the first subset and (b) the second electrode and the first electrodes of the second subset. Note that the potentials of the second electrodes may essentially be identical.

Of course, in embodiments the connector element may also be switchable in a first setting wherein the first electrodes of the first subset and the first electrodes of the second subset are short circuited, and a second setting wherein different voltage differences can exist and/or different electrical currents can flow between (a) the second electrode and the first electrodes of the first subset and (b) the same second electrode and the first electrodes of the second subset. Hence, in such embodiments the second electrode is shared. Hence, in embodiments there are two (or more) first electrodes (from two or more different subsets) and a single second electrode. Two (or more) different potentials are applied, but in both cases against the same second electrode or between the two different subsets of the first electrodes.

Alternatively or additionally, the electrical element may also be used to deliver a different magnitude of the current to the different subsets. Hence, the current for generating $H_2$ may be larger or smaller than the discharge current.

The connector element can be the electrical element; see also above.

To generate a voltage difference and/or a different current between a first electrode and a second electrode, the apparatus may further comprise a source of energy. Hence, in embodiments the energy apparatus further comprises a source of energy. The source of energy may especially be configured to generate a voltage difference and/or a different current between (a) the second electrode and the first electrodes of the first subset and (b) the second electrode and the first electrodes of the second subset in the second setting. The source of energy may be another battolyser, another source of energy, or in one embodiment with DC-DC voltage and current converters the discharge capacity of the charged apparatus itself.

Of course, in embodiments the source of energy may especially be configured to generate a voltage difference and/or a different current between (a) the second electrode and the first electrodes of the first subset and (b) the same second electrode and the first electrodes of the second subset in the second setting. Hence, in such embodiments the second electrode is shared.

As also indicated above, in specific embodiments the electrode capacity and surface area of the first electrodes may be essentially larger than the electrode capacity and surface area of the second electrodes. In other embodiments, this may be the other way around. However, the capacities and areas may also be essentially identical. In the bipolar plate based apparatus, the capacities and areas may essentially be identical, though this is not necessarily the case. In other embodiments, the capacity and area of the first electrodes may essential be larger than the electrode capacity and surface area of the second electrodes. As is known in the art the capacity of an electrode is measured in charge storage capacity in [Ah] while the surface area in [$m^2$] of the electrode follows from its external shape that encloses the materials that have the storage capacity.

In specific embodiments, the second electrode has a second electrode capacity and surface area (indicated here with a symbol A2 for the surface area and indicated with Ah for the capacity), and the plurality of first electrodes have an integrated first subset electrode capacity (Ah11) and surface area (A11) of all first electrodes within the first subset and an integrated second subset electrode capacity (Ah12) and surface area (A12) of all first electrodes within the second subset, wherein the corresponding numerical values for (capacity and) surface area A1=A11+A12>A2, especially wherein A11/A2≥2 and wherein A11/A12≥1. For instance, A11 represents the surface area of the large $Fe_{OH}$ electrode, A12 the surface area of the smaller $Fe_H$ electrode for $H_2$ evolution, and A2 is represents the surface area of the Ni electrode.

However, the electrode capacities and surface areas of the electrodes of different subsets may also differ. For instance, for hydrogen generation during the discharge stage, the electrodes that are used for the hydrogen generation may in embodiments be smaller than those for discharging. During the charging stage, the different first electrodes may be short circuited. In alternative embodiments, a voltage difference may be applied. Especially at the begin of the charging state, the voltage may be low and there will hardly be any hydrogen generation. A voltage difference would allow to control the hydrogen generation.

As also indicated above, in specific embodiments the electrode capacity in Ah of the first electrodes may be essentially larger than the electrode capacity of the second electrodes. In other embodiments, this may be the other way around. However, the capacities may also be essentially identical. In the bipolar plate based apparatus, the capacities may essentially be identical, though this is not necessarily the case. In other embodiments, the capacity of the first electrodes may essentially be larger than the electrode capacity of the second electrodes.

However, the electrode capacities of the electrodes of different subsets may also differ. For instance, for hydrogen generation during the discharge stage, the electrodes that are used for the hydrogen generation may in embodiments be smaller in capacity but with larger surface area than those for discharging. The hydrogen generating electrodes may also have negligible discharge capacity as long as the hydrogen generating capabilities are high enough. During the charging stage, the different first electrodes may be short circuited to facilitate charging and hydrogen generation by all first electrodes.

In specific embodiments, the second electrode has a second electrode capacity (Ah2), and the plurality of first electrodes have an integrated first subset electrode capacity (Ah11) of all first electrodes within the first subset and an integrated second subset electrode capacity (Ah12) of all first electrodes within the second subset, wherein especially Ah1=Ah11+Ah12>Ah2, even more especially wherein Ah11/Ah2≥2 and wherein Ah11/Ah12≥1.

As will also be further described herein, in specific embodiments of the energy apparatus the apparatus comprises a first electrical connection in electrical connection with the first cell electrode, and a second electrical connection in electrical connection with the second cell electrode.

As will also be further described herein, in specific embodiments of the energy apparatus the apparatus comprises an aqueous liquid control system configured to control introduction of one or more of the first cell aqueous liquid and the second cell aqueous liquid into the functional unit.

As will yet also be further described herein, in specific embodiments of the energy apparatus the apparatus comprises a storage system configured to store one or more of the first cell gas and the second cell gas external from said functional unit.

As will also be further described herein, in specific embodiments of the energy apparatus the apparatus comprises a pressure system configured to control one or more of (a) the pressure of the first cell gas in the functional unit, (b) the pressure of the first cell gas in the storage system, (c) the pressure of the second cell gas in the functional unit, and (d) the pressure of the second cell gas in the storage system.

As will also be further described herein, in specific embodiments of the energy apparatus the apparatus comprises:

a charge control unit configured to receive electrical power from an external electrical power source and configured to provide said electrical power to said functional unit during at least part of a charging time at a potential difference between the first cell electrode and the second cell electrode of more than 1.37 V.

a first connector unit for functionally coupling to a receiver to be electrically powered and the electrical connection (51,52), and a second connector unit for functionally connecting a device to be provided with one or more of the first cell gas and the second cell gas with said storage system; and a control system configured to control the aqueous liquid control system, the storage system, the pressure system, and the charge control unit.

Therefore, in a further aspect the invention also provides an energy apparatus ("apparatus") especially having both an electrical energy storage functionality and an electrolysis functionality, the system comprising a functional unit, the functional unit comprising:

a first cell, comprising a first cell electrode and one or more first cell openings for a (basic) first cell aqueous liquid ("liquid") and for a first cell gas, wherein the first electrode especially comprises an iron based electrode;

a second cell, comprising a second cell electrode and one or more second cell openings for a (basic) second cell aqueous liquid ("liquid") and for a second cell gas, wherein the second electrode especially comprises a nickel based electrode;

a separator, wherein the first cell and the second cell share the separator, wherein the separator is configured to block transport of one or more of $O_2$ and $H_2$ from one cell to another while having permeability for at least one or more of monovalent hydroxide ($OH^-$), monovalent sodium ($Na^+$), monovalent lithium ($Li^+$) and monovalent potassium ($K^+$);

a first electrical connection in electrical connection with the first cell electrode, and a second electrical connection in electrical connection with the second cell electrode;

the energy apparatus further optionally comprising one or more of:

an aqueous liquid control system configured to control introduction of one or more of the first cell aqueous liquid and the second cell aqueous liquid into the functional unit;

a storage system configured to store one or more of the first cell gas and the second cell gas external from said functional unit;

a pressure system configured to control one or more of (a) the pressure of the first cell gas in the functional unit, (b) the pressure of the first cell gas in the storage system, (c) the pressure of the second cell gas in the functional unit, and (d) the pressure of the second cell gas in the storage system;

a charge control unit configured to receive electrical power from an external electrical power source and configured to provide said electrical power to said functional unit during at least part of a charging time at a potential difference between the first cell electrode and the second cell electrode of especially more than 1.37 V, such as more than 1.48V and even up to 2.0 V;

a first connector unit for functionally coupling to a receiver to be electrically powered and the electrical connection, and a second connector unit for functionally connecting a device to be provided with one or more of the first cell gas and the second cell gas with said storage system; and a control system ("controller") configured to control one or more of (and especially all of) the aqueous liquid control system, the storage system, the pressure system, and the charge control unit.

The main advantages of combining a battery and electrolyser in one device as presently claimed are numerous.

The integrated battery and electrolyser has a high capacity factor for economic operation. This is realized because when the electricity price is low (large supply compared to demand) one will charge the battery and when the battery is reaching its full capacity, automatically generate more hydrogen. When the electricity price is high (low supply compared to demand) the battery can discharge while electrolysis automatically is stopped. The integrated battery electrolyser is all these times in service, making the capacity factor high, unlike e.g a single electrolyser that will only operate when the electricity price is low, or a single battery that cannot operate when it is already full. Another advantage is that two functionalities are provided by a single device that has a complexity not greater than an alkaline electrolyser.

A further advantage is increased efficiency: normally the overpotentials applied and the water splitting is considered a loss factor in the operation of a Ni—Fe battery. Here there is made use of that energy in the electrolysis process, resulting in higher overall efficiency. The heat dissipated during charging the battery and electrolysing water is required for generating hydrogen and oxygen. This required heat is a result from the increase in entropy when splitting liquid water in gaseous $H_2$ and $O_2$. The increase in entropy dS corresponds with an amount of heat TdS that is required to continue the reaction, next to supplying the Gibbs free energy dG. So in total the energy provided by the system equals dG+TdS=dH, where dG is provided as electrical power and TdS as heat.

Further, the hydrogen production occurs during chemical reduction of the iron electrode to Fe metal and also continuing for a desired period after that. This hydrogen is a useful and intended product. Furthermore it appears that the battery function operates better reversibly and only reaches its full capacity when also hydrogen evolution is allowed during overcharged like this. The original Ni—Fe batteries are however, intentionally not charged that fully because then the energy efficiency is considered to be low because of the overpotentials that occur and the gassing, and also the electrolyte needs refilling. Here it is intentionally done (when there is sufficient electricity supply each cycle), which actually appears to increase lifetime of the battery electrolyser. That such overcharging is allowed and intentionally realised makes the power electronics also relatively simple; for normal battery systems overcharging is prevented at the individual cell level, making the battery cell management more demanding.

Yet also, for the battery functionality one requires massive numbers and volumes of battery cells to reach a high volume of energy storage (many kWh or MWh or even larger). This results automatically in large active surface area's inside the assembly of electrodes, which benefits the electrolysis functionality.

Further, for electrolysers one can use larger surface area, rough or porous Ni based electrodes in order to reach high current densities at not too high overpotentials. In practice such porous or rough surface area will be smaller than those possible in a battery that contains a larger amount of Ni for electricity storage. Also precious metals are still included as catalyst in conventional alkaline electrolysers but are not necessary in the battery electrolyser.

Another advantage of the battery electrolyser is that it can generate hydrogen and oxygen at the pressure that is applied on the liquid electrolyte. This means that by the low energy demand pressurization of water and small electrical overpotentials directly high pressure hydrogen can be produced. Note that such electrochemical hydrogen production is significantly more efficient than mechanical hydrogen gas compression and also does not require a large and costly gas compressor.

The current densities of the electrodes may be in the range of 0.001 to 10 $A/cm^2$ of the geometrical surface area of the electrodes, or more commonly 0.1-2 $A/dm^2$. It is further noted that for the battery electrolyser the current densities reached are high for typical battery charging since the (dimensioning of the) electrodes (is such that they) become fully charged within ~10 or ~1 hours for a current of 0.2 and 2$A/dm^2$, respectively. For higher current densities up to 400 $mA/cm^2$ or up to 2000 $mA/cm^2$ as are used in electrolysers the battolyser may have positive and negative electrodes that have larger thickness, i.e. a storage capacity of up to e.g. 800 or 4000 $mAh/cm^2$ of electrode surface. A duration to full charge of about 5 hours is compatible with the daytime charging of the cell with electricity from solar power, leaving still more hours for producing hydrogen. The overpotentials for electrolysis remain low at such current densities because of the large active surface area available in the battery electrodes. This results in higher energy efficiency (typical electrolyser operates at 2.0V, the battery-electrolyser as defined herein operates in the range 1.48 to 2.0 V when producing hydrogen). The remaining overpotentials are required to generate the hydrogen and oxygen.

Also, no noble metals like Pt/Ru are required in the Fe based negative or Ni based positive electrode (cost reduction). Nevertheless, when desired a noble metal may be applied.

Further, a battery and electrolyser device has the advantage of being flexible in storing energy. When the battery is filled, still more energy can be stored in the gas. In a solar power system one clearly would dimension the battery appropriately for the required electricity use during the night and store excess electricity as gas e.g. for later use in winter. For the electricity grid the presence of the battery electrolyser has the advantage that there is now both a rapid response sink and source for current available. When there is a varying production of solar and wind power the electricity grid stability requires assets that are flexible in power uptake and delivery when there is too much or too little power generated. The switching time for this device from uptake of electricity to delivering electricity is particularly short, since it has a battery functionality. Yet, also an economic benefit of a dual purpose device is that the time filling factor (or capacity factor) for its use can be very high: the battery can work day (charge) and night (discharge), and when charged completely the device is not idling because it (still) generates hydrogen and oxygen. For electrolysers running on renewables this is always a bottleneck in the calculations: how many hours are they actually going to be used since one normally first charges batteries before converting to hydrogen with the associated efficiency loss and only later one switches on the electrolyser. In the normal Ni—Fe battery the stored charge per $Ni(OH)_2$ weight is limited to the theoretical maximum of 289 mAh/gram, while in the battery electrolyser a multiple of that charge can be stored also as hydrogen, reducing the overall cost per stored energy unit.

Finally, the added cost for converting a battery into a battery electrolyser may not be so high because the electrode materials have to be there anyway. The pressure system and separator/diaphragm will present additional cost, however, but less than when building batteries and electrolyser separately. The system may also require one set of power electronics instead of two, which may be used continuously.

As indicated above, the energy apparatus has an electrical energy storage functionality and an electrolysis functionality. Hence, the apparatus is a combination of a battery and an electrolyser. By charging the battery, the battery gets ready for use and further hydrogen is produced. Even when the battery is filled, hydrogen production can be continued. This provides a charged battery and hydrogen, which production can e.g. take place when no consumption of energy or energy carrier of the apparatus takes place. The term "energy" especially relates to electrical energy. The term "energy carrier" especially relates to hydrogen gas ($H_2$), which can be used as fuel, e.g. for direct propulsion of an engine, but which may also indirectly be used, e.g. in a fuel cell for the generation of electricity. Hence, the apparatus may especially be used as charging point for vehicles for electricity and/or hydrogen (and/or $O_2$) (see also below).

The apparatus comprises a functional unit. However, in an embodiment of the energy apparatus, the apparatus may also comprise a plurality of functional units. Two or more of the functional units may be are arranged (electronically) in series, e.g. to increase the voltage difference. However, two or more of the functional units may also be arranged parallel, e.g. to increase the current. Further, when there are more than two functional units, also a combination of arrangements in series and parallel arrangements may be applied.

Especially, the functional unit comprising a first cell, comprising a first cell electrode and one or more first cell openings for a first cell aqueous liquid and for a first cell gas, wherein the first electrode especially comprises an iron based electrode, and a second cell, comprising a second cell electrode and one or more second cell openings for a second cell aqueous liquid and for a second cell gas, wherein the second electrode especially comprises a nickel based electrode.

Each cell at least comprises an opening for introduction of the respective aqueous liquids. The aqueous liquid used is especially a basic aqueous liquid, such as comprising one or more of KOH, LiOH, and NaOH. Especially, the concentration of $OH^-$ is at least 3 mol/l. Especially, the concentration of the hydroxide (especially one or more of KOH, NaOH and LiOH) in water is in the range of 4.5-8.4 mol/L (25-47 wt. % for KOH). Hence, these openings, respectively, may be configured as inlets of recycled electrolyte with water added to maintain the chosen concentration of KOH, LiOH and/or NaOH.

The first cell aqueous liquid and the second cell aqueous liquid within the cells are especially alkaline, such as at least 0.1 mmol/l OH, especially at least 3 mol/l OH, even more especially at least 3 mol/l OH, such as at least about 6 mol/l OH. The liquid in the cells may be supplemented with liquids from the aqueous liquid control system. Fresh water may not necessarily be alkaline, as the alkali in the cells may substantially be effectively not used. The "cell aqueous liquid" may also be indicated as electrolyte.

Further, each cell may also comprise a further opening, especially configured for removal of the aqueous liquid and/or for removal of gas. Both may escape from the same opening. The first cell gas especially comprises $H_2$ gas; the second cell gas especially comprises $O_2$. The aqueous liquid in the cell and the cell gas may escape from the same opening. Alternatively or additionally, two or more openings may be used, e.g. one for the removal of aqueous liquid and one for the removal of gas.

As each cell has two openings, the aqueous liquid may be flowed through each cell, where the flow aids in gas removal, cooling (or heating) when necessary, electrolyte concentration control, and water refilling. Depending on the applied current per $cm^2$ electrode surface area the flow (in volume/area/time) may be for instance in the range of about 0.3 $\mu l/cm^2/h$-3.5 $ml/cm^2/h$ (with the former value approximately corresponding to the value of 0.001 $A/cm^2$, and the latter value approximately corresponding to the value of 10 $A/cm^2$; see elsewhere herein).

Further, each cell comprises an electrode.

The first cell comprises the first electrode, which especially comprises an iron-based electrode. The iron based electrode may comprise in a charged state essentially Fe (metal) and in a discharged state essentially $Fe(OH)_2$, as was the case in the Edison Ni—Fe battery.

The iron based electrode especially is produced following the procedure as follows. Iron is first dissolved in dilute $H_2SO_4$ and to produce ferrous sulphate. The latter is purified by recrystallization and roasted at 1070-1120 K. The roasted mass is washed thoroughly with water and then dried. The dried material is treated with hydrogen at 1020-1070 K for chemical reduction and again subjected to partial oxidation at 970-1070 K. This latter process yields a mixture of iron powder and magnetite. The mixture is blended with additional agents (carbon, Cu, FeS, HgO, NaS etc.) and put into pockets made from perforated-steel sheet plated with nickel. The pockets are fixed over a suitable nickel-plated steel plate to form the negative electrode. Hence, especially the iron based electrode is made as described by Chakkaravarthy et al. in Journal of Power Sources, 35 (1991) 21-35, which is herein incorporated by reference, using perforated pockets made from Ni plated steel. The active iron material may further be bound by sintering, or may alternatively be bound by PTFE or polyethylene. Alternatively or additionally, the first electrode comprises conductive additives such as carbon or Ni. In contrast with the often described Ni—Fe battery the additives such as sulfides (FeS, Bismuth sulfide, HgO, $Na_2S$, $K_2S$, etc.) or other to suppress hydrogen evolution are not used, or alternatively changed in concentration, since in the battery electrolyser hydrogen evolution is aimed to be occurring at reduced overpotentials. Additives to reduce the hydrogen generation overpotential further may be a small mass percentage of the following: Ni—Mo—Zn codeposited with Fe, or alternatively Ni—S—Co, $Ti_2Ni$, nitrogen doped graphene, Ni—Mo—N, Ni doping of the Fe, $Ni(OH)_2$ nanoparticles, Ni—Cr, nanocrystalline $Ni_5P_4$, Ru, $RuO_2$, AgNi, $MoS_x$, $WS_x$, $WSe_2$ or the noble elements Pd, Pt, etc. The electrode porosity can be maintained during pressing the electrodes by adding e.g. NaCl to the electrode, pressing, and then leaching out the NaCl to introduce the porosity. The total electrode thickness in its pockets is 2-5 mm, more particularly around 3.5 mm. The term "first electrode" may also relate to a plurality of first electrodes.

The second cell comprises the second electrode, which especially comprises a nickel based electrode. The nickel based electrode may comprise in a charged state essentially NiOOH and in a discharged state essentially $Ni(OH)_2$.

The nickel based electrode especially is produced in the way described for sintered porous $Ni(OH)_2$ electrodes in also Journal of Power Sources, ibid, which is herein incorporated by reference. Sintered electrodes are intended for high to extremely high loads. Carbonyl Nickel powder is embedded bilaterally on a suitable substrate and sintered under a reducing atmosphere at about 1120 K to produce a porous matrix. The substrate may be one of the following materials nickel netting or nickel-plated mild steel netting, perforated nickel foil or nickel plated, perforated mild steel foil, nickel-fibre mat or nickel-plated steel-fibre mat. Bilateral embedding of the carbonyl nickel powder is carried out prior to sintering under dry conditions using a graphite mould. This process is termed a "dry powder sintering" or "loose sintering" "Wet slurry sintering" is another approach wherein a nickel powder slurry of suitable consistency is used. Stable plates of definite thickness and 80-90% porosity are produced by these methods. Nickel hydroxide and cobalt hydroxide are incorporated into the pores of the nickel plaques by vacuum impregnation or by electrochemical method. Alternatively or additionally, the second electrode comprises no or reduced amount of Co additive compared to normal Ni—Fe batteries; Co is often added in $Ni(OH)_2$ electrodes for Ni—Fe batteries to reduce the equilibrium potential and oxygen evolution, while here this suppression is not required. Alternatively or additionally, the second electrode comprises conductive additives such as carbon or Ni. The term "second electrode" may also relate to a plurality of second electrodes. Further oxygen evolution catalysts next to the NiOOH from the electrode to reduce the overpotential for oxygen evolution can be added. These may be low weight percentage of spinel type $Co_3O_4$, or spinel type $NiCo_2O_4$ or Ni and La doped $Co_3O_4$, Li doped $Co_3O_4$, $La_{0.5}Sr_{0.5}CoO_3$, $Ni_{0.2}Co_{0.8}LaO_3$, $(Pr_{0.5}Ba_{0.5})CoO_{3-x}$, Ni—Fe hydroxides such as $Ni_{1-x}Fe_x(OH)_2$, or $NiO/NiFe_2O_4$. Alternatively, also up to 25% Al substitution of Ni in $Ni(OH)_2$ can be performed to yield higher capacity and electrochemical activity, as reported in Journal of Power Sources 203 (2012) 177-183. Alternatively, the Ni electrode can have Fe substituting Ni to form $Ni_{1-x}Fe_x(OH)_2$.

The first cell and the second cell share a separator, but are separated from each other by this separator. Hence, liquid may not flow form one cell to the other via the separator. Also, hydrogen gas and/or oxygen gas may not flow from one cell to the other via the separator. However, the separator may be permeable for specific ions, such as at least one or more of $OH^-$ ions, neutral $H_2O$, monovalent sodium ($Na^+$), monovalent lithium ($Li^+$), and monovalent potassium ($K^+$). Hence, the first cell and the second cell share the separator, wherein the separator is configured to block transport of one or more of $O_2$ and $H_2$ from one cell to another while having permeability for at least one or more of $OH^-$ ions, neutral $H_2O$, monovalent sodium ($Na^+$), monovalent lithium ($Li^+$), and monovalent potassium ($K^+$), especially all. Hence, especially the separator may have a relative high ionic conductivity and a relatively low ionic resistance. For instance, the ionic resistance is lower than $\leq 0.3$ $\Omega \cdot cm^2$ in 30 wt. % KOH solution (at 30° C.). The separator may e.g. comprise a membrane, such as electrolysis membranes known in the art. Examples of membranes may e.g. include alkaline resistant polymer membranes and polymer composite membranes, such as e.g. a Zirfon (from Agfa) membrane. Such membrane may e.g. consist of a polymer matrix in which ceramic micro-particles (zirconium oxide) are embedded. This body is reinforced internally with a mesh fabric made from monofilament polyphenylene sulphide (PPS) or polypropylene (PP) fabric. It has a controlled pore size of about 0.15 μm and bubble point (especially defined as gas pressure against one side of the membrane required to form bubbles at the other side where there is liquid) of about 2+/−1 bar (over pressure). Such membrane may be permanently hydrophilic, by incorporated metal oxide particles, perfectly wettable in water and most common electrolytes. Such membrane may be stable in strong alkaline (up to 6M KOH) and up to 110° C. The pore size may e.g. be in the range of about 0.05-0.3 μm, such as about 0.15 μm; the thickness may e.g. be in the range of about 100-1000 μm, such as about 500 μm. Between the separator and each electrode, a respective spacer may be configured. These spacers may include openings for transport of the aqueous liquids and providing access for these liquids to the respective electrode.

In this way, a functional unit is provided which is substantially closed, except for the herein indicated openings. For electrical connection, the electrodes may be connected with an electrical connection which is also accessible from external from the functional unit. Hence, the functional unit may further comprise a first electrical connection in electrical connection with the first cell electrode, and a second electrical connection in electrical connection with the second cell electrode.

For a good processing with the functional unit, the apparatus may comprise one or more of an aqueous liquid control system, a gas storage system, a pressure system, a charge control unit, a first connector unit, a second connector unit, and a control unit. Further, additionally the apparatus may comprise a thermal management system and/or thermal insulation. Especially, the energy apparatus comprises all these items.

Hence, in an embodiment the energy apparatus may further comprise an aqueous liquid control system configured to control introduction of one or more of the first cell aqueous liquid and the second cell aqueous liquid into the functional unit. Such aqueous liquid control system may include one or more valves. Further, such aqueous liquid control system may—during operation—functionally be connected with a service pipe for water. In combination with the pressure system (see also below), the aqueous liquid may also be provided under pressure to the functional unit (see further also below). Further, the aqueous liquid control system may include storage for caustics, such as one or more of NaOH, LiOH, and KOH, especially at least KOH. The aqueous liquid control system may independently provide the liquid to the first cell and the second cell. Further, the aqueous liquid control system may include a return system, configured to receive the liquid downstream from the first cell and/or the second cell and reuse at least part of the first liquid and/or second liquid. The term "aqueous liquid control system" may also refer to a plurality of aqueous liquid control systems.

Alternatively or additionally, the control system may be configured to control the voltage difference(s) and/or current(s). Yet further, the control system may be configured to control process parameters, such as voltage difference(s), flow, etc. etc., as function of demand, as function of storage capacity, as function of time of the day, etc. etc. Hence, the control may in embodiment also be coupled with a sensor, such as a sensor to measure one or more of temperature, current, voltage, flow, etc. etc. The term "sensor" may also refer to a plurality of sensors, like a plurality of different sensor, or a plurality of sensors wherein one or more have the same function.

Further, in an embodiment the energy apparatus may further comprise a storage system configured to store one or more of the first cell gas and the second cell gas external from said functional unit. Hence, storage may be done external from the functional unit. To this end the apparatus may comprise a storage system configured to store $H_2$ and/or a storage configured to store $O_2$. At least, the apparatus may comprise a storage configured to store $H_2$. In combination with the pressure system (see also below), the storage system may also be configured to store the one or more of the first cell gas and the second cell gas under pressure (see further also below). The term "storage system" may also refer to a plurality of storage systems.

Hence, in an embodiment the energy apparatus may further comprise a pressure system configured to control one or more of (a) the pressure of the first cell gas in the functional unit, (b) the pressure of the first cell gas in the storage system, (c) the pressure of the second cell gas in the functional unit, and (d) the pressure of the second cell gas in the storage system. To this end, the pressure system may comprise a pump, a valve, etc. In an embodiment, the pressurize system essentially comprises one or more valves. The term "pressure system" may also refer to a plurality of pressure systems. Especially when two or more different types of fluids have to be pressurized, two or more independent pressurize systems may be applied.

In yet a further embodiment the energy apparatus may further comprise a charge control unit configured to receive electrical power from an external electrical power source (see also below) and be configured to provide said electrical power to said functional unit during at least part of a charging time at current (sometimes also indicated as "current strength") that results in a potential difference between the first cell electrode and the second cell electrode of more than 1.55 V at 18° C. and 1.50V at 40° C., i.e. in practice thus at least 1.50 V. Starting from the discharged state the current is first applied to mainly charge the battery; by applying this current voltages reach up to 1.65V at 18° C. and 1.55V at 40° C. before the battery is approximately fully charged, i.e. in practice thus at least 1.55 V. Progressively more hydrogen is produced after the battery capacity is reached and the voltage can then reach up to 1.75 V (at 18° C.) and 1.62V at 40° C., i.e. in practice thus at least 1.62 V. The energy efficiency of the battery functionality charging and the electrolytic gas production is calculated as the integral of the battery output current times its voltage integrated over discharge time plus the higher heating value (HHV) of the amount of hydrogen gas produced during charge and (self-)discharge over the total cycle, divided by the integral of the input current times its voltage over the charge time. It appears that very good results are obtained in terms of total energy efficiency, even when going well above the normal voltage upper limits of 1.65 (at 18° C.) or 1.55V (at 40° C.) (i.e. in practice thus at least 1.55 V) for Ni—Fe charging for full nominal charge, and especially when charging/inserting current far beyond the nominal capacity of the Ni and Fe battery electrodes. The charge control unit may include electronic devices to convert high voltages to the required voltage and/or to convert AC voltage to DC voltage. Especially, in an embodiment of the energy apparatus, the charge control unit configured to provide said electrical power to said functional unit during at least part of a charging time at a current that results in a potential difference between the first cell electrode and the second cell electrode selected from the range of 1.4-1.75 V. Best results in terms of battery electrochemical reversibility, gas amount production, and overall energy efficiency are obtained for applied currents that result in cell potentials in this voltage range.

For discharge best results are obtained when discharge is continued to a level preferably not lower than 1.10V for the cell. The control system, optionally in combination with the charge control unit, may also be configured to control discharging of the functional unit. Discharging may be done to an industrial object or vehicle, etc., using electrical energy. However, alternatively or additionally, the functional unit may also be discharged to an electricity grid.

Further, the charge control unit may be configured to provide said electrical power to said functional unit during at least part of a charging time at a current corresponding to the nominal battery capacity C expressed in Ah divided by minimum of 2 h, i.e. C/time with time >2 h. Such applied currents may lead to a potential difference between the first cell electrode and the second cell electrode of especially more than 1.37 V, but especially at maximum not more than 2.0 V As indicated above, the apparatus may further include thermal insulation, especially configured to keep loss of thermal energy from the functional unit low. Further, the apparatus may comprise a thermal management system, configured to keep the temperature of the unit equal to or below a predetermined maximum temperature, for instance equal to or below 95° C. Hence, in an embodiment, especially for large systems (such as 10 kW or more), the temperature of the cells is monitored and the applied charge and discharge currents may be reduced when the temperature rises above the set limit of 60° C. The thermal management system may at least partly be comprised by the control system, i.e. with respect to the controls. Further, the thermal isolation may be comprised by the thermal management system.

As indicated above, the energy apparatus may include a plurality of functional elements, configured electrically in series and or parallel, such as to increase the potential difference (in series) and or the charge (parallel) that can be provided.

In an embodiment the energy apparatus may further comprise a first connector unit for functionally coupling to a receiver to be electrically powered and the electrical connection. An example of a device may be a car (see also below). Hence, especially the apparatus may include a (n electrical) plug or a socket that can be connected to such device, which may thus especially include a socket or a plug. The first connector is especially configured to transfer electrical power from the apparatus to a receiver, such as an external device, such as a battery of such device, or to an electricity grid. The term "first connector unit" may also refer to a plurality of first connector units.

In an embodiment the energy apparatus may further comprise a second connector unit for functionally connecting a device to be provided with one or more of the first cell gas and the second cell gas with said storage system. Hence, especially the apparatus may include a (n hydrogen gas) plug or a socket, that can be connected to such device, which may thus especially include a socket or a plug. The second connector is especially configured to transfer hydrogen gas from the storage to a receiver, such as an external device, such as a hydrogen storage unit of such device, or to a gas grid. The term "second connector unit" may also refer to a plurality of second connector units. Note that the receiver for the gas is not necessarily the same as the receiver for the electricity.

Yet, in an embodiment the energy apparatus may further comprise a control system configured to control one or more of the aqueous liquid control system (if available), the storage system (if available), the pressure system (if available), and the charge control unit (if available). The control system is especially configured to control the apparatus, and the individual elements, especially the aqueous liquid control system, the storage system, the pressure system, and the charge control unit. In this way, the charging and electrolysis process may be optimized at maximum efficiency, amongst others e.g. dependent upon the availability of electrical power from an external electrical power source and the consumption of electrical power and/or hydrogen gas. Hence, in a specific embodiment of the energy apparatus, the control system is configured to control the charge control unit as function of a charge status of the functional unit and an availability of electrical power from the external electrical power source. Yet further, the control system is configured to control the charge control unit as function of a charge status of the functional unit, the status of a gas storage (full or further fillable), and an availability of electrical power from the external electrical power source. Optionally, the charge control unit may also be configured to feed electricity back into the electricity grid. The control system may especially be configured to control the operation conditions of the energy apparatus as function of electricity demand and/or gas demand from one or more clients (like the devices herein indicated) and/or availability of electricity (in the grid). Hence, the control system may amongst others control one or more of temperature, liquid flow, voltage difference, voltage sign, etc., as function of the presence of external demand and/or the type of external demand ($H_2$ and/or electricity).

An important cost determining factor in the electrolyser-battery is the nickel metal content (nickel is substantially more expensive than iron). For this reason in an embodiment the amount of $Ni(OH)_2$ material may be reduced significantly with respect to the nominal capacity of the active Fe based electrode. The Ni based cathode may thus have a capacity of e.g. 50% or of even only 10% of the Fe based electrode available in the reaction $Ni(OH)_2 + OH^- \Rightarrow NiOOH + H_2O + e^-$. Hence, in an embodiment the Ni based electrode has a capacity in the range of 80-10% of the Fe based electrode. The result is that during charge the $O_2$ evolution starts earlier while at the negative electrode still the reaction $Fe(OH)_2 + 4\ e^- \Rightarrow Fe + 4OH^-$ continues to produce Fe. The potential then increases to higher input potential earlier and more oxygen is produced. The oxygen is collected for later use during discharge when at the Ni electrode both the normal reaction $NiOOH + H + e^- \Rightarrow Ni(OH)_2$ takes place but in addition also the oxygen reduction reaction $O_2 + 2H_2O + 4\ e^- \Rightarrow 4OH^-$ takes place at the $NiOOH/Ni(OH)_2$ surface. Such reaction occurs at a somewhat lower potential than the $NiOOH + H + e^- \Rightarrow Ni(OH)_2$ reaction alone because of the lower redox potential and the overpotentials required to reduce molecular $O_2$. In this way a lower amount of Ni in the electrode is possible at the expense of some overall reduced energy efficiency. After the excess Fe is formed the production of the hydrogen follows when the Fe(OH) is depleted, but also via the continuous 'self-discharge reaction' of $Fe + 2H_2O \Rightarrow Fe(OH)_2 + H_2$ that is also present. The choice for the amount of $Ni(OH)_2$ can therefore be an economic consideration of the materials cost versus the energy efficiency. The theoretical capacity to store charge in $Ni(OH)_2$ and $Fe(OH)_2$ is 289 mAh/g and 596 mAh/g respectively. Hence, in an embodiment of the energy apparatus, the first electrode has a first capacity depending on the active mass of iron based electrode material and the second electrode has a second capacity depending on the active mass of nickel based electrode material, wherein the second capacity in the nickel electrode is less than 90% of the first capacity in the iron based electrode, while in a specific embodiment the remainder of the capacity stems from the oxygen reduction to water at this nickel based electrode.

In yet further embodiments, the energy apparatus comprises the first cell, the second cell, and a further cell, comprising either (i) a further first electrode, to provide the two or more first cell electrodes, or (ii) a further second electrode, to provide the two or more second cell electrodes. In other embodiments, such as described above, the further electrode(s) is (are) in the same cell as the first electrode or the second electrode.

Yet, in a further aspect the invention also provides a system including the energy apparatus as defined herein. Such system may further include a power source, especially an electrical power source. Hence, an embodiment comprises an energy system comprising the energy apparatus as defined herein and an external (electrical) power source. The power source may be used to charge the functional unit (i.e. to charge the battery). The apparatus may be functionally connected to a mains. However, the apparatus may also be functionally connected to a local electrical power generator. For instance, a plant generating biomass or a site where biomass is collected, may include a device for converting biomass into electricity, which can be used for powering the apparatus. Likewise, a local wind turbine, or local wind turbines, or a local photovoltaic or local photovoltaics, or a local water turbine, or local water turbines, may be used to provide electrical power to the apparatus. Of course, such external power source may also be integrated in an electrical power infrastructure, which may include various renewable and conventional power plants. Hence, in an embodiment the external power source comprises one or more of a photovoltaic cell, a wind turbine, and a water turbine. Hence, the energy apparatus may be comprises in one or more of an electrical energy grid, a $H_2$ gas grid and an $O_2$ gas grid.

The term "energy apparatus" may also refer to a plurality of "energy apparatus. Hence, in an embodiment the energy system may comprise a plurality of energy apparatus and a plurality of external power sources. These energy apparatus and external power forces are functionally associated, such as via an electricity grid. For instance, in an embodiment the energy apparatus are arranged remote from each other along highways and roads. The energy system may further include an electricity grid. Especially, the external power sources may be functionally coupled to this electricity grid. Also industry, houses, etc., may functionally be coupled to such electricity grid. Hence, in an embodiment the energy system may comprise a plurality of energy apparatus and a plurality of external power sources and an electricity grid.

Yet, in a further aspect the invention also provides a method of storing electrical energy and one or more of hydrogen ($H_2$) and oxygen ($O_2$) with a single battery electrolyser. Especially, the invention also provides a method of storing electrical energy and one or more of hydrogen ($H_2$) and oxygen ($O_2$) with the energy apparatus as defined herein, the method comprising providing the first cell aqueous liquid, the second cell aqueous liquid, and electrical power from an external power source to the functional unit thereby providing an electrically charged functional unit and one or more of hydrogen ($H_2$) and oxygen ($O_2$) stored in said storage system, wherein during at least part of a charging time the functional unit is charged at a potential difference between the first cell electrode and the second cell electrode of especially more than 1.37 V, even more especially at least 1.55 V. Even more especially, during at least part of a charging time a current is selected resulting in a potential difference between the first cell electrode and the second cell electrode that is selected from the range of 1.50-2.0 V, such as 1.55-1.75 V, like at least 1.6V. Further, especially a current density may be selected from the range of 0.001-10 A/cm².

Hence, in an embodiment during at least part of a charging time a current is selected resulting in a potential difference between the first cell electrode and the second cell electrode that is selected from the range of 1.50-2.0 V, such as 1.55-1.75 V, like at least 1.6V. Further, especially a current density may be selected from the range of 0.001-10 A/cm², such as 0.001-2 A/cm². Hence, in an embodiment the charge control unit configured to provide said electrical power to said functional unit during at least part of a charging time at a potential difference between the first cell electrode and the second cell electrode selected from the range of 1.6-2.0 V and at a current density selected from the range of 0.001-10 A/cm². Here, the area refers to the external area of the electrodes, as known in the art. For instance, an electrode having an area of 1 cm² with nickel material or iron material has an external area of 1 cm², notwithstanding the fact that the nickel material or iron material may have a very high surface area. Therefore, the term "external" area is used. Especially, the external area is defined by just the outside surface of the perforated metal pockets. Herein, instead of the term "external area" also the term "geometrical surface area" may be applied. The electrode material inside is especially nanostructured and may thus have a large surface area, e.g. in m²/g range, but here it is especially referred to a cross-sectional area (cross-section parallel to the plane of the electrode(s)). Especially, all current should also go through the separator, so that can also be used as a definition; it has about the same surface area as the external shape of the respective metal pockets, i.e. of the surface of the respective electrodes.

In yet a further embodiment, the method may comprise maintaining a first pressure in the first cell and a second pressure in the second cell at a pressure of at least 10 bar, such as at least 30 bar, or 150 bar, such as at least 200 bar, such as in the range of 10-800 bar, like 10-50 bar. Further, the method may also comprise maintaining a pressure in the storage over 1 bar, such as in the range of up to 800 bar, especially 200-800 bar. As indicated above, pressures in the first cell and second cell may be controlled independently of each other. Likewise, when both storing $H_2$ and $O_2$, the pressure of the $H_2$ and $O_2$ in the storage may be controlled independently, when desired.

In yet further embodiments of the method, the method may further comprise simultaneously discharging the energy apparatus and generating hydrogen ($H_2$), by applying one or more of (a) one or more potential differences between two or more first cell electrodes and (b) one or more potential differences between two or more second cell electrodes. Herein, the phrase "discharging the energy apparatus" may e.g. refer to discharging a couple of an iron based electrode and a nickel based electrode. Simultaneously, hydrogen and/or oxygen may be generated.

In yet further embodiments of the method, the method may further comprise applying a potential difference between a subset of first cell electrodes and/or applying a potential difference between a subset of second cell electrodes.

In specific embodiments, the method may further comprise applying a potential difference selected from the range of 0.001-0.5 V, such as 0.01-0.5 V, especially 0.1-0.5 V between at least two first cell electrodes. This may especially be done during a discharging stage where also $H_2$ is produced (and electricity is provided).

As indicated above, such voltage difference may be applied between two first electrodes of two different functional units, but such voltage difference may also be applied between two first electrodes within a functional unit. Hence, in yet further embodiments of the method, the method may comprise applying a potential difference selected from the range of 0.001-0.5 V between at least two first cell electrodes in a first cell.

Of course, there may be a plurality of first electrodes, providing two subsets with each a plurality of electrodes. In such embodiments, the method may further comprise applying a potential difference between a first subset of one or more first cell electrodes and a second subset of one or more first cell electrodes, wherein said potential difference is selected from the range of 0.001-0.5 V.

During charging, especially the temperature of the functional unit is especially kept at a temperature in the range of −10-+60° C., even more especially at a temperature of at least 10° C. To this end, the energy apparatus may also include a temperature control unit. Especially, the control unit may be configured to limit the temperature of the functional element by reducing the applied current when the temperature rises above the set limits. Further, the apparatus, especially the functional unit may include thermal isolation.

The energy apparatus and/or the energy system may in embodiments especially be used for providing one or more of electrical power, hydrogen ($H_2$) and oxygen ($O_2$) to a device. For instance, such device may be a battery (for electrical power), or a device comprising such battery, like a car. Such device may also be a hydrogen storage unit, or a device comprising such hydrogen storage unit. Further, such device may be an apparatus using oxygen in a production process. Hence, in an embodiment the energy apparatus and/or energy system are used for providing one or more of electrical power, hydrogen ($H_2$) to a motorized vehicle comprising an engine deriving its propulsion energy from one or more of a hydrogen source and an electrical power source. The vehicle may e.g. be a car requiring hydrogen, electrical power, or both. However, in other embodiments the device may be comprised by an industrial object, such as an apparatus using oxygen and/or hydrogen (chemical hydrogenation, ammonia synthesis, chemical reduction, etc.) in a production process. Such industrial object is especially configured to utilize one or more of electrical power, hydrogen and oxygen.

The energy apparatus and/or the energy system are also especially used to store electricity in the battery functionality and also in hydrogen. As such it is also used to take up excess electrical power from e.g. varying renewable electricity sources, and supplying the stored energy either as electricity or hydrogen to subsequently arising demands.

Hence, amongst others the invention provides a method of storing varying or intermittent electrical energy and one or more of hydrogen ($H_2$) and oxygen ($O_2$) with an energy apparatus, the method comprising: providing the first cell aqueous liquid, the second cell aqueous liquid, and electrical power from an external power source to the functional unit thereby providing an electrically charged functional battery unit and one or more of hydrogen ($H_2$) and oxygen ($O_2$) stored in said storage system, wherein during at least part of a charging time the functional unit is charged at a potential difference between the first cell electrode and the second cell electrode of more than 1.37 V. Further, the invention provides the use of the apparatus as defined herein for simultaneously generating hydrogen ($H_2$), and possibly oxygen ($O_2$), and providing or storing electrical energy In specific embodiments, the charge control unit is configured to receive electrical power from an external electrical power source and configured to provide said electrical power to said functional unit during at least part of a charging time at a potential difference between the first cell electrode and the second cell electrode of more than the open cell potential. In yet other embodiments, the potential difference is lower than 1.48 V, such as in the range of 1.23-1.47 V, like in the range of 1.30-1.47 V.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 1a-1e schematically depict some aspects of the invention;

Figure 1A:
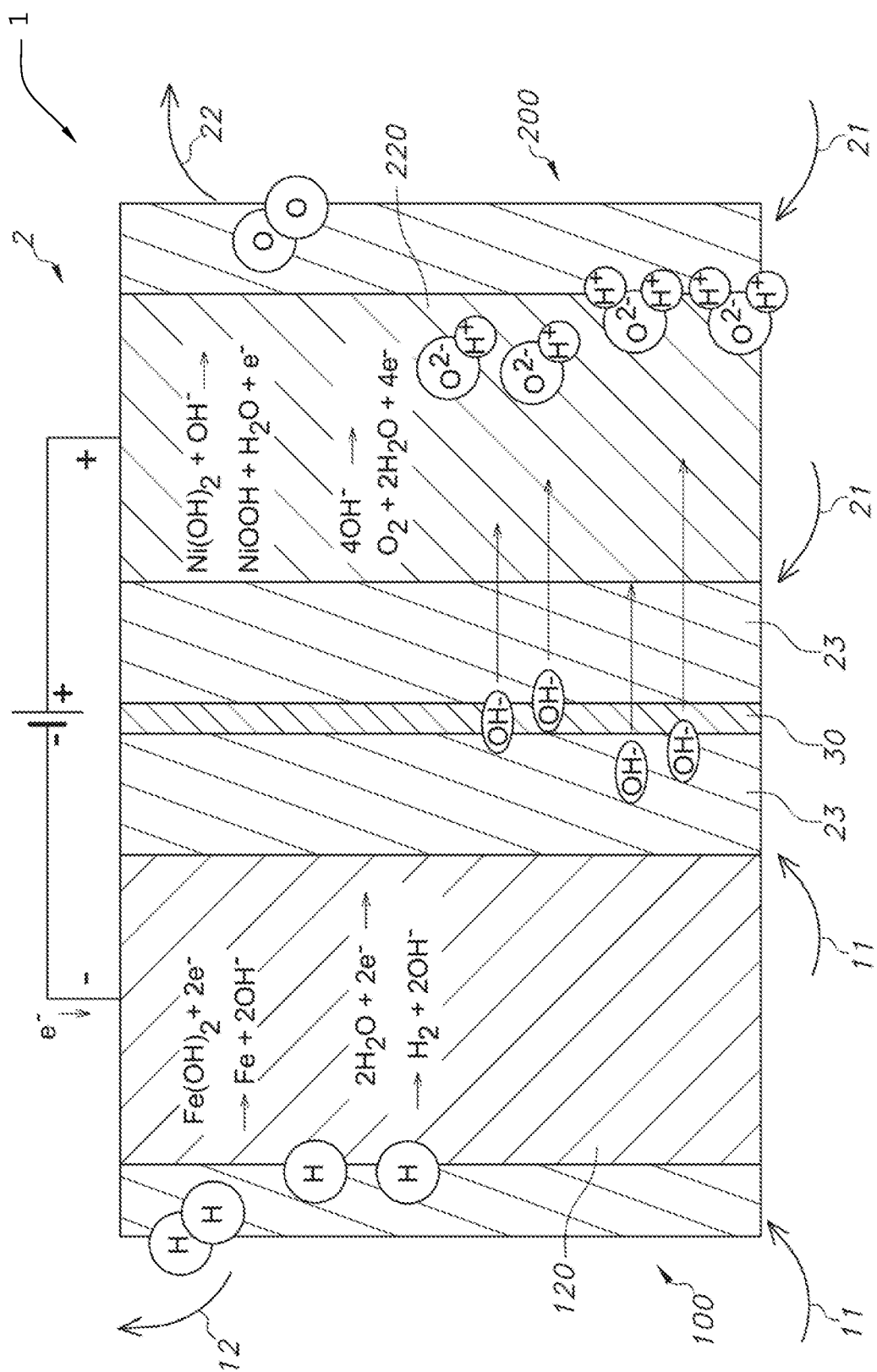
Figure 6A:
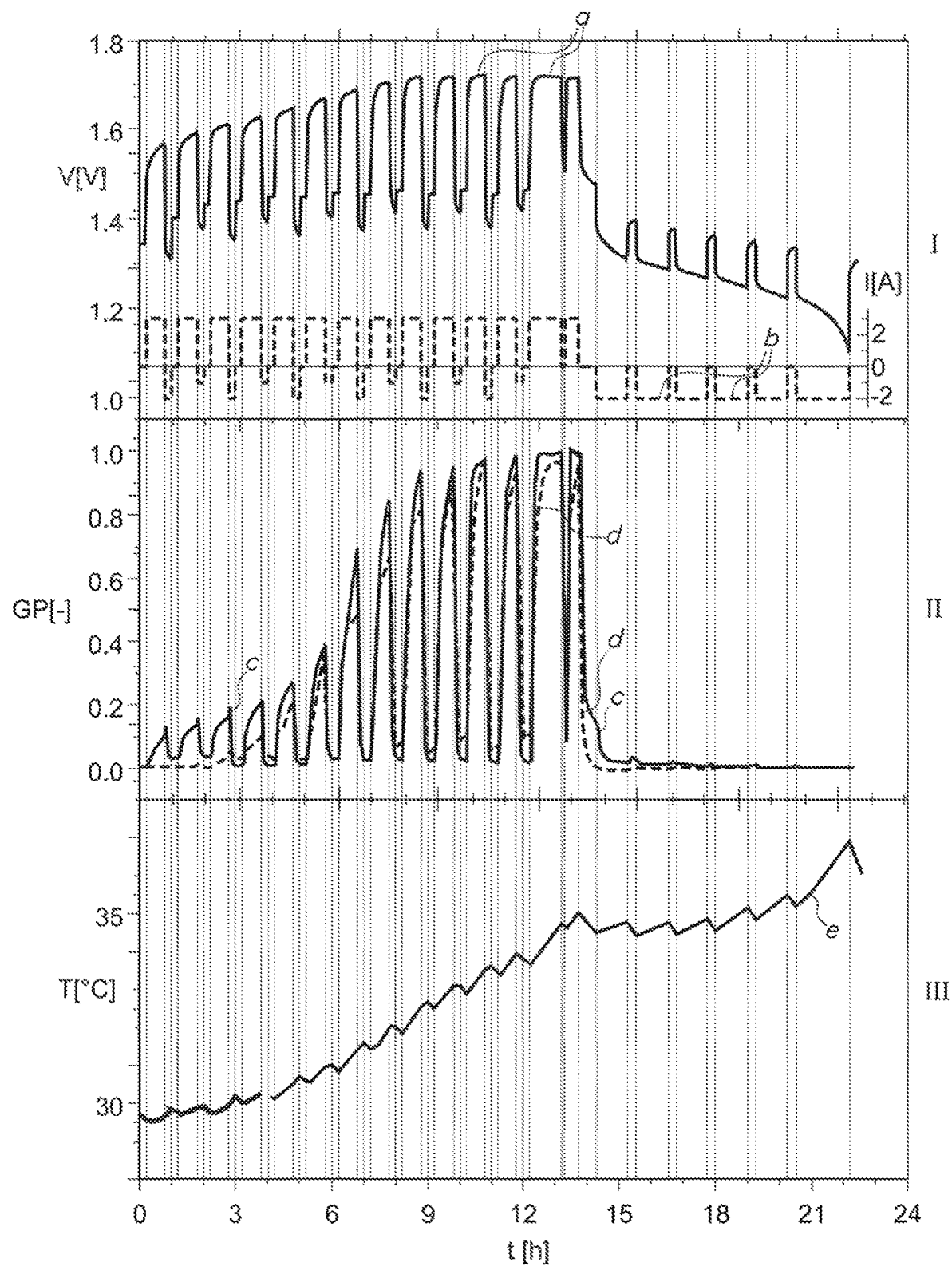

Top (I): observed potential during constant current charge insertion during increasing durations, followed by a full discharge to 1.1V; curve a indicates the voltage (left y-axis) resulting from the applied currents during the indicated times (days) on the x-axis; curve b indicates the applied currents (right axis) with charge rate C/5 and discharge rate C/10 over time (days) (same x-axis);

middle (II): resulting normalized hydrogen and oxygen evolution; curve c indicates oxygen ($O_2$); and curve d indicates hydrogen ($H_2$); "GP" (y-axis) indicates normalized gas production over time (days) (x-axis);

bottom (III): temperature (T) in ° C. development for a thermally insulated cell over time (days) (x-axis);

lowest (IV) battolyser utilization of charge in the battery and the $H_2$ production (expressed in amount of charge required to generate the $H_2$) divided by the nominal battery discharge capacity of C=10 Ah (measured at constant temperature of T=30° C.); CU/CB indicates charge utilization divided by the nominal battery discharge capacity; CI/CB indicates charge insertion divided by the nominal battery discharge capacity; curve a indicates the battery charge+$H_2$ yield; curve b indicates the $H_2$ yield; curve c indicates the battery charge; reference d indicates the flexible $H_2$ production; reference e indicates the nominal battery charge capacity;

FIG. 5:

Top (I): test of a battery-electrolyser cell for many cycles with on the x-axis the cycle numbers (CN). A cycle is counted from full discharge to full discharge with various full or partial (over/dis)charge programs in between; the y-axis indicates CC/CB which is charge divided by nominal battery discharge capacity; curve a is the charge used for electrolysis, curve b displays the inserted charge which is subsequently discharged from the battery and curve c displays the total inserted charge divided by the nominal battery discharge capacity;

middle (II): overall energy efficiency as sum of partial battery plus hydrogen gas production efficiency (see also below) (with on the x-axis the cycle numbers (CN)). Depending on charge insertion amounts the $H_2$ production ranges from much higher to much lower than the battery charge. Consistently the overall efficiency adds up to above 80 to 90%; curve d displays the overall efficiency; curve e indicates the partial battery efficiency and curve f displays the partial electrolyzer efficiency; PE/OE indicates partial and overall efficiency;

bottom (III): cumulative inserted charge and breakdown in battery charge and electrolysis, and the cumulative $H_2O$ mass to replenish the electrolyte expressed with respect to the battery capacity with on the x-axis the cycle numbers (CN)); the y-axis indicates CC/CB cumulative charge added up for the different cycles divided by the nominal battery discharge capacity; curve g indicates the cumulative inserted charge, curve h indicates the cumulative discharge from the battery, an curves i (at cycle number over about 150 slightly higher than) j indicate the added $H_2O$ mass expressed in charge equivalent and the electrolysis yield expressed in charge equivalent, respectively;

FIG. 6a (x-axis time in hours):

Top (I): sequence of intermittent charge, discharge and rest steps that shows the switching capabilities of current insertion followed by immediate current withdrawal, rests and electrolytic gas evolution; with on the y-axis the voltage (left) or the current (A) (right), and curve a indicating the voltage and curve b indicating the current;

middle (II): the measured normalized hydrogen and oxygen yields, with curve c indicating the oxygen and curve d indicating hydrogen generation, with on the y-axis the normalized gas production (GP);

bottom (III): the temperature (T in ° C.) of the thermally insulated cell following the instantaneous heating from residual overpotential losses due to Ohmic resistances, with curve e indicating the temperature curve.

Figure 6B:
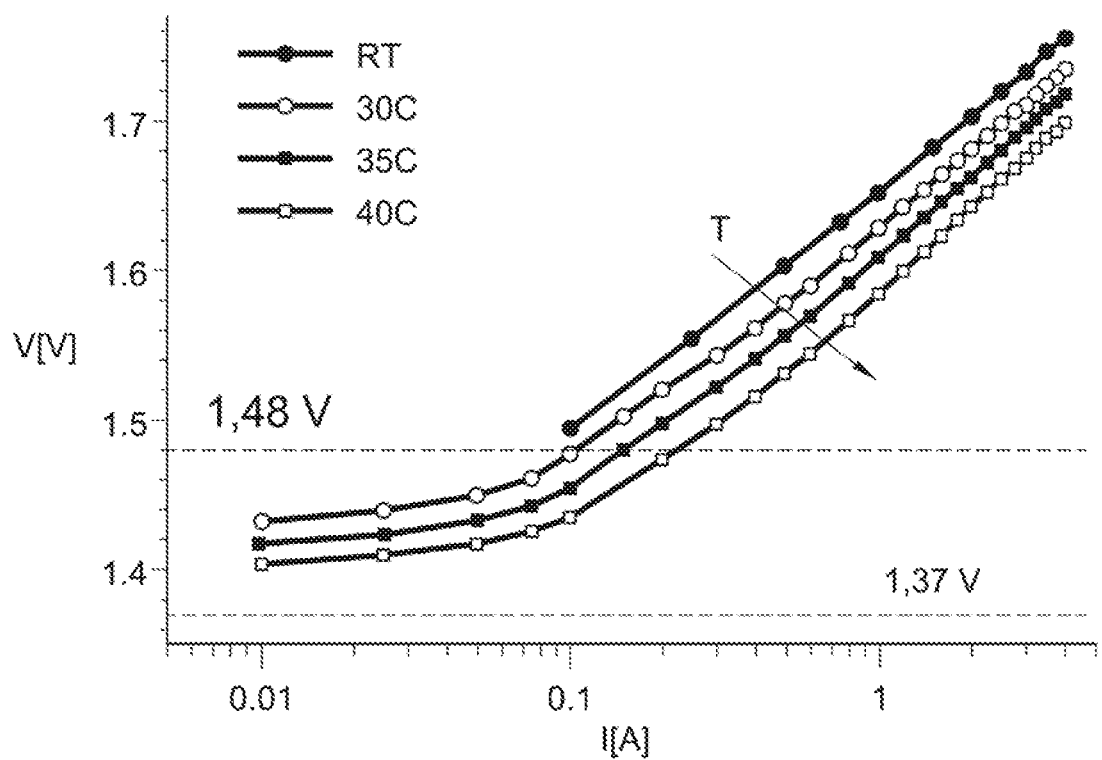

FIG. 6b: Electrolysis potential (Voltage (V) on the y-axis) dependence on applied current (x-axis) for several temperatures. The total external electrode surface area is 216 cm². At the current densities used (up to 20 mA/cm²) the Zirfon gas separation diaphragm leads at low T to a small additional overpotential and efficiency decrease of up to 3% at most. At higher T the ionic resistance decreases, mitigating such losses.

Figure 7A:
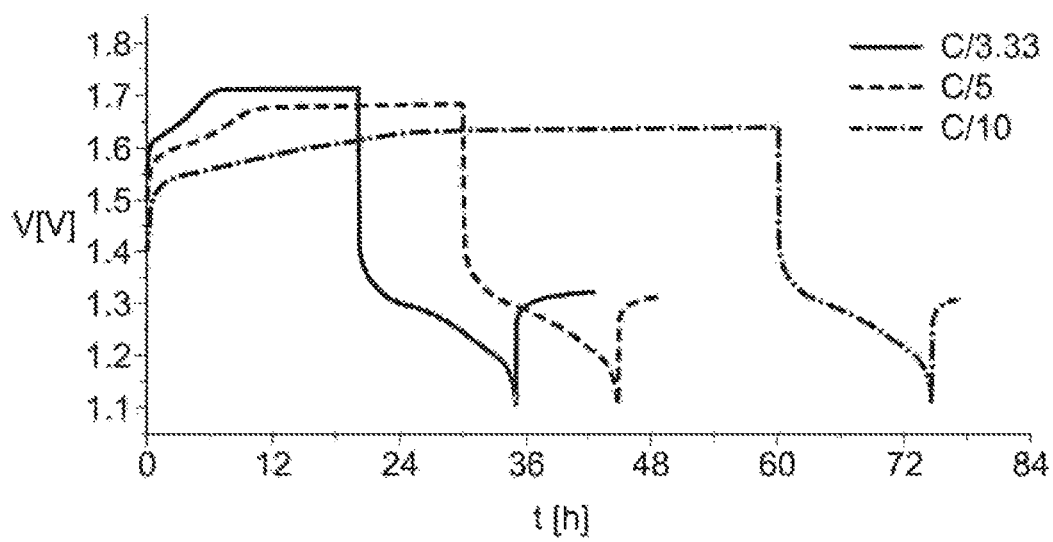
Figure 7B:
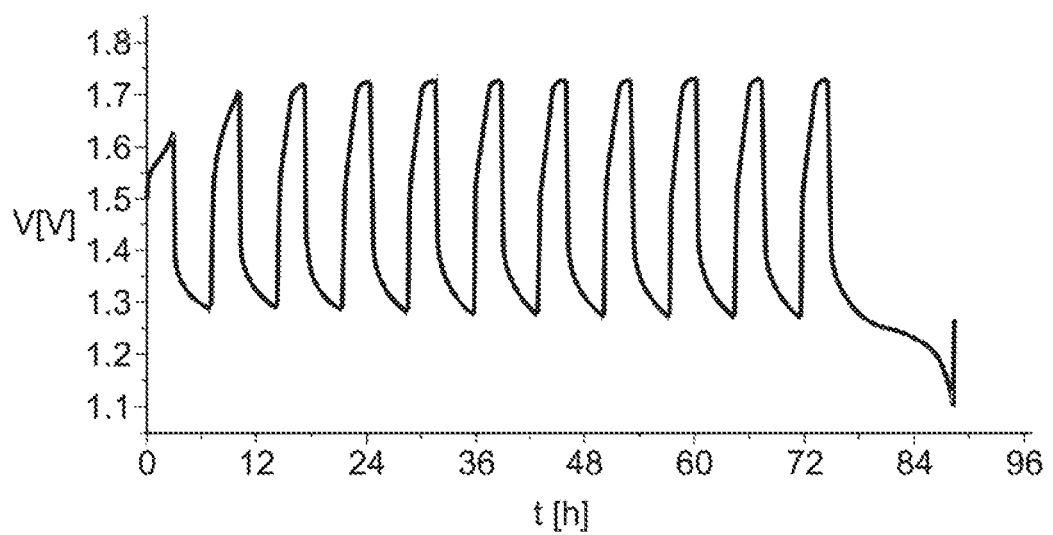
Figure 7C:
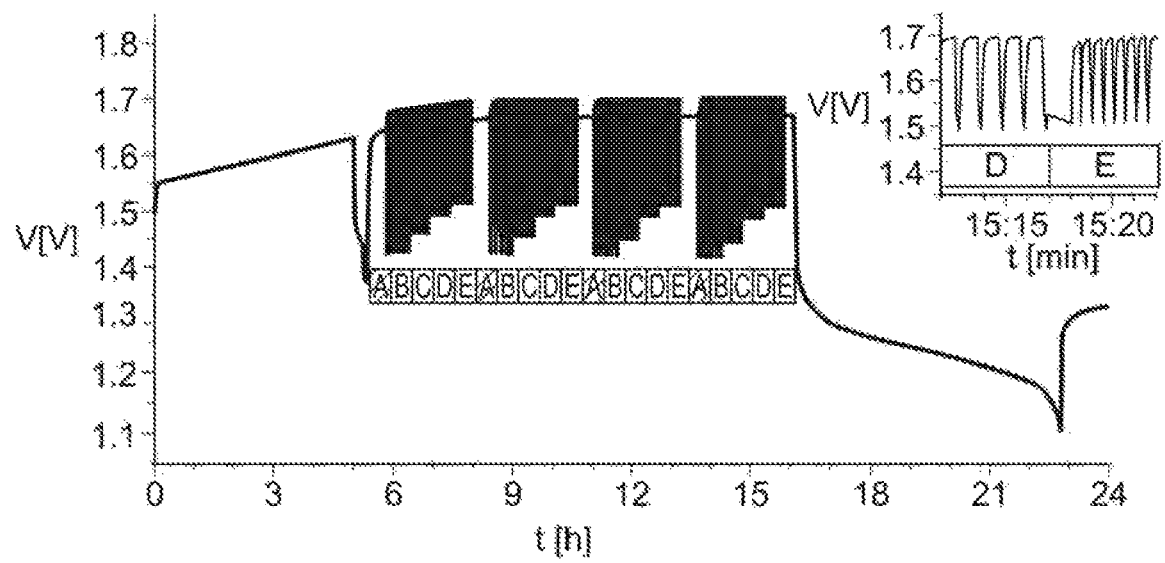
Figure 7D:
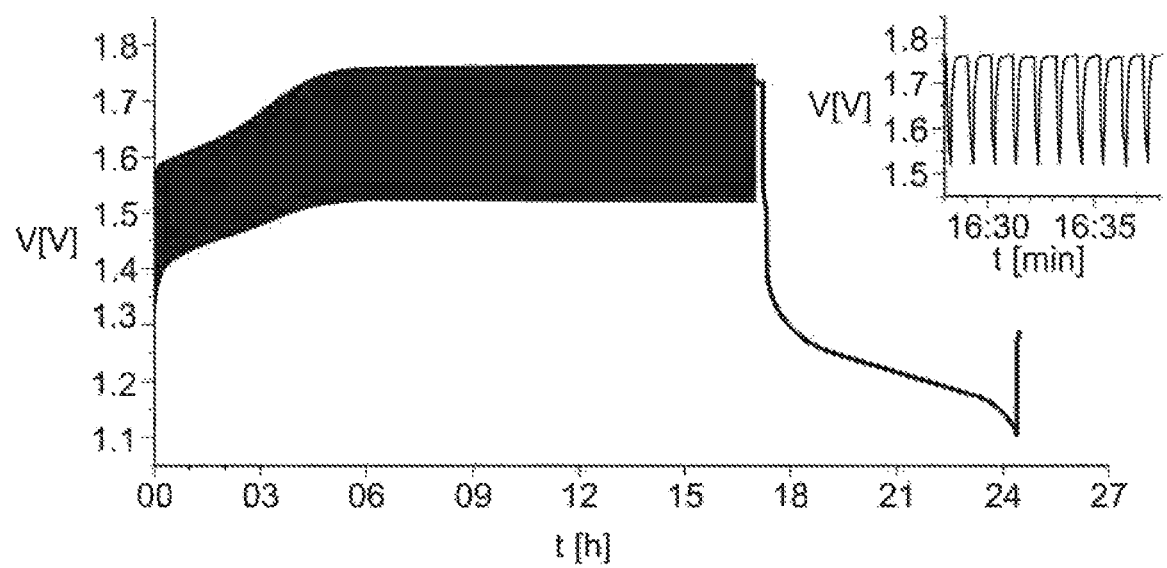
Figure 10A:
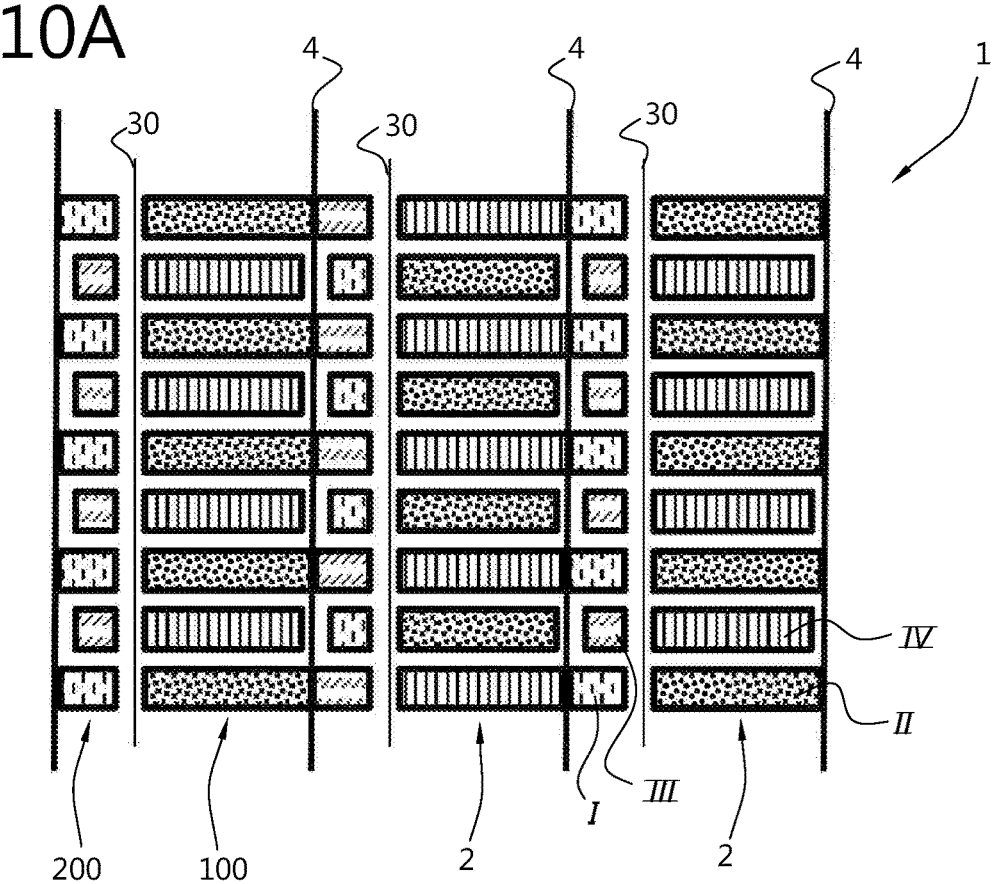
Figure 10B:
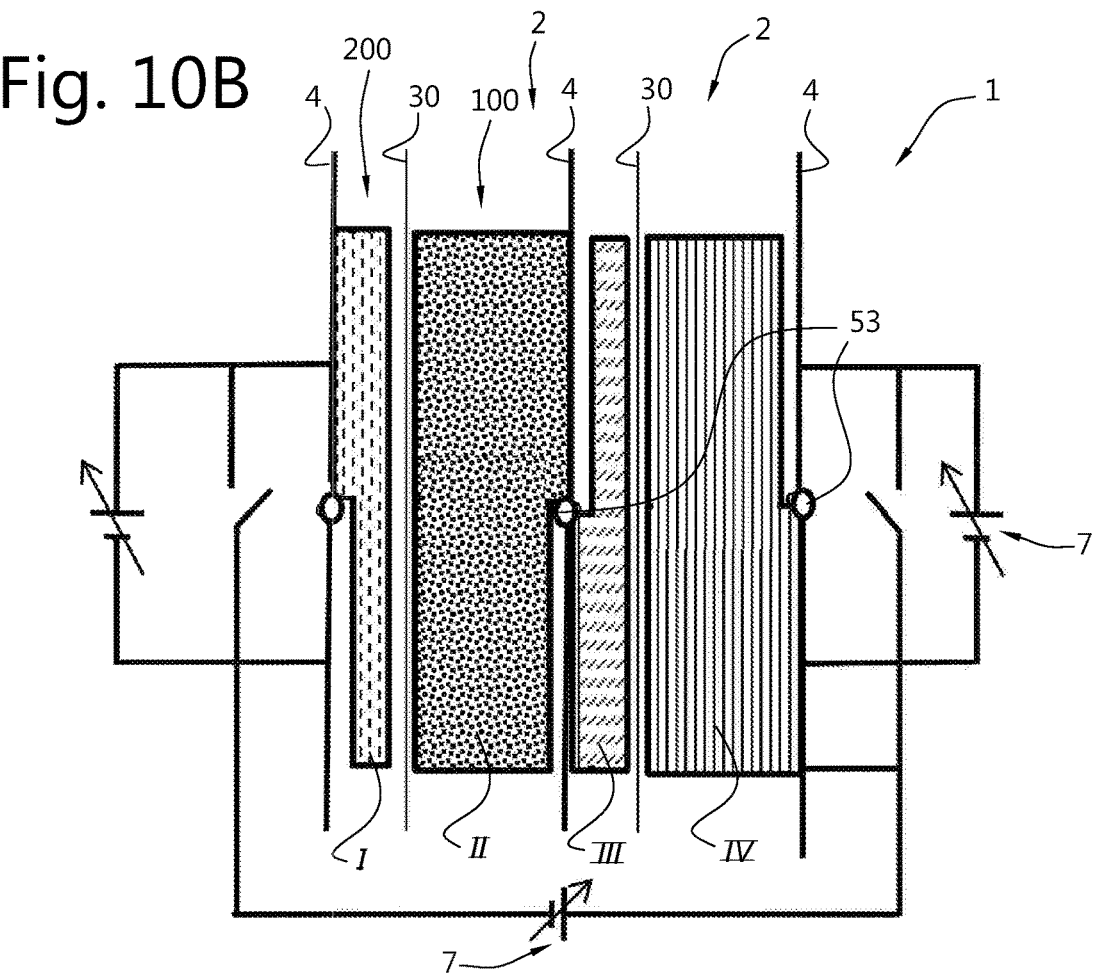
Figure 10C:
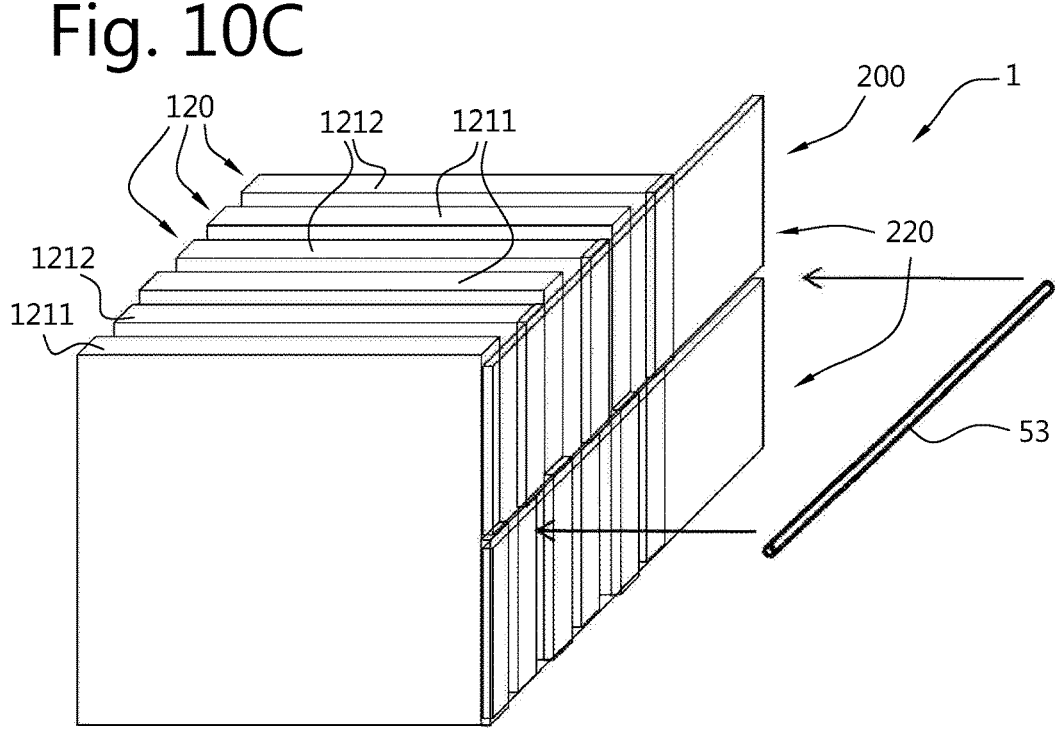
Figure 12A:
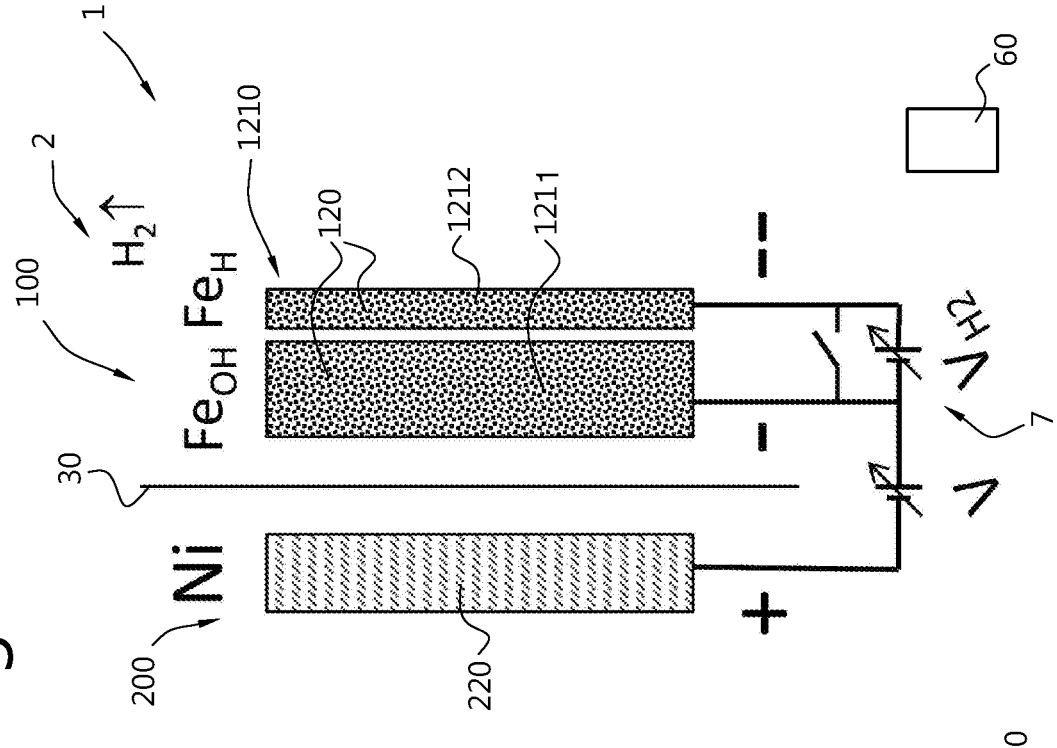
Figure 12B:
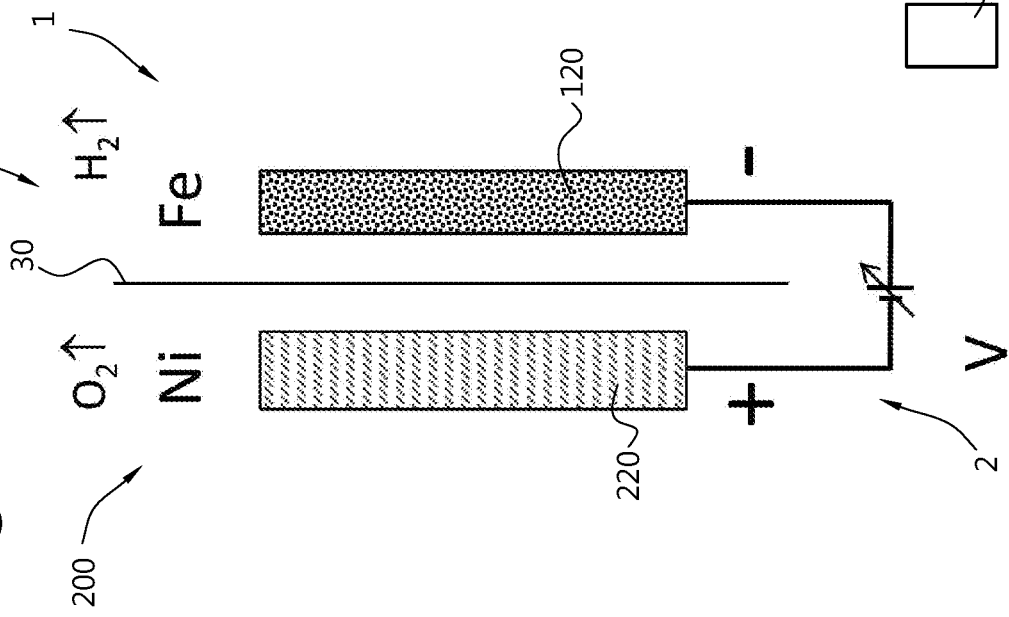
Figure 13:
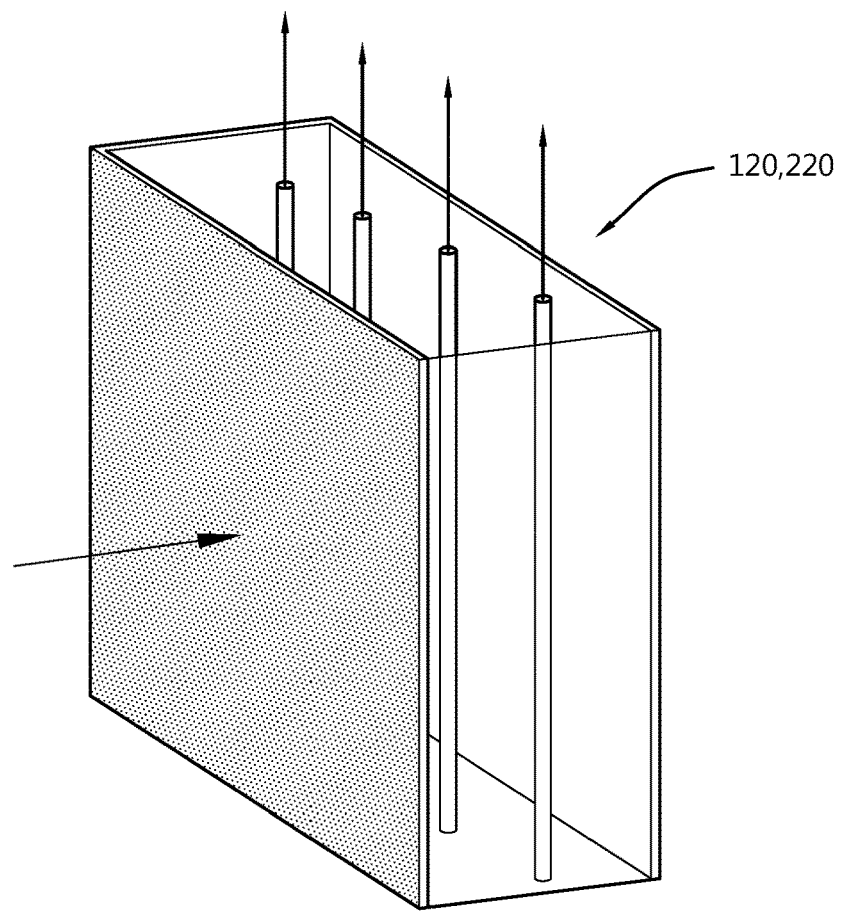
Figure 14:
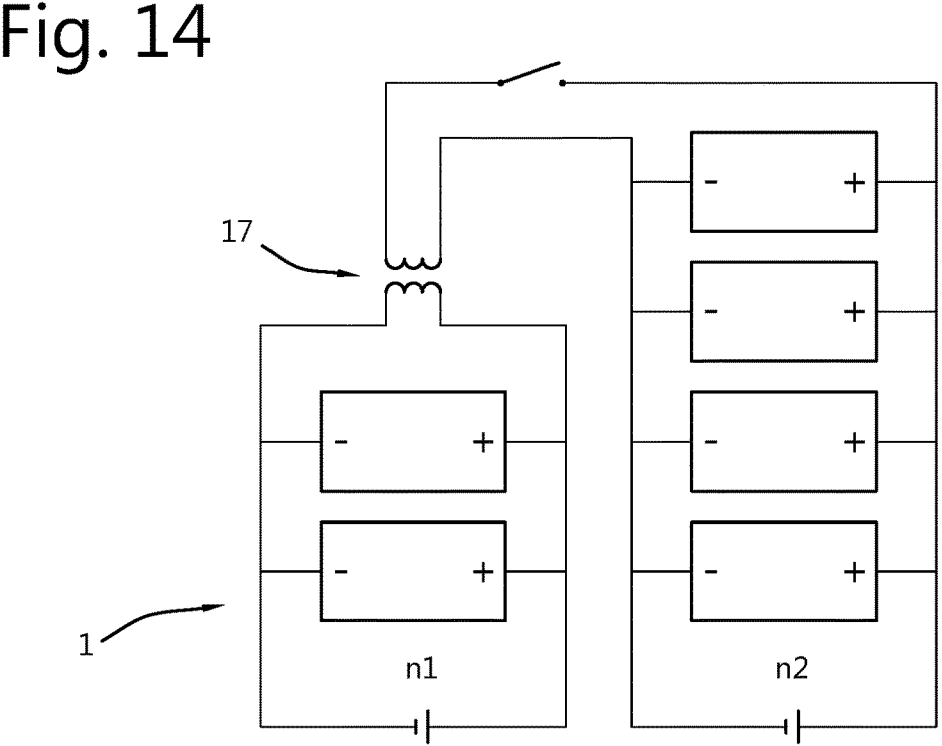
Figure 15:
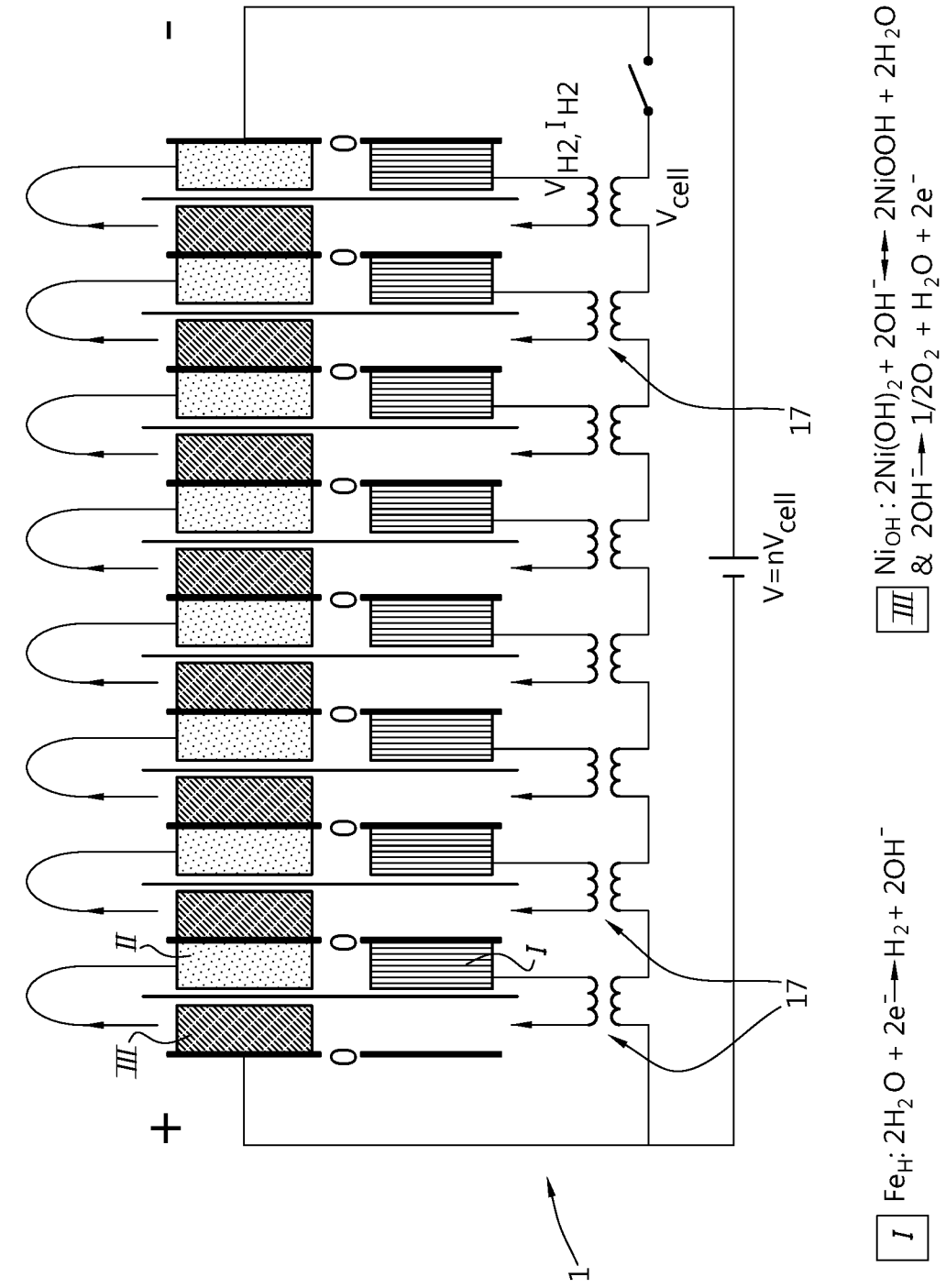

FIG. 7a: charging to 6 C at various charge rates; discharge at C/10 rate; the test time in hours (h) and the voltage on the y-axis in volt;

FIG. 7b: cycling of the charge electrode, charge rate C/3.33, discharge rate C/10. Partial charge insertion (11 times) of 0.9 C is followed by discharge (10 times) of 0.4 C; 0.4 C of 0.9 C are used to charge the battery the remaining part, 0.5 C, for electrolysis; the test time is in hours (h), the voltage is in volt (y-axis);

FIG. 7c. Switching test at charged electrode: first 5 hour charge at C/3.33 rate then switching; sequence A-E: A: 30 min charging at constant rate C/3.33; B: 5 cycles 5 min charge followed by 1 min discharge; C: 2.5 min charge followed by 30 sec discharge; D: 50 sec charge followed by 10 sec discharge; E: 25 sec charge followed by 5 sec discharge; for B-E: charge rate C/2.5 and discharge rate C/5, average rate C/3.33; one minute rest between programs A-E; the test time is in hours (h) (insert graph is in minutes), the voltage is in volt (y-axis);

FIG. 7d: Continuous fast switching test, 1000 cycles of 50 sec charge insertion (C/2.5) and 10 sec of charge withdrawal (C/5) completed by a final discharge; the test time is in hours (h) (insert is in minutes), the voltage is in volt (y-axis);

FIGS. 8a-8e schematically depict some embodiments;

FIGS. 9a-9d schematically depict some embodiments, especially of apparatus including a bipolar plate;

FIGS. 10a-10c schematically depict some embodiments, especially of apparatus including a bipolar plate;

FIGS. 11a-11d show some results;

FIGS. 12a-12b schematically depict a comparison of a "standard" battolyser (12a) and the battolyser as further (also) described herein (FIG. 12b);

FIG. 13 schematically depicts an embodiment of an electrode;

FIG. 14 schematically depicts an alternative energy apparatus;

FIG. 15 schematically depicts yet a further alternative energy appartaus;

FIG. 16 schematically a comparison of different systems. The schematic drawings are not necessarily on scale.

DETAILED DESCRIPTION OF THE EMBODIMENTS

Figure 1B:
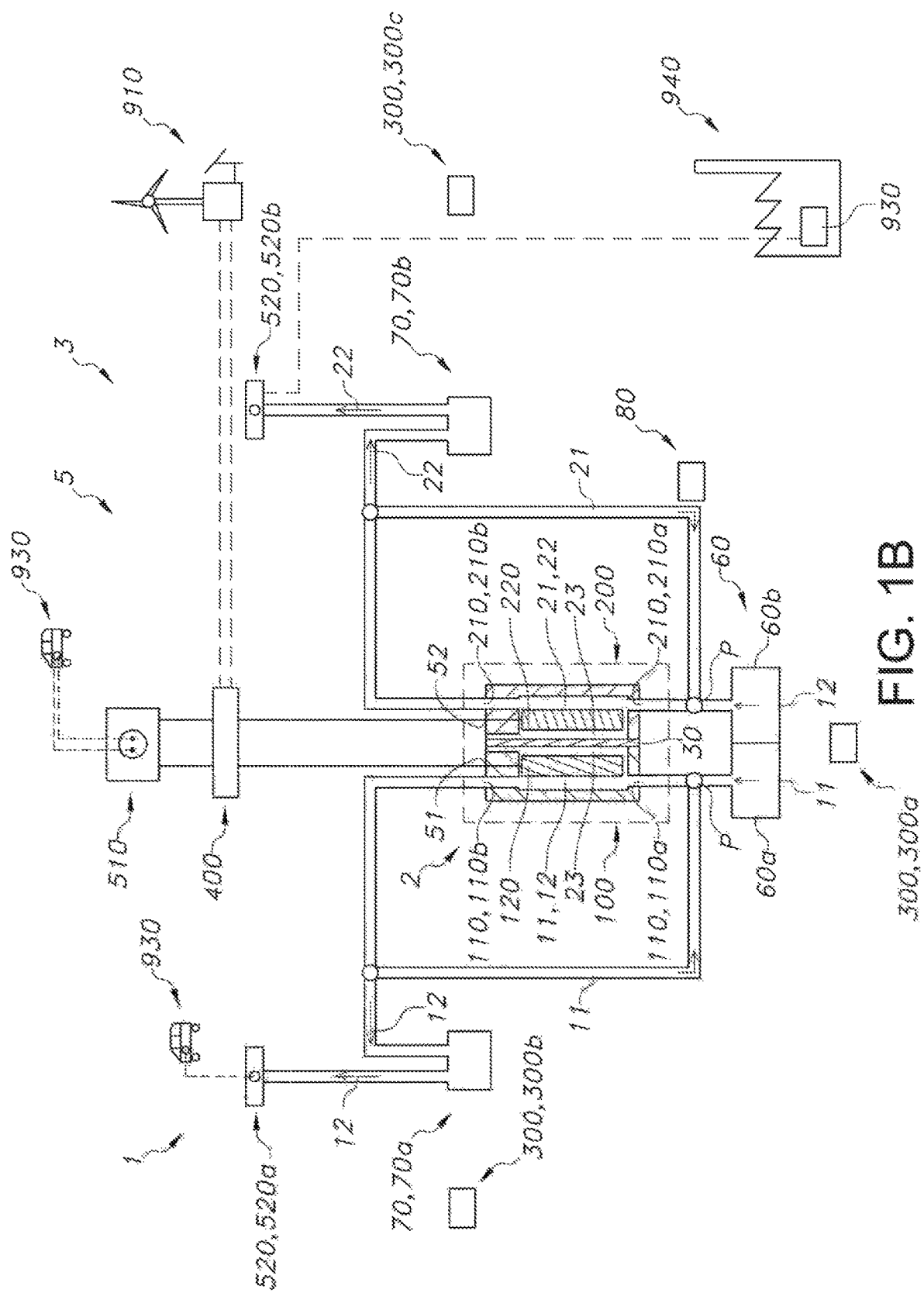

FIG. 1a schematically depicts some aspects of an embodiment of a functional unit 2. More details are shown in the embodiment of FIG. 1b. FIG. 1a (and 1b) schematically shows the functional unit 2 comprising: a first cell 100, a second cell 200, and a separator 30. The first cell 100 comprises a first cell electrode 120. Especially, the first electrode 120 comprises an iron based electrode. The second cell 200 comprises a second cell electrode 220. The second electrode 220 especially comprises a nickel based electrode. Further, the first cell 100 and the second cell 200 share the separator 30. The separator is configured to block transport of one or more of $O_2$ and $H_2$ from one cell to another while having permeability for at least one or more of $OH^-$, monovalent sodium ($Na^+$), monovalent lithium ($Li^+$) and monovalent potassium ($K^+$). As indicated above, the separator 30 especially comprises a membrane. Further, the separator 30 and the electrodes 120 and 220 may be spaced apart with a spacer, indicated with reference 23. This spacer may be configured to provide a spacing between the electrode and the separator, but also allow the water based electrolyte to come into contact with the electrode at the separator side of the electrode. Hence, first and second cell aqueous liquids 11,21 may pass at both sides of the respective electrodes 120,220.

The separator 30 and the respective electrodes 120,220 may substantially have the same surfaces areas, i.e. external surface areas, and may thereby form a stack (with especially the spacers in between). Hence, the electrodes and the separator may substantial have the same heights (as depicted here) and the same width (here the plane perpendicular to the plane of drawing).

Especially, the functional unit 2 is an integrated unit substantially entirely enclosed by pressure containment. As will be further also described below, the functional unit may comprise a plurality of first cells and second cells.

During charging, the following reaction may take place at the first electrode 120: $Fe(OH)_2 + 2e^- \Rightarrow Fe + 2OH^-$ (−0.877 V vs. SHE), followed by $2H_2O + 2e^- \Rightarrow H_2 + OH^-$ (−0.83 vs. SHE). Hence, when the battery is charged, Fe may act as a catalyst for $H_2$ formation. Further, during charging at the second electrode 220, the following reaction may take place: $Ni(OH)_2 + OH^- \Rightarrow NiOOH + H_2O + e^-$ (+0.49 V vs. SHE), followed by $4OH^- \Rightarrow O_2 + 2H_2O + 4e^-$ (0.40 vs. SHE). When the battery is charged, the NiOOH acts as $O_2$ evolution catalyst with some overpotential with respect to the $O_2$ evolution equilibrium potential.

FIG. 1a shows electrolysis reactions. When the arrows are reversed, discharge reactions are indicated. Hence, the open cell potential (for discharging) is 1.37 V. The equilibrium potential for electrolysis is 1.23 V; however, for having significant $O_2$ and $H_2$ evolution overpotentials are required with respect to the equilibrium potentials. In addition the thermo neutral potential for splitting water is 1.48V, taking into account also heat that is required if that is to be generated only from the applied potential during electrolysis. In the present invention, however, heat is also available from the overpotentials of the battery charging, which provides some additional heat. In practice during electrolysis the potential rises to at least 1.55-1.75 V. Heat from overpotentials is therefore available for the electrolysis. A remarkable fact is that the battery can be charged first although the potential energy levels are very close to the $H_2$ and $O_2$ evolution potentials.

FIG. 1b schematically depicts an embodiment of the energy apparatus 1 having an electrical energy storage functionality and an electrolysis functionality. The system 1 comprising the functional unit 2 (see also above). The first cell 100 comprises a first cell electrode 120 and one or more first cell openings 110 for a first cell aqueous liquid 11 and for a first cell gas 12. The second cell 200 comprises a second cell electrode 220 and one or more second cell openings 210 for a second cell aqueous liquid 21 and for a second cell gas 22, wherein the second electrode 220 comprises a nickel based electrode.

Further, a first electrical connection 51 in electrical connection with the first cell electrode 120, and a second electrical connection 52 in electrical connection with the second cell electrode 220, are depicted. These may be used to provide electrical contact of the electrodes 120,220 with the external of the unit 2.

The energy apparatus 1 further comprises an aqueous liquid control system 60 configured to control introduction of one or more of the first cell aqueous liquid 11 and the second cell aqueous liquid 21 into the functional unit 2. The liquid control system 60 by way of example comprises a first liquid control system 60a and a second liquid control system 60b. The former is functionally connected with a first inlet 110a of the first cell 100; the latter is functionally connected with a first inlet 210a of the second cell 200. The aqueous liquid control system 60 may include recirculation of the aqueous liquid (and also supply with fresh aqueous liquid (not shown in detail)).

More in general, reference 60 indicates a control system, that may be configured to control one or more processing parameters, such as when the energy apparatus is in use. The control system 60 may be functionally coupled with one or more sensors (not depicted) which monitor such one or more processing parameters. The control system 60 may be configured to control potential differences, $H_2$ generation, storage capacity, etc.

Yet further, the apparatus 1 comprises a storage system 70 configured to store one or more of the first cell gas 12 and the second cell gas 22 external from said functional unit 2. The storage by way of example comprises a first storage 70a and a second storage 70b. the former is functionally connected to a first outlet 110b of the first cell 100; the latter is functionally connected to a first outlet 210b of the second cell 200. Note that e.g. only the first storage 70a may be available, i.e. a storage for hydrogen gas. Separation between gas and liquid, upstream of the storage and/or downstream from the first cell 100 or the second cell 200 may be executed with a $H_2$ valve and/or a $H_2O$ dryer and an $O_2$ deoxidiser as they are known in the art, or with a $O_2$ valve and/or a $H_2O/H_2$ condenser, respectively.

The energy apparatus 1 further comprises a pressure system 300 configured to control one or more of a the pressure of the first cell gas 12 in the functional unit 2, b the pressure of the first cell gas 12 in the storage system 70, c the pressure of the second cell gas 22 in the functional unit 2, and d the pressure of the second cell gas 22 in the storage system 70. The pressure system may e.g. include different pressure systems, which may be independent from each other or may be connected. By way of example a first pressure system 300a is depicted, especially configured to provide one or more of the first liquid 11 and the second liquid 21 under pressure to the first cell 100 and second cell 200, respectively. Further, another pressure system 300b may be configured to control the pressure of the storage for the first gas 12. Yet, another pressure system 300c may be configured to control a pressure of the storage for the second gas 22. Further, the pressure system 300 may be configured to control the pressure in the first cell 100 and/or second cell 200. To this end, the pressure system may include one or more pumps, one or more valves, etc.

Yet, the apparatus in this embodiment also comprises a charge control unit 400 configured to receive electrical power from an external electrical power source (reference 910, see further below) and configured to provide said electrical power to said functional unit 2 during at least part of a charging time at a potential difference between the first cell electrode 120 and the second cell electrode 220 of especially more than 1.37 V during the first battery charge and larger than 1.48V and up to 2.0V during electrolysis when the battery is already fully charged.

Schematically depicted are also a first connector unit 510 for functionally coupling a device 930 to be electrically powered and the electrical connection 51,52, as well as a second connector unit 520 for functionally connecting a device to be provided with one or more of the first cell gas 12 and the second cell gas 22 with said storage system 70. Here, in fact two second connectors 520 are depicted, a first second connector 520a, functionally connected with the first storage 70a, and a second second connector 520b, functionally connected with the second storage 70b.

The apparatus may be controlled by a control system 80, which may be especially configured to control at least one of the aqueous liquid control system 60, the storage system 70, the pressure system 300, and the charge control unit 400, and especially all of these.

FIG. 1b also schematically depicts an embodiment of an energy system 5 comprising the energy apparatus 1 and an external power source 910, here by way of example comprising a wind turbine and a photovoltaic electricity generation source. The apparatus 1 or energy system 5 may be used for providing one or more of electrical power, hydrogen ($H_2$) to device 930, such as a motorized vehicle comprising an engine deriving its propulsion energy from one or more of a hydrogen source and an electrical power source. Alternatively or additionally, apparatus 1 or energy system 5 may be used by an industrial object 940, comprising such device 930. Here by way of example, the industrial object uses $O_2$ for e.g. a chemical process. Hence, of course alternative or additionally, first storage 70a may also be functionally coupled to a gas grid; likewise second storage 70b may functionally be coupled to a gas grid.

FIG. 1b also indicates a return system for aqueous liquid (see also above).

FIGS. 1c-1d schematically depict embodiments wherein the apparatus 1 comprises a plurality of functional units 2, either arranged parallel (1c) or in series (1d). Also combinations of parallel and in series arrangements may be applied. Referring to FIG. 1c, wherein the units 2 are configured parallel, the units 2 may be configured in a single bath comprising the electrolyte (i.e. water comprising especially KOH), thus without a separator 4. Referring to FIG. 1d, wherein the units 2 are configured in series, it may be necessary to introduce a separator 4. This separator 4 may for instance comprise a bipolar plate, such as a nickel-coated bipolar plate. The electrolyte may contain e.g. at least 5M KOH, such as about 6 M KOH. Though separators 30 may separate the first cell 100 and second cell 200, in embodiments the electrolyte may flow from the first cell to the second cell, or vice versa, or from a first cell of a first functional unit to second cell of a second functional unit, or vice versa, etc.

An advantage of arranging the units 2 in series is that application of the electrical connections is much easier. For instance, when using bipolar plates configured between units, one may only need a first electrical connection 51 with a first cell electrode (not depicted) of first cell 100 of a first unit 2, and a second electrical connection 52 with a second cell electrode (not depicted) of second cell 100 of a last unit 2. Current may then travel through a bipolar plate 4 from one (electrode from one) unit 2 to another (electrode from another) unit 2 (see arrow through bipolar plate 4). A further advantage of the series arrangement is that battery management may be easier than in the case of parallel, as providing charge beyond full capacity of one of the cells results in the (desired) generation of $H_2$ somewhat earlier than in the other cells, without adverse effects. Discharge beyond the full capacity of an individual cell the voltage drop can be monitored not to go below 1.1V per individual cell and also $O_2$ can be made available for reduction in the electrolyte at the Ni based electrode, e.g. by inserting $O_2$ from the bottom water entrance of the cell, bubbling and diffusing into the electrode. The $O_2$ can be produced and stored during the preceding charge periods of the device.

The plurality of functional units may be configured as stacks. Especially referring to the stack in series, a construction may be provided comprising [ABACADAE]n, wherein A refers to an electrolyte and dissolved gas distribution sheet (such as shaped porous propylene), B refers to the first electrode or the second electrode, C refers to a bipolar plate, such as a Ni-coated bipolar plate, D refers to the second or the first electrode (with B≠D), E refers to a gas separation membrane, and n refers to an integer of 1 or larger. Note that equally well the stack may be defined as [CADAEABA]n or [ADAEABAC]n, etc. The whole stack may be contained in a pressure containment.

Figure 1E:
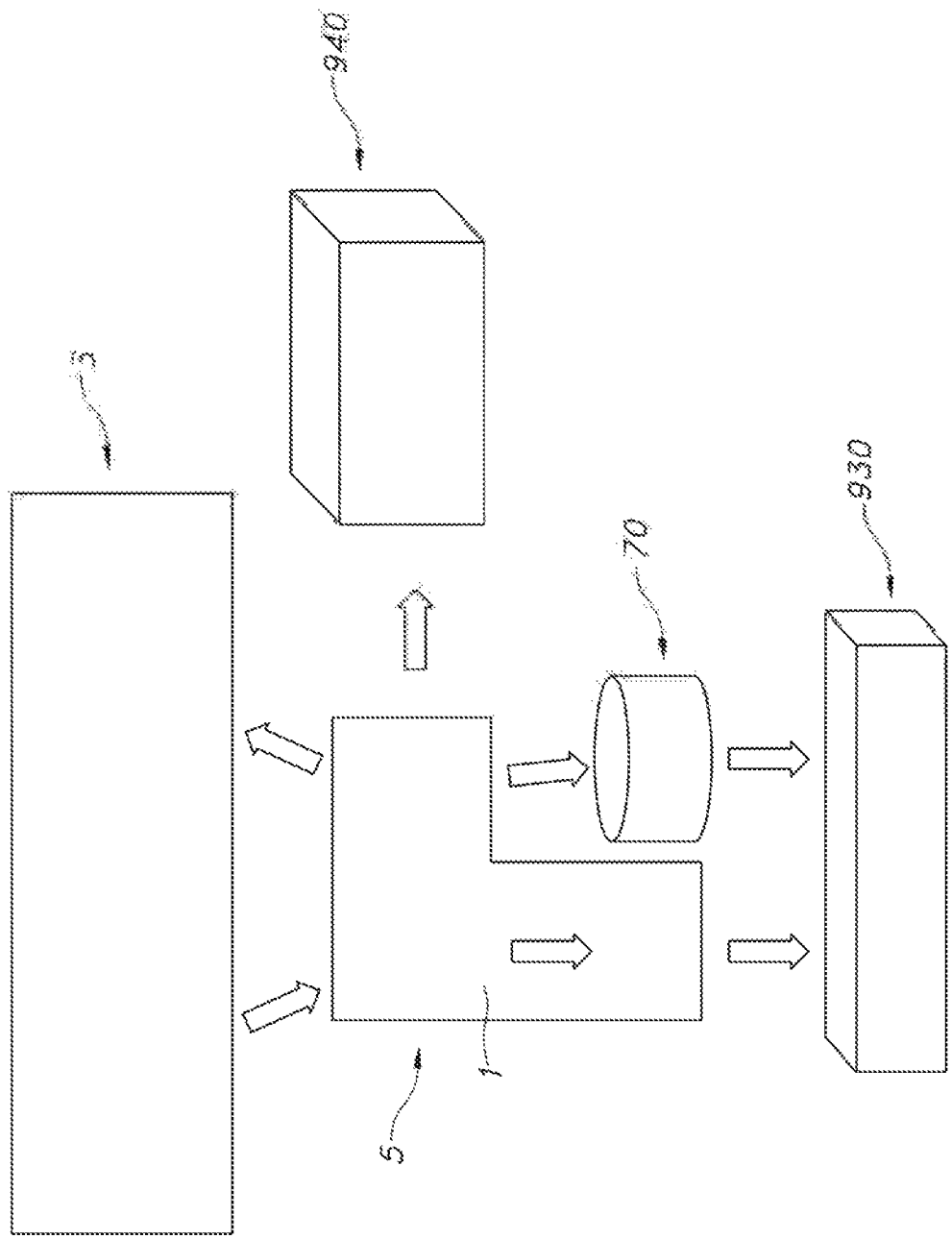

FIG. 1e schematically depicts an embodiment of an energy system 5, with an electricity grid 3, which may provide varying electricity and/or demand electricity. Electricity may be stored, indicated with e$^-$ and also one or more of $H_2$ and $O_2$ may be stored, especially at least $H_2$. This may be consumed by e.g. an industrial object 940, which may especially use $H_2$. Further, this may be used by e.g. a device 930, such as a motorized vehicle, configured to be powered by one or more of $H_2$ and electricity. Of course, one or more of $H_2$ and $O_2$ may also be transported via a (gas) grid.

If desired, part of the $O_2$ may also be reintroduced into the functional unit (during discharge)(into the second cell).

Three functional units were built. These consisted of 4 Ni(OH)$_2$ based electrodes electrically connected parallel to each other as the positive pole, with also electrically parallel connected 3 Fe(OH)$_2$ based electrodes in between the 4 Ni electrodes as the negative pole. Each electrode is made with the active material in nickel plated steel pockets with small perforations to allow the electrolyte entrance and gas release. The surface area is 30 mm×100 mm, and the complete electrode thickness 3 mm. In between the Ni and Fe electrodes the Zirfon separator is present to separate the produced gasses and to electrically separate the electrodes. The electrical insulation of the contacts is performed using polyethylene parts.

The results obtained were nearly identical for each of these three functional units. The following was realized in a ~13 Ah battery capacity battery electrolyser:

Potential during 13 Ah battery charge ~mostly around 1.52V (overpotential 1.52–1.37=0.15V, efficiency ~1.37/1.52=0.90)

Potential during 13 Ah discharge: ~mostly around 1.2V (overpotential 1.37–1.2=0.17V, efficiency ~1.2/1.37=0.88)

Battery part efficiency=0.90×0.88=0.79.

Potential during 10 Ah H$_2$ production: 1.65V (overpotential 1.65–1.48=0.17V, efficiency ~0.90)

Overall efficiency: (13 Ah×1.2+10 Ah×1.48)/(13 Ah×1.52V+10 Ah×1.65V)=0.838

(assuming that the stored H$_2$ has its full HHV=1.48 eV/H atom)

As separator, Zirfon Perl UTP 500 (Agfa) was used. Features of Zirfon Perl UTP 500 are: Permanently hydrophilic by incorporated metal oxide particles, perfectly wettable in water and most common electrolytes; No hydrophylization by surfactants needed; Lots of OH-groups at alkaline pH due to amphoteric character of ZrO$_2$; Dimensionally stable (no shrinkage effects); Very robust (reinforced with a fabric); Stable in strong alkaline (up to 6M KOH) and up to 110° C.; Low ionic resistance, enables electrolysis at high current densities; 0.3 Ω·cm$^2$ (at 30° C., in 30 wt. % KOH); Gas pressure resistance can be up to 200 bar when filled up with electrolyte; Symmetrical internal pore structure; Porosity 50±10%; Double safety by double skin layer; Pore size 0.15±0.05 µm; and thickness 500±50 µm.

The amount of hydrogen (and oxygen) produced adds up to the total weight of water lost during H$_2$ production: this indicates no other side reactions are detected.

Figure 2A:
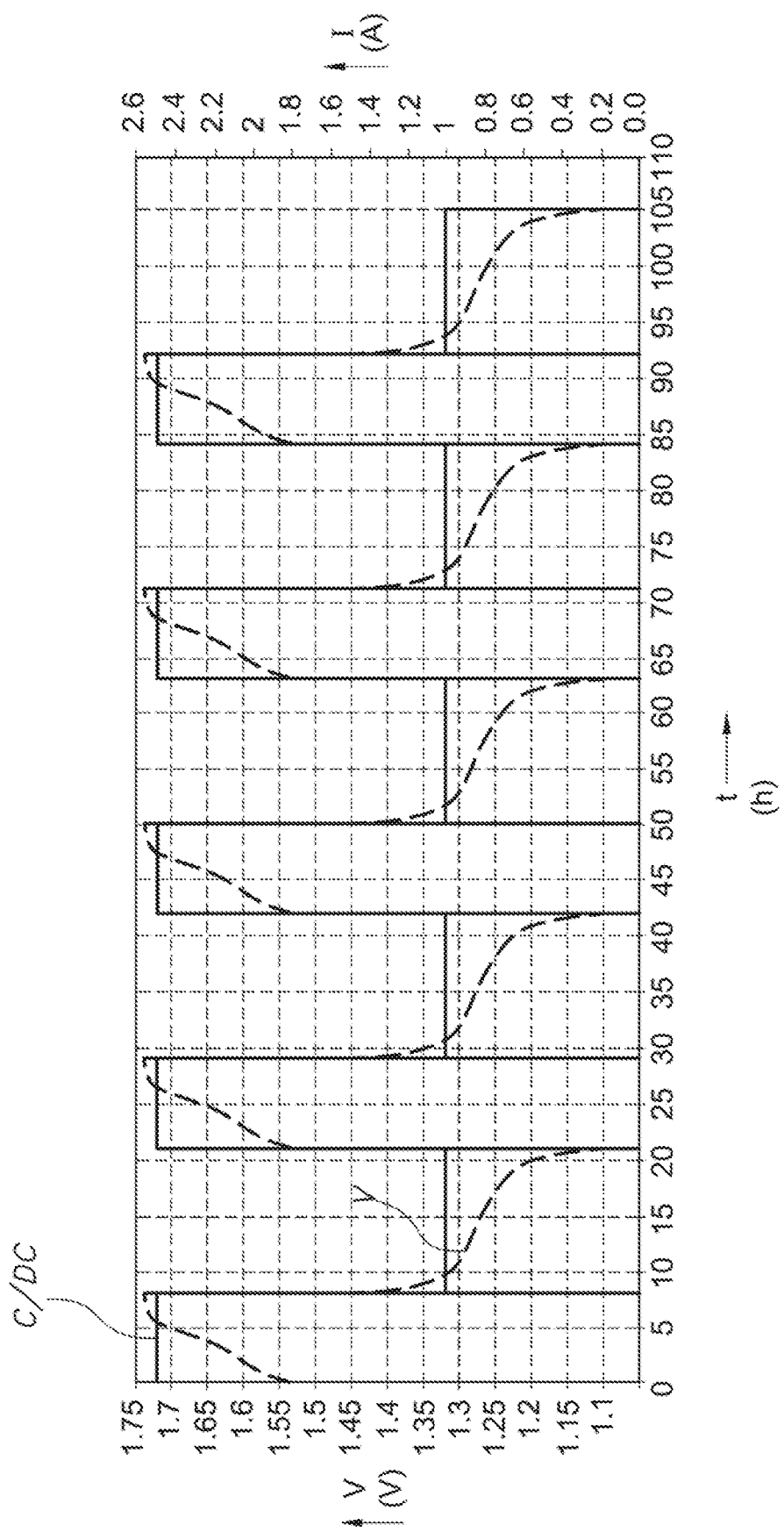
FIGS. 2a-2b show some experimental results.

FIG. 2a shows five representative cycles for using the hybrid battery-electrolyser. The C/DC curve indicates the charge and discharge current (absolute values) (I-curve, solid line); the V-curve (dashed lines) shows the resulting voltage. One can observe the following (from left to right): first ~4 hours: the applied current of 2.5 A is inserted in the device at a voltage between ~1.54 and 1.65V, resulting in mostly charging of the battery electrodes, measurements show there is only ~10% of the current converted into hydrogen production during this time. From hour ~4-8 there is hydrogen production while the voltage increases to <1.75V. Subsequently the current is reversed at a level of 1 A, resulting in discharge of the battery at voltages between ~1.4 and ~1.15V. Subsequently four cycles show the stability of the device and identical patterns. On the left y-axis the voltage in volt is indicated; on the right y-axis the current in ampere is indicated.

Figure 2B:
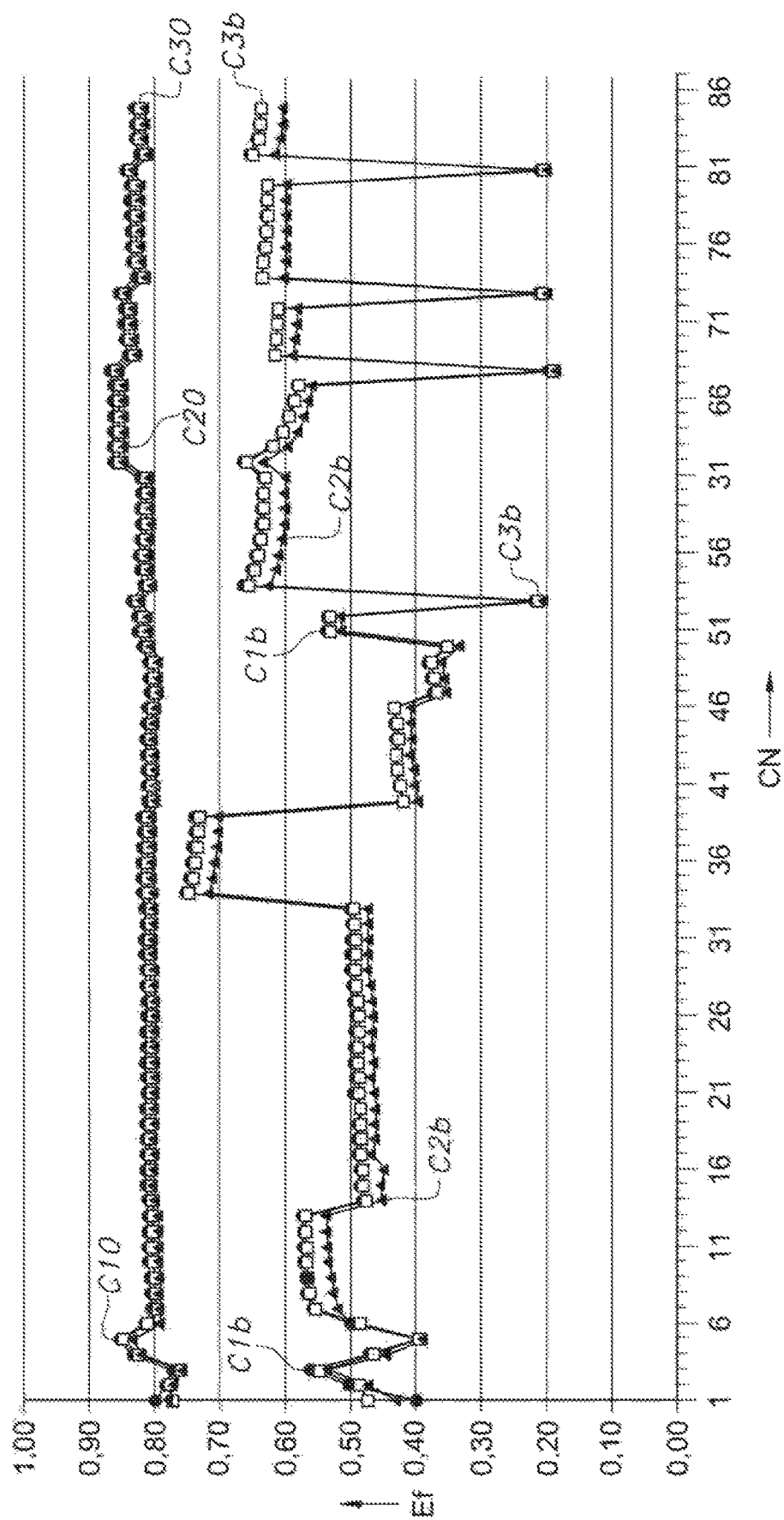

FIG. 2b shows the Ni—Fe battery discharge capacity and coulombic efficiency (on a scale of 0-1, or in fact 0.4-0.9) for three different Ni—Fe electrolyser-battery cells during different types of cycles, with different ratio's of battery storage to overall battery+hydrogen energy storage. Overall efficiency is the ratio of the battery discharge energy in Wh plus the Higher Heating Value (HHV) of the produced hydrogen gas divided by Wh inserted in the battery. The Battery efficiency considers only the electrical output in Wh of the battery divided by the total Wh inserted electrically in the device.

The overall efficiency is defined as the energy in the higher heating value of the hydrogen generated plus the electrical energy stored in the battery divided by the total input of electrical power. The battery efficiency is calculated from the average electrical output potential of the reversible battery capacity divided by the average input potential starting from the discharged state (so including the hydrogen generation). Remarkably the overall efficiency reaches >80%, which is higher than the Ni—Fe battery alone reaches (~70%) because now the hydrogen losses during battery charge are captured. The efficiency of a single alkaline electrolyser is also about 65-70%, so here too a benefit in higher electrolysis efficiency is found (due to lower required potentials in the battery electrolyser). The indications C1O, C2O and C3O indicate the overall efficiency cell results for the cells 1-3; the indications C1B, C2B and C3B indicate the battery efficiency for the three different cells.

During cycles 33-38, only a low amount of gas was made; i.e. in total less charge input, and a relative large fraction of the charge was therefore stored in the battery. During cycles 61-67, the temperatures is 40° C. there, a higher overall efficiency is found. Five cycles thereafter, the temperature is 35° C., and 8 cycles thereafter, the temperature is 30° C. For cycles with a battery efficiency indicated as about 20%, the battery was fully charged and in addition about four times more H$_2$ was produced than there is capacity in the battery.

Overpotentials for hydrogen and oxygen production were determined at different battery-electrolyser applied currents, after the battery capacity was reached fully. For currents between 0.1 A and 4 A in the test cells there is a linear relation between the required Voltage and the $^{10}$log of the current. The slope corresponds to about 155 mV per decade in current increase at 20° C. Lower overpotentials were realised at 40° C. due to lower internal resistances and faster kinetics, this corresponds to a further overall efficiency increase to ~86%.

Many more cycles were performed on three different cells, with different charge rates, total amounts of current and also with switching the charge and discharge each 15 minute. Overall efficiencies remained high above 81% also during switching, and in fact because the overpotential of charge and discharge of the battery functionality were smaller (possibly due to diminishing gradients in OH$^-$ concentration in the electrolyte) the efficiency increased slightly during switching.

Figure 3A:
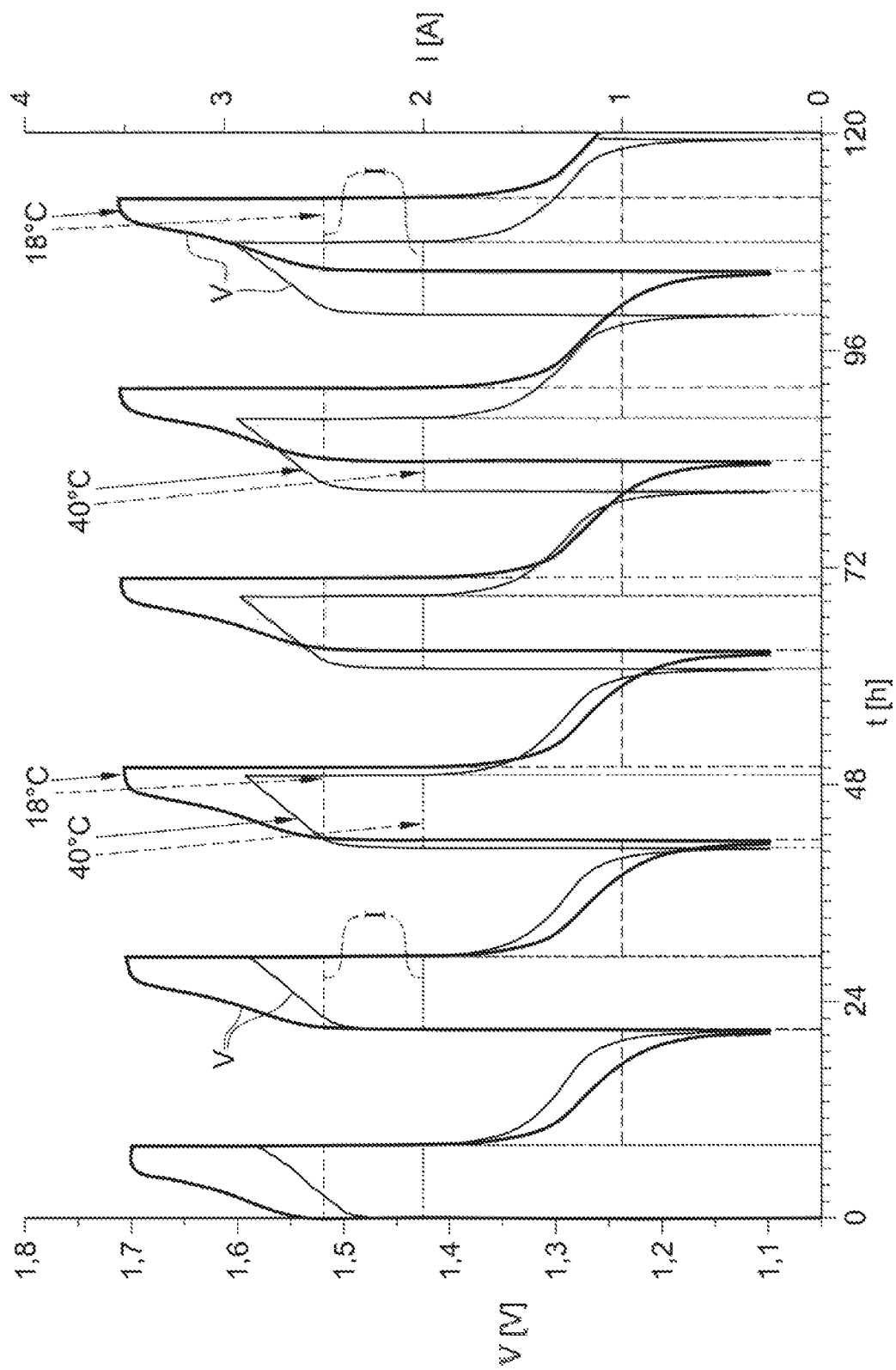
FIG. 3a-3d show some further experimental results.

FIG. 3a shows several cycles showing the cell voltages during 20 Ah charge plus hydrogen generation (with 2.5 A current, grey lines) and ~12.6 Ah discharge (1 A current) performed at 18° C. In the same graph also cycles performed at 40° C. are shown with 16 Ah charge plus hydrogen generation (current 2.0 A) and ~12.6 A discharge (current 1.0 A).

Figure 3B:
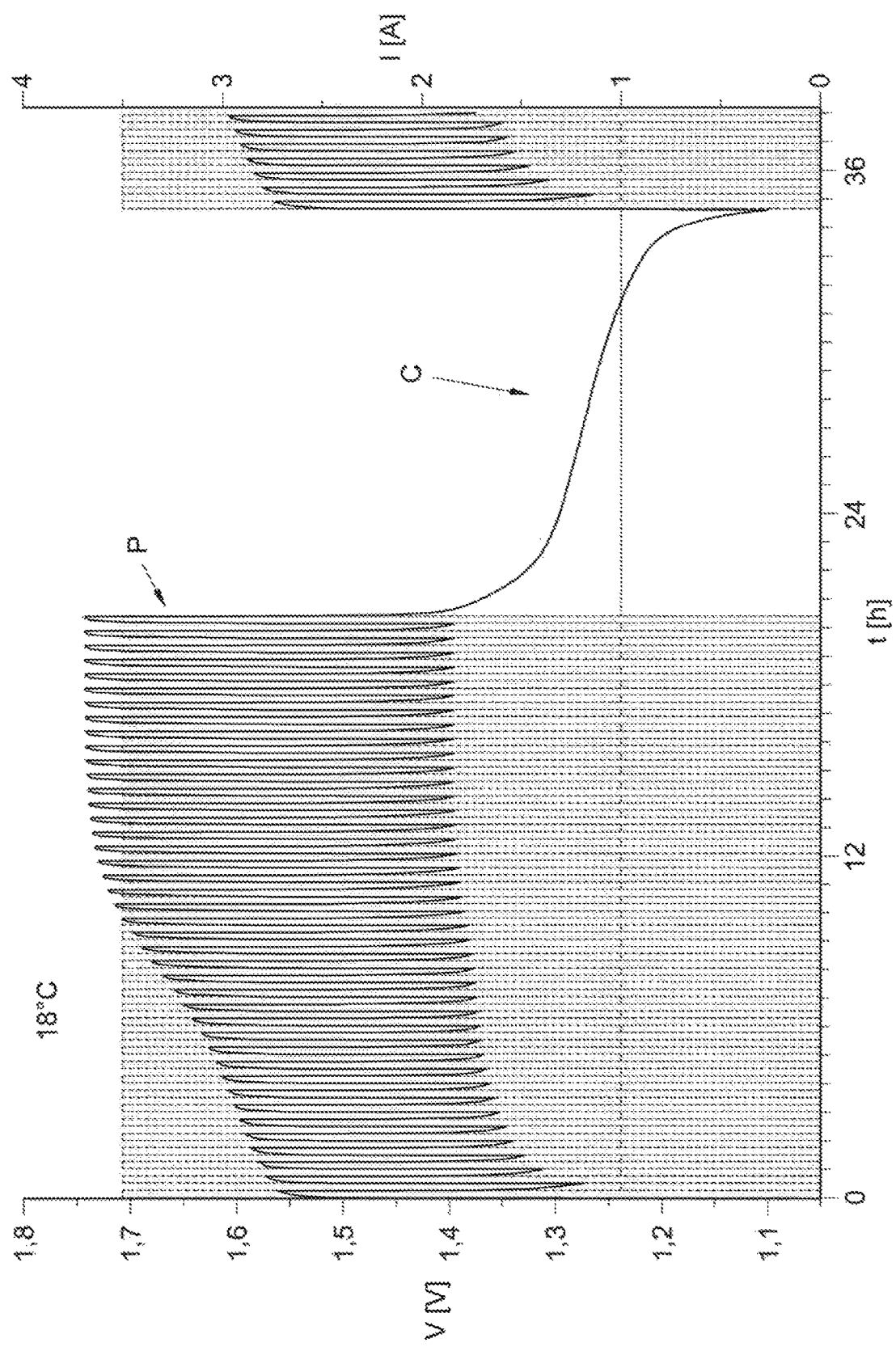

FIG. 3b shows a test with rapidly varying charging loads: pulsed insertion of charge with a current of 3.5 A, alternated with 1 A discharge, during 15 minutes. Total charge inserted: 25 Ah. Subsequently a full discharge at 1 A delivering ~14.4 Ah is obtained during about 15 minutes. The difference is almost fully converted to hydrogen (and oxygen). Note that the discharge voltages during the short pulses remain relatively high compared to the subsequent continuous discharge; this indicates a that such switching is possible at high electrical efficiency for charge and discharge, while still filling the battery capacity and generating hydrogen. (currents indicated with the dashed line, voltages are indicated with P (pulsed: 15 minutes: 4 A charge+H2; 1 A discharge); C indicates the continuous discharge at 1 A. Hence, the apparatus can be charged and discharged intermittently with quickly alternating charge/discharge periods. This may also imply that taking current from or providing current to a grid can be done very fast when demanded. Such switching capabilities were also tested at 4 A charge, 2 A discharge pulses for these devices.

Figure 3C:
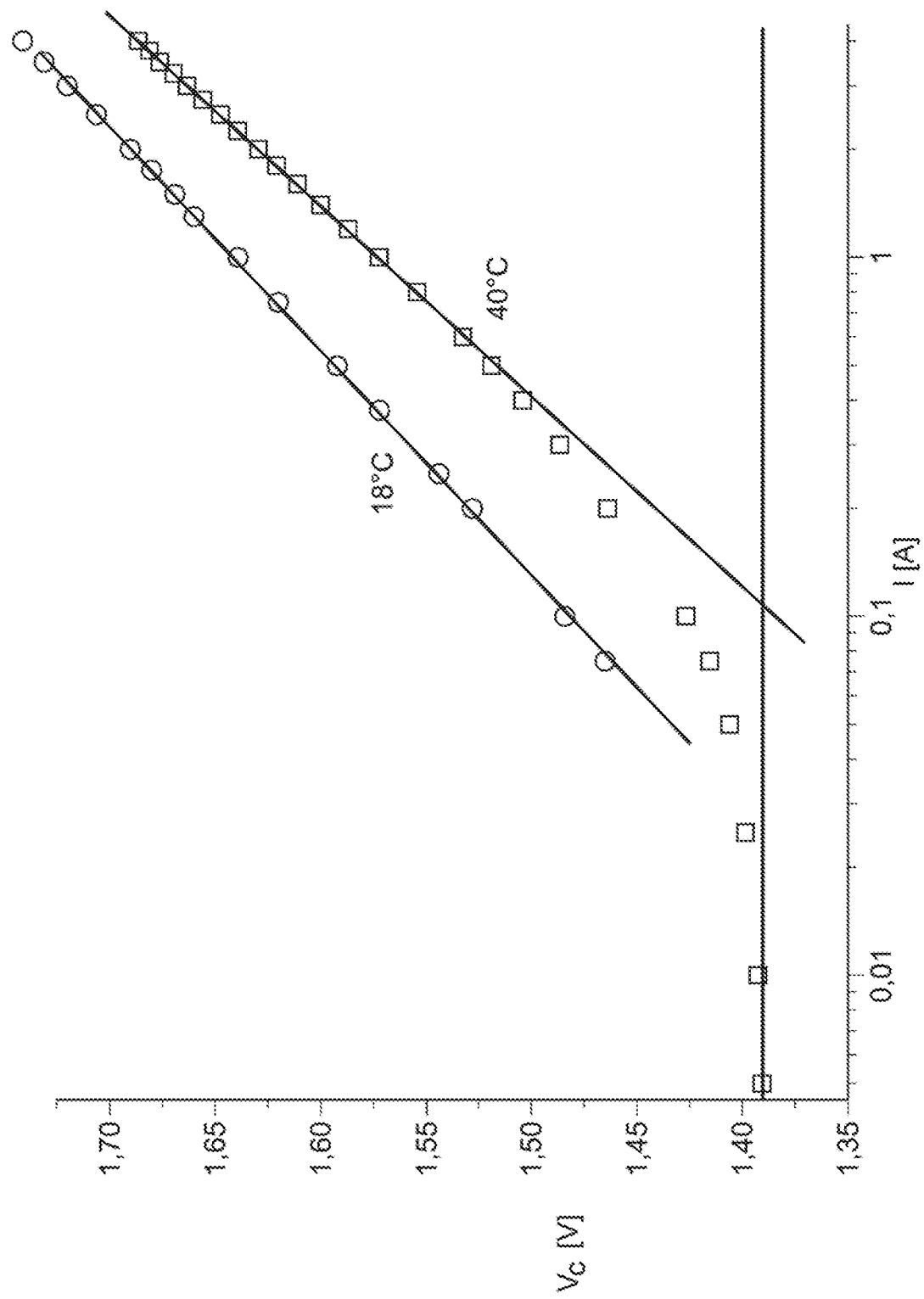

FIG. 3c shows cell voltages (Vc) of a charged battery electrolyser cell during hydrogen generation at different applied currents and at 18 and 40° C. At the higher temperature the potentials required to maintain the current are lower, indicating lower overpotentials and higher efficiency for the $H_2$ generation. The thermo neutral potential for water splitting is 1.48V; at 4 A and 40° C. an electrolytical efficiency can thus be realised of 1.48/1.68=0.96.

Figure 3D:
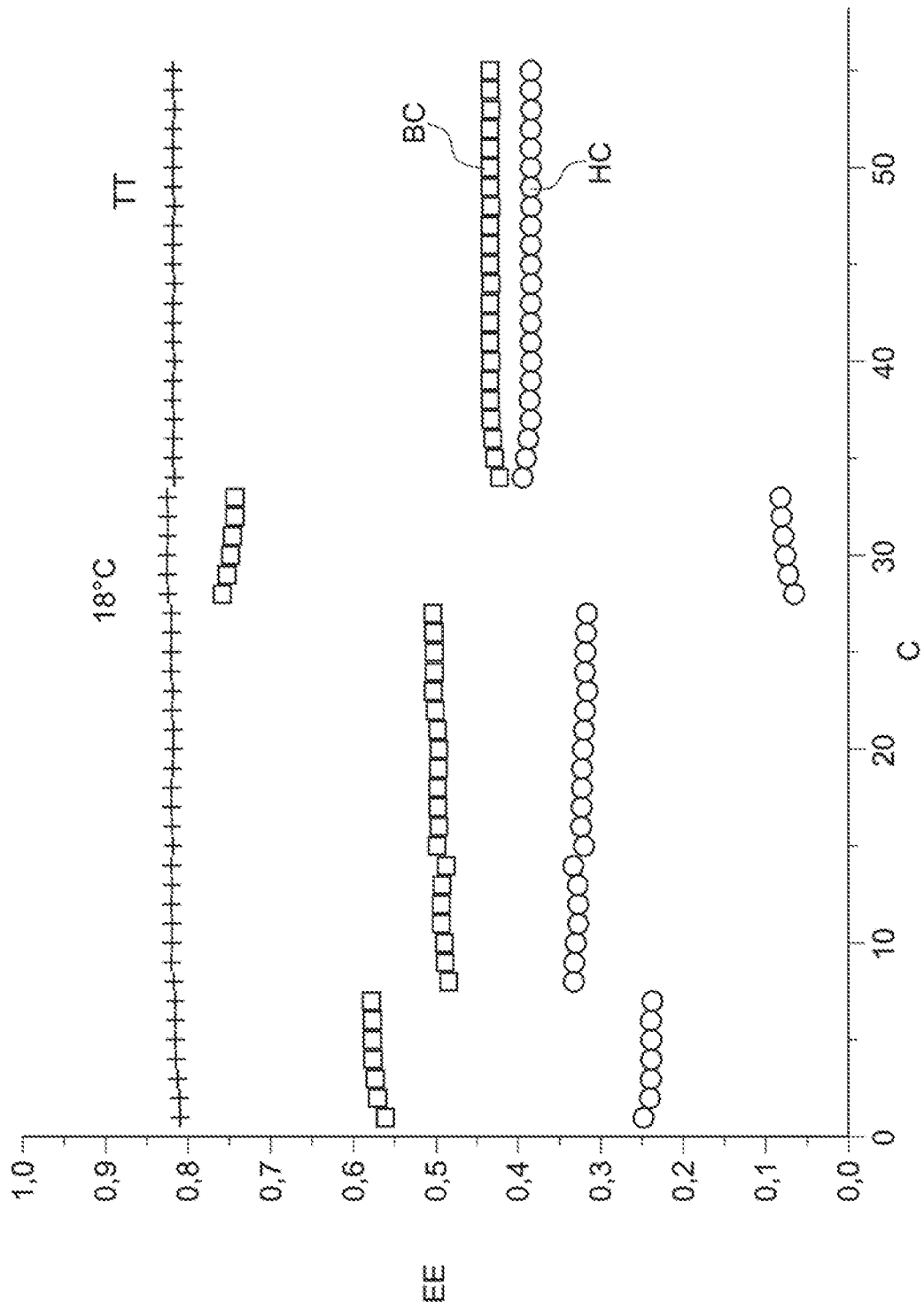

FIG. 3d shows the energy efficiency (EE) defined as the total stored energy (TT) in hydrogen gas and in the battery divided by the total electrical energy input of a single ~10 Ah cell. Each cycle (C) was performed with charge/hydrogen generation potentials below 1.75V, and discharges down to 1.1V. The differences result from different levels of battery charge compared to hydrogen production. (plus: total efficiency, square: battery contribution to the energy stored, circle: hydrogen contribution). Reference T indicates the total contribution. The squares indicate the battery contribution (BC) and the circles indicate the $H_2$ contribution (HC).

Hence, the invention provides electricity storage with an integrated alkaline Ni—Fe battery and electrolyser ("battolyser"). We have developed an integrated nickel-iron battery-electrolyser ("battolyser") that combines the durability of Ni—Fe batteries and alkaline electrolysis, while their integration leads to higher efficiency. When charged the battery electrodes consisting of nanostructured NiOOH and reduced Fe act as efficient oxygen and hydrogen evolution catalysts respectively, enabling current insertion without degradation far beyond the battery capacity. Furthermore, our results demonstrate a remarkable constant high efficiency and fast current switching capabilities in the integrated device. We anticipate the result to be a starting point for an efficient robust grid scale energy storage solution with a low cost, abundant element based, intrinsically flexible device that has close to full time applicability: as unlimited switchable power storage and hydrogen fuel and feedstock producer.

In a renewable energy future similar daily volumes of electricity storage in batteries' and in the production of hydrogen fuels may be required to come to adequate energy storage on both daily, and seasonal timescales. We show here that the integration of the Ni—Fe battery and the alkaline electrolyser leads to a device concept as sketched in FIG. 1. Short term variation in renewable power is stabilised using the battery while the hydrogen production enables long-term energy storage and 'greening' of chemical processes such as the Haber-Bosch ($NH_3$ from $N_2$ and $H_2$), Sabatier ($CH_4$ from $H_2$ and $CO_2$), and Fischer-Tropsch (alkanes from $CO/CO_2$ and $H_2$) process.

First, the integrated battolyser device is based on the Ni—Fe battery as introduced by Jungner and Edison. The Ni—Fe battery is known for its robustness during intensive deep discharges and overcharging, and its extreme longevity. The battery has a negative electrode in which $Fe(OH)_2$ is reduced to Fe upon charge: $Fe(OH)_2 + 2\ e^- \rightarrow Fe + 2OH^-$ (−0.877V vs SHE), considering only the $Fe/Fe^{2+}$ discharge plateau. The positive electrode contains $Ni(OH)_2$ that upon charge releases a proton: $Ni(OH)_2 + OH^- \rightarrow NiOOH + H_2O + e^-$ (+0.49V vs SHE). The open circuit potential (OCV) of the battery is 1.37V, which is higher than the minimum potential required to split water from the aqueous electrolyte. Ni—Fe batteries have been known for their relatively low energy efficiency (~50-70%)[7,5], their limited charge rate capabilities, and an historically reduced market potential as a result of that. In the battolyser, however, hydrogen becomes a regular product of operation improving the energy efficiency and enabling that higher charging rates with higher overpotentials and (higher) associated gas evolution can be used.

Second, the battolyser is based on alkaline electrolysers; mature technologies at industrial scales for the generation of hydrogen and oxygen at a typical efficiency of 71% that is calculated from the higher heating value (HHV) of the produced hydrogen divided by the applied electrical energy. At the positive electrode the oxygen generation takes place: $4OH^- \rightarrow O_2(g) + 2H_2O + 4e^-$ (1.23−0.059×pH vs SHE) and at the negative electrode hydrogen generation: $2H_2O + 2e^- \rightarrow H_2(g) + 2OH^-$ (0.00−0.059×pH vs SHE). The main active components are a Ni metal based positive electrode, a Ni (or Ni coated Fe) negative electrode, and a gas separator or diaphragm with alkaline electrolyte in between. The diaphragm separates the hydrogen from oxygen while transmitting the $OH^-$ ions between the electrodes. In the normal electrolyser hydrogen production at currents of 400 mA/cm$^2$ electrode surface and typical temperatures of 65-150° C. are required and precious metals like Pt or Pt—Ru can be incorporated in the negative electrode to come to high enough efficiency and production levels. The diaphragm can be a ceramic polymer composite, while the electrolyte is again a strongly alkaline KOH solution.

In the battolyser for the first time the clear synergy of materials choices of the durable Ni—Fe battery electrodes and the alkaline electrolyser are explored. For separation of hydrogen and oxygen the battolyser has a commercial diaphragm as used in alkaline electrolysers, which is known for its low resistance for ionic transport and stability up to 110° C. (Zirfon-Perl-UTP500). The battolyser is operated near room temperature and with currents matching the battery active mass and surface area, reaching up to 20 mA/cm$^2$. These same moderate currents split water efficiently at higher states of charge, without any precious metal catalysts and near RT. The moderate conditions will mean prolonged lifetime for all components.

Hence, in embodiments during charge the Ni—Fe electrodes stores electricity from the electricity source, converting the electrode materials ($Fe(OH)_2 + 2e^- \rightarrow Fe + 2OH^-$) and $Ni(OH)_2 + OH^- \rightarrow NiOOH + H_2O + e^-$, and when charged generate hydrogen ($2H_2O + 2e^- \rightarrow H_2(g) + 2OH^-$) and oxygen ($4OH^- \rightarrow O_2(g) + 2H_2O + 4e^-$) by splitting water. The diaphragm transmits $OH^-$ and separates $O_2$ and $H_2$. The battolyser may be applied as sink and source for stabilising the electricity grid, for supplying electricity as well as $H_2$ as fuel, and for $H_2$ as chemical feedstock.

Figure 4:
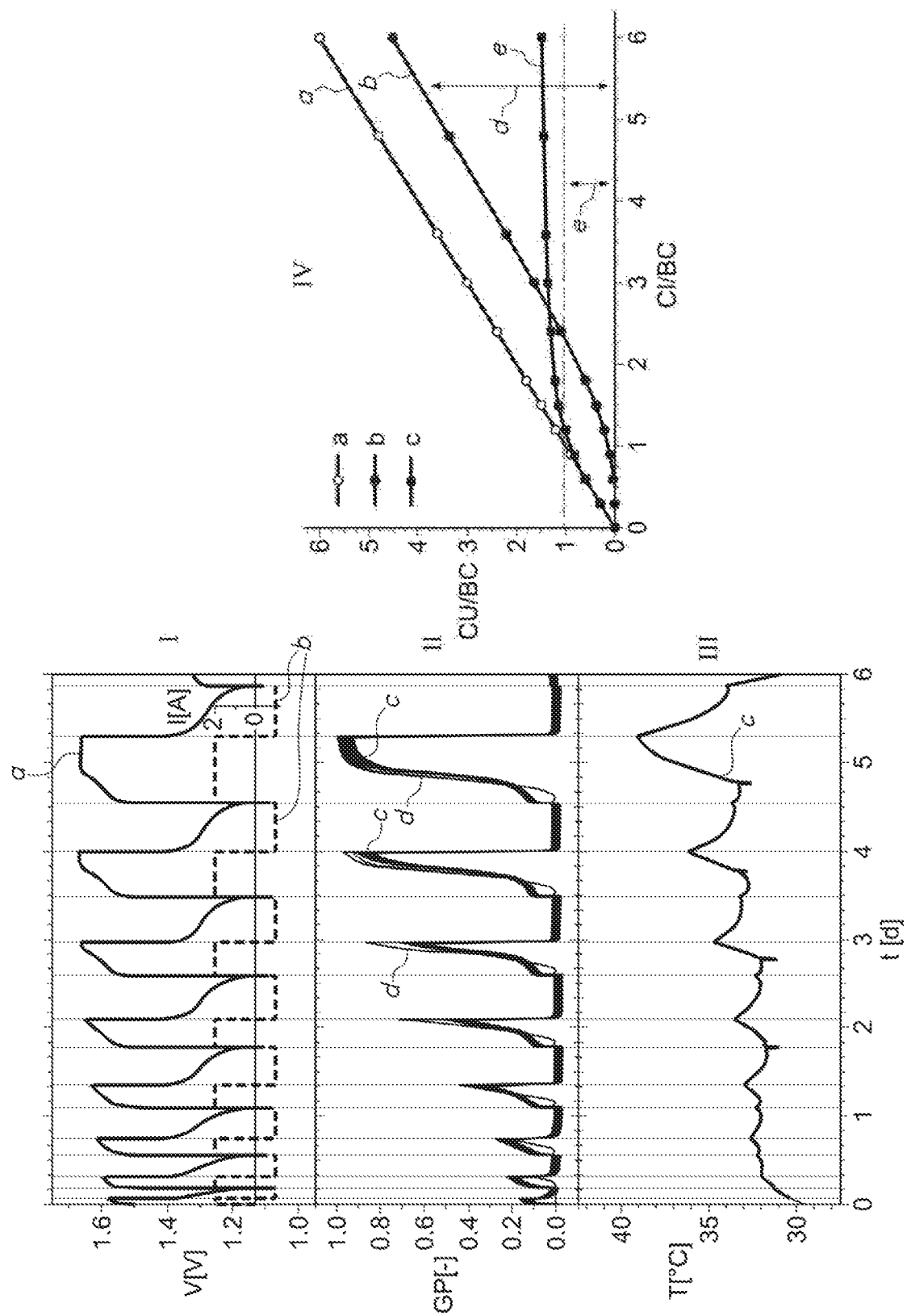
FIG. 4.

In FIG. 4 the flexible storage capacity provided by the battolyser is shown for cycles with increasing charge insertion. Indeed the increasing duration of electrical current insertion leads to increasing battery electrode charging, and when fully charged, increasing electrolytic gas production. The charge insertion period is each time followed by a full discharge of the battery electrodes, showing the battery reversibility after prolonged charge and water splitting. Hydrogen evolution starts immediately at small rates whereas no oxygen evolution is detected until charge insertion of 0.25 C (C is the nominal reversible battery discharge capacity of 10 Ah). It can further be observed that oxygen evolution catches up and surpasses hydrogen evolution at 0.75 C. Overall, stoichiometric gas evolution takes place. During discharge a fast decrease of gas evolution to zero is observed. Interestingly the gas evolution is not constant during electrolysis. We attribute this to the increasing device temperature which promotes electrolysis and self-discharge, both leading to increased gas yield (and reduced discharge capacity).

Figure 5:
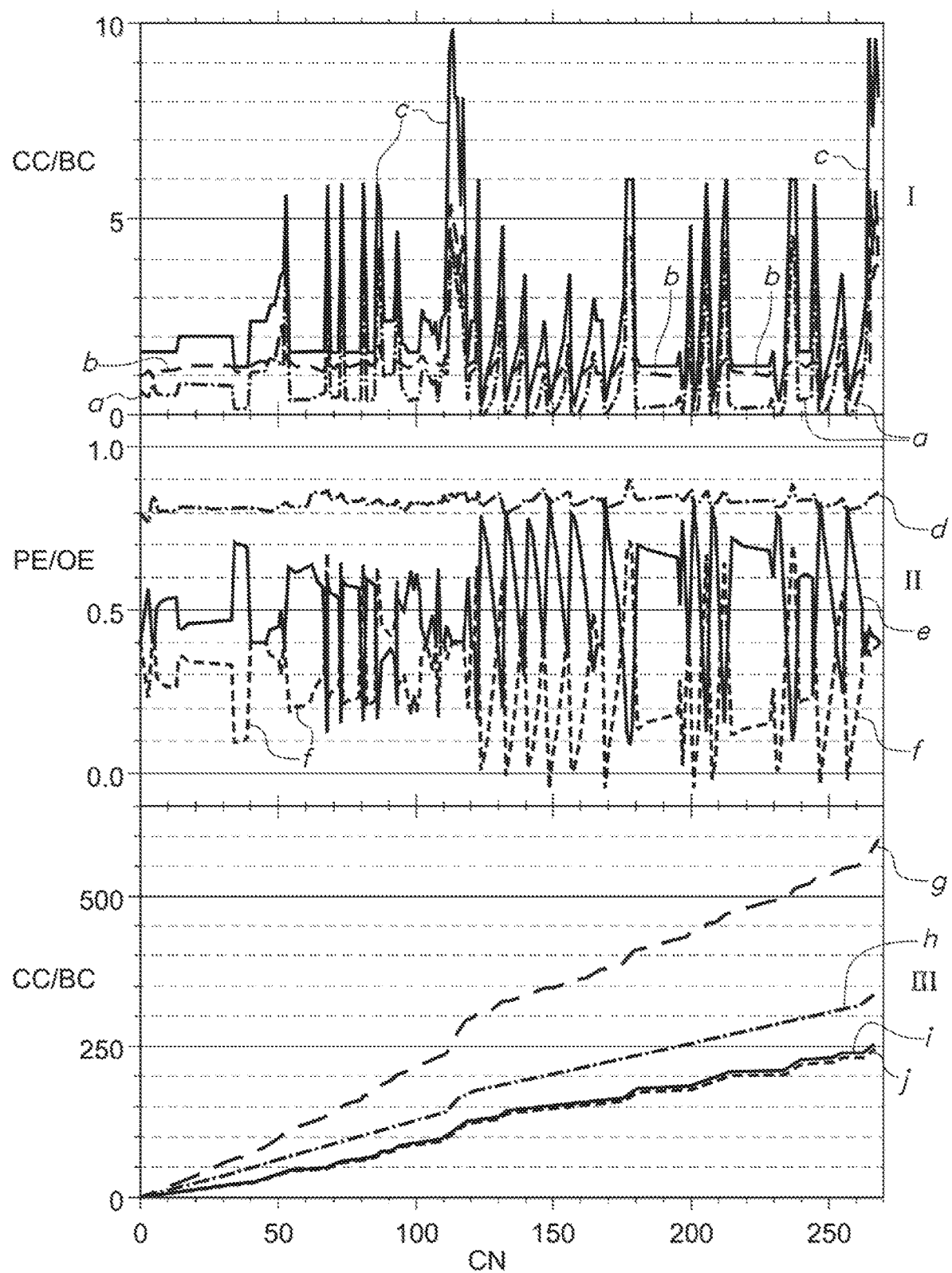

We designed a test-series to simulate various real life situations with partial and full (dis)charging, rapid switching, continuous overcharging, as well as the around the clock cycling for months ( ). The results are shown in FIG. 5. The battery capacity is not harmed by the many cycles that included overcharges up to 6 times the nominal capacity, nor by the deep discharges at the end of each cycle. This shows the very robust nature of the device. Experiments were performed in three separate cells and prove to be fully reproducible between cells. During the test period of 10 months the cell consumed 823.4 g of water, where 795.2 g (96.6%) is expected due to electrolysis, the remainder is lost by water evaporation through the exhaust valves together with the gas release. Other side reactions leading to more weight loss are not observed in trace gas analysis. The cells still operate with the initial electrolyte, only water was added, so no renewal of electrolyte took place.

The remarkable finding in FIG. 5 (middle (II)) is the overall stability of the energetic efficiency (energy stored in battery plus hydrogen divided by energy input, see below) at 80-90% over many different types of cycles, and also the stability of the reversible discharge capacities of the battery. This finding is in line with the very robust track record of both Ni—Fe batteries and alkaline electrolysers, but has never been reported before for an integrated battery-electrolyser to our knowledge.

The electrolysis potential as a function of current and temperature is shown in FIG. 6. Higher temperatures lead to lower ionic resistance and potential, increasing efficiency. The potential increases about 140 mV for a factor 10 higher current; this is a similar increase as observed for advanced alkaline electrolysers at low ~20 mA/cm2 current density. We limited the test temperature to 40° C. preventing potential long term reduced stability issues of the iron electrode. At the lowest currents, potentials below the thermoneutral potential of 1.48V, but above the open circuit potential of 1.37V of the Ni—Fe battery are reached.

As a further test of the operation of the battolyser we applied various rapidly changing charge—discharge cycles (FIGS. 6a and 7). Such test may mimic the application as a peak shaving battery and electrolyser that experiences a varying renewable electricity input (charge/electrolysis peak) interspaced with electricity demand when the renewable electricity has shortages (discharge peak). As can be seen in the FIG. 6a the battery and gas production functionalities of the cell follow the applied current changes and reversals directly without delay, which is an asset compared to e.g. conventional electrolysers. Most remarkably the average potentials during charge and discharge come closer together, which means a higher electrical efficiency $\eta_{battery}$ during these rapidly varying currents; i.e. no adverse effects of switching but rather a positive effect.

The findings of durability and flexibility are remarkable since other types of batteries will be rapidly destroyed by overcharging and/or deep discharging. Lithium ion batteries suffer from electrolyte decomposition during overcharging, while nickel-metal hydride and lead-acid batteries suffer mainly from detrimental corrosion effects during overcharge and deep discharge. The remarkable stability will be related to the fact that the Ni and Fe based electrodes are operating between the thermodynamically stable phases in their Pourbaix diagrams. Apparently during the electrolysis mode at the negative electrode one can only reduce water to $H_2$ or reactivate iron oxides (when formed during deep discharge) to become Fe, while at the positive electrode any $Ni(OH)_2$ which is oxidised to NiOOH or overcharged to γ-NiOOH will readily go back to $Ni(OH)_2$ during discharge. Such intrinsic stable points of return during charge (Fe) or discharge ($Ni(OH)_2$) enhance the stability of the electrodes during prolonged electrolysis operation and deep discharge.

Next to the materials and energy efficiency the relevance of an integrated long living battery and electrolyser can be found in economic factors. The integrated battolyser fits in the merit order of using renewable electricity: $1^{st}$ using it directly, $2^{nd}$ storing the surplus in efficient batteries for the short time, and $3^{rd}$ storing it for longer times in hydrogen fuels at the expense of conversion losses when generating electricity afterwards. The integrated battolyser combines the $2^{nd}$ and $3^{rd}$ step in the merit order and in that way has as advantage that it reaches high capacity factors and efficiency, storing in the battery, producing gas, or delivering electricity.

In an example, an integrated battery electrolyser or battolyser was made. The electrodes are separated from each other using state of the art membranes (Zirfon from Agfa; ref Agfa Specialty Products (www.agfa.com); Vermeiren, P., Moreels, J. P., Claes, A. & Beckers, H. Electrode diaphragm electrode assembly for alkaline water electrolysers. International Journal of Hydrogen Energy 34, 9305-9315 (2009)) that have a low ionic resistance in the current density regime that is used, leading to an additional overpotential of 20-30 mV between the electrodes. The limited current density likely also means a prolonged lifetime of the membranes, which is subject of further tests.

We performed intensive charge insertion and withdrawal experiments, see FIG. 7. Constant current charge insertion to 6 times the battery capacity at various rates show stable electrolysis potential (FIG. 7a). Cycling of the charged electrode indicates the stability of the cell and the reproducibility of sub-cycles (FIG. 7b). Rapidly varying charge-discharge patterns are a test mimicking the application as a peak shaving battery and electrolyser that experiences a varying renewable electricity input (charge/electrolysis peak) interspaced with electricity demand when the renewable electricity is absent (discharge peak). As can be seen in FIG. 7c the battery functionality of the cell follows the applied currents directly without delay, which is an asset compared to—for example—conventional electrolysers. The battolyser acts both as instantly responding battery sink and source of current, while it generates gas during charge insertion. The charge insertion voltage is limited by the electrolysis as expected, but the discharge potential becomes higher at shorter discharge durations; up to about a gain of 0.25 V is present between the shortest discharges and prolonged continuous discharge. In for instance the inset of FIG. 7c the current insertion happens at 1.7 V while extraction occurs at ~1.55 V. This corresponds to a ~91% efficiency during such short charge/discharge periods, which is clearly favourable for e.g. grid operation purposes. Also continuous fast switching with 1000 short cycles was tested (FIG. 7d). All these experiments are included in FIG. 6 and have no detrimental effects on the performance of the device. As a cycle is counted from full discharge to full discharge with various full or partial (over/dis)charge programs in between the cycle discharge capacity can exceed the normal battery discharge capacity. The energy efficiency $\eta_{total}$ for each charge and electrolysis and subsequent discharge cycle is calculated from the equations:

$$\eta_{total} = \eta_{battery} + \eta_{electrolyser}$$

$$\eta_{battery} = \frac{\int_{t_c}^{t_c+t_{dc}} V_{dc} I_{dc} dt}{\int_0^{t_c} V_c I_c dt}; \quad \eta_{electrolyser} = \frac{\int_0^{t_c+t_{dc}} H_{el} I_{el} dt}{\int_0^{t_c} V_c I_c dt};$$

$V_c$, $I_c$ are the applied cell voltage and current during the charge and electrolysis cycle with duration $t_c$, $V_{dc}$ and $I_{dc}$ are the discharge voltage and current during the discharge time $t_{dc}$, $I_{el}$ the current for electrolysis (and hydrogen evolution induced battery self-discharge) with an energy yield corresponding to the thermo neutral potential $H_{el}$. The $H_{el}$ equals 1.48 V at RT while $2eH_{el}$ equals the higher heating value of hydrogen of −286 kJ/mol $H_2$. $I_{el}$ results from the difference between the total current inserted in the battery electrolyser and the subsequent integrated current during discharge:

$$\int_0^{t_c} I_c dt = \int_0^{t_c+t_{dc}} I_{el} dt + \int_{t_c}^{t_c+t_{dc}} I_{dc} dt = C_{el} + C_{dc}$$

Note that the electrolysis yield also includes the gas production during (self) discharge (if any). Self-discharge is relevant since one can observe in FIG. 4a that during periods that there is no current running around 14 h test time, or the short waiting periods between 15 and 21 hours, there is some $H_2$ and $O_2$ gas production visible. Since there is no current running and $H_2$ and $O_2$ detected the possible self-discharge reactions will be Fe+$2H_2O$→Fe(OH)$_2$+$H_2$ (g) at the Fe electrode and 2NiOOH+$H_2O$→2Ni(OH)$_2$+½$O_2$ (g) at the Ni electrode. Such self-discharge does produce gas in the separate channels of the battolyser of which the energy content can be used, i.e. is not lost as in a battery. These self-discharge reactions may also play a (minor) role in the observed realisation of overall stoichiometric water splitting ($2H_2O$→$2H_2$+$O_2$) during the many hundreds of charge insertion, withdrawal and electrolysis cycles. In FIG. 5 results of different cycles are shown with the battery, electrolyser, and total efficiencies as well as the charge inserted in the battery charging and the electrolysis $C_{dc,el}$ divided by the nominal battery discharge capacity. The water amount added closely matches the amount expected for the overall water splitting.

The separate channels of hydrogen and oxygen were analysed during operation using a calibrated quantitative gas analysis system with a sensitive Hiden 3F-PIC series Quadrupolar Mass Spectrometer for the detection. There is hardly any detectible $O_2$ in the hydrogen channel, while there is a small amount of $H_2$ detected in the $O_2$ channel. This is more commonly observed in electrolysers. In view of the low ionic resistance of the membrane additional thickness can be afforded to increase the gas separation quality further where necessary.

In an embodiment, after charging the apparatus ("battery") and producing the reduced iron in the negative electrode, the aqueous liquid, especially at least the aqueous liquid in the first cell, may be at least partly, even more especially substantially entirely removed from the functional unit. This may prevent self-discharge via the reactions Fe+$2H_2O$→Fe(OH)$_2$+$H_2$(g) at the negative electrode and 2NiOOH+$H_2O$→2Ni(OH)$_2$+½$O_2$(g). Yet further, the functional unit, especially the first cell, may be filled with an inert gas, such as e.g. $N_2$. Hence, in embodiments the aqueous liquid control system 60 may also be configured to remove one or more of the first cell aqueous liquid 11 and the second cell aqueous liquid 21 from the functional unit 2. Yet further, the aqueous liquid control system 60 may also be configured to replace one or more of the first cell aqueous liquid 11 and the second cell aqueous liquid 21 from the functional unit 2 by an inert gas. Yet further, the aqueous liquid control system 60 may also be configured to replace the inert gas in one or more of the first cell and the second cell from the functional unit 2 by the first cell aqueous liquid 11 and the second cell aqueous liquid 21, respectively. Such embodiments, wherein e.g. temporarily the cell aqueous liquid is removed from the apparatus may especially be of relevance when the first electrode especially Fe comprising electrode has a larger active Fe mass (proportional to the current storage capacity expressed in [Ah]) than the second electrode, especially having a active mass at least twice as large, such as at least 10 times as large, even at least 50 times as large, as the active mass of the second electrode, such as even up to 150 times.

In yet a further embodiment, the one or more of the first cell aqueous liquid 11 and the second cell aqueous liquid 21 may further comprise a catalyst, especially a catalyst for generating water from $H_2$ and $O_2$. This may cure the problem of cross-over from gasses, which may not always completely be prevented by the separator. Especially, the second cell aqueous liquid 21 may comprise such catalyst. A suitable catalyst may e.g. be LaNi$_5$ or equivalently a modified LaNi$_5$ material as is used in nickel metal hydride batteries as anode. The catalyst may be provided as particles in a filter in the exhaust of the liquid or bound to the diaphragm (for the negative electrode compartment) or bound to the separating diaphragm (near the positive electrode, but not in electrical contact).

Alternatively or additionally, the separator may include a hollow separator with liquid within. For instance, a sandwich type of membrane may be provided between which an electrolyte may flow independently, taking away any crossed over $H_2$ or $O_2$. This may also reduce possible cross-over of gasses.

The battolyser especially needs to combine the current storage density of the Ni—Fe battery (mAh/cm$^3$), with the current density of the alkaline electrolyser (mA/cm$^2$ on the electrode and diaphragm surface).

The charge storage density is determined by the density of the materials. The energy density also depends on the potential difference of the reactions taking place at the negative and positive electrodes:

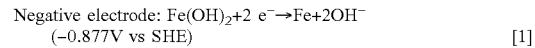

Negative electrode: Fe(OH)$_2$+2 e$^-$→Fe+2OH$^-$
(−0.877V vs SHE)             [1]

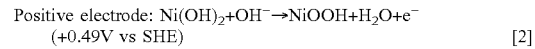

Positive electrode: Ni(OH)$_2$+OH$^-$→NiOOH+$H_2O$+e$^-$
(+0.49V vs SHE)             [2]

Open circuit potential=0.49+0.877=1.37V.

Below the table indicates charge storage densities as resulting from the battery chemical reactions. In the table β-Ni(OH)$_2$ is indicated, which is the thermodynamically most stable form of nickel hydroxide. Another structure, α-Ni(OH)$_2$, can also be formed (partially) during electrochemical cycling. This has a lower density and needs some space for expansion (the porosity of practical electrodes makes that possible). The thickness of the electrodes in the direction perpendicular to the separator determines the current density per electrode surface unit (in A/cm²) that is required to (dis-)charge the battery electrode capacity per electrode surface unit (in Ah/cm²) in a certain time.

|  | Fe(OH)$_2$ | β-Ni(OH)$_2$ |
|---|---|---|
| Density [g/cm³] | 3.4 | 4.10 |
| Molar mass [g/mol] | 89.8597 | 92.708 |
| Charge storage density [C/cm³] | 7298 | 4268 |
| Charge storage density [Ah/cm³] | 2.027 | 1.186 |
| Minimal electrode thickness* at 0.8 Ah/cm²: [cm] | 0.40 | 0.68 |
| Practical electrode thickness** at 0.8 Ah/cm²: [cm] | 1.1 | 1.8 |
| Minimal electrode thickness*** at Z Ah/cm²: [cm] | 0.40 (Z/0.8) | 0.68 (Z/0.8) |
| Practical electrode thickness at Z Ah/cm²: [cm] | 1.1 (Z/0.8) | 1.8 (Z/0.8) |

*800 mAh/cm² of the electrode surface both satisfies battery needs (a chosen capacity of 2 h charge with maximal current density of 400 mA/cm²) and electrolysis needs (400 mA/cm² continuous, the state of the art for alkaline electrolysers). In a solar powered future on average 1-2 h peak electricity storage in the battery is required plus 2-3 times longer electrolysis at peak power in summer (3-8 h charge insertion in total at day time). Discharge at night could be done at lower rates e.g. in 6-8 h.
**Literature electrode densities in practice: 37%, i.e. less than theoretical maximum, so the electrodes are porous and would become thicker accordingly. Thicknesses for 'old Edison battery' electrodes: 6 mm = 0.6 cm. The porosity can vary.
***The value Z indicates an arbitrary charge capacity in [Ah]. The equation relates thickness of electrode. Z can range from 0.01 (10 mAh very thin battery electrode) to 4 (4000 mAh very thick), and can have a larger value for the Fe than for the Ni electrode as discussed previously.

Energy storage density [Wh/cm³] of a basic anode-cathode-electrolyte configuration: this is the product of the charge storage densities times the potential between the electrodes. At OCV the 'single cell battery energy density' would be ~1.37V×0.8 Ah/(1.1+1.8+0.3 cm³)=0.343 Wh/cm³=343 Wh/L. The (1.1+1.8+0.3 cm³) is the sum of practical anode, cathode and some electrolyte plus diaphragm thicknesses. Note: this is a very high volumetric energy density for any battery, thanks to the high volumetric storage capacity of alkaline batteries and the Fe and Ni electrodes in particular.

Figure 8C:
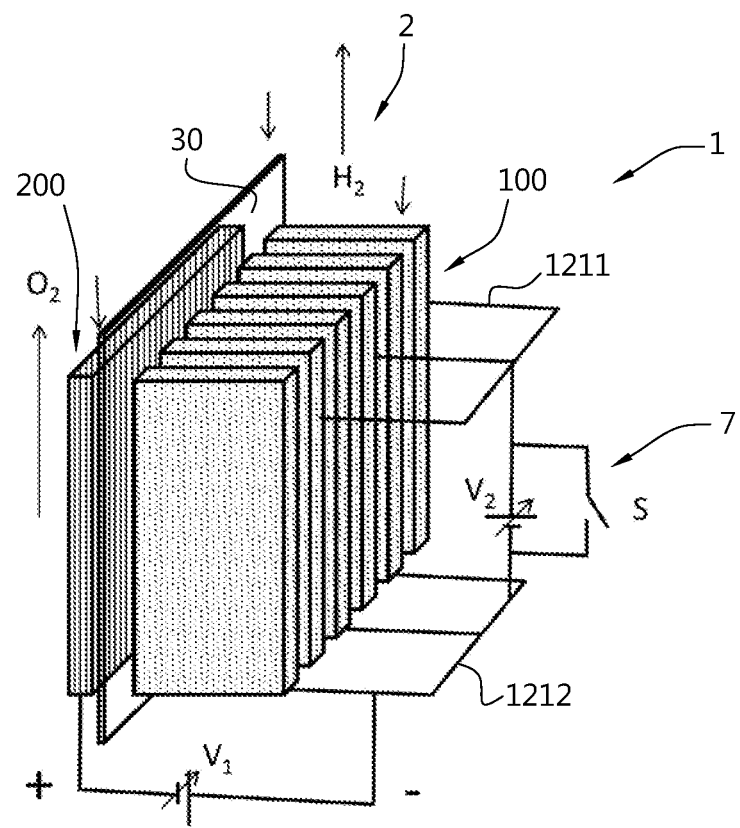

FIGS. 8a-8e schematically depict some embodiments. The dimensioning of the electrodes is indicative of a certain Ni electrode capacity and a larger capacity of the Fe electrodes. This is realised both by the higher specific capacity of Fe(OH)$_2$ compared to Ni(OH)$_2$, but also by the amount of electrode material per cell. FIG. 8a schematically depicts an embodiment of the energy apparatus 1. The energy apparatus 1 comprises one or more functional units 2. Here, a single functional unit 2 is schematically depicted. Each functional unit 2 comprises a first cell 100, comprising one or more first cell electrodes 120 and one or more first cell openings not depicted for a first cell aqueous liquid not depicted and for a first cell gas not depicted, a second cell 200, comprising one or more second cell electrodes 220 and one or more second cell openings 210 for a second cell aqueous liquid not depicted and for a second cell gas not depicted; and a separator 30, wherein the first cell 100 and the second cell 200 share the separator 30, wherein the separator is configured to block transport of one or more of $O_2$ and $H_2$ from one cell to another while having permeability for at least one or more of hydroxide ions (OH⁻) monovalent sodium (Na⁺), monovalent lithium (Li⁺) and monovalent potassium (K⁺).

The energy apparatus 1 comprises one or more of (a) at least two or more first cell electrodes 120 and (b) at least two or more second cell electrodes 220. Here, the apparatus comprises a single second cell electrode 220 and a plurality of first cell electrodes 120.

The energy apparatus 1 further comprises an electrical element 7 configured for applying one or more of (a) one or more potential differences between two or more first cell electrodes 120 and (b) one or more potential differences between two or more second cell electrodes 220. Here, the electrical element 7 is configured for applying a potential difference between two types of first cell electrodes 120 and run a current between them. Hence, the electrical element 7 is configured for applying a potential difference between a first subset 1211 of one or more first cell electrodes 120 and a second subset 1212 of one or more first cell electrodes 120. Note that not always this potential difference has to be applied. During a stage there may be applied such potential difference; however in other stages, such as when there is enough H2, no potential difference needs to be applied.

For instance, the first cell electrodes 120 of the first subset 1211 and the second subset 1212 comprise iron based electrodes.

FIG. 8b schematically depicts an embodiment wherein the subsets include different electrodes, such as different capacities due to a larger surface area or a thicker layer, or a different material. Hence, in FIG. 8b the first cell electrodes (120) of the first subset (1211) comprise iron based electrodes, and wherein the first cell electrodes (120) of the second subset (1212) comprise hydrogen gas generating electrodes (1210).

Hence, FIG. 8a schematically depicts a single functional unit with same-size Fe electrodes. The Fe electrodes have larger capacity than the Ni electrodes. The extra corresponds to the $H_2$ storage capacity because they can be discharged. FIG. 8b schematically depicts a single functional unit with large Fe electrodes and small H2 evolution electrodes (Fe or Pt). This is possible as well: just keep the small electrodes always for H2 evolution. The material of the small electrodes may also be Fe or a better $H_2$ catalyst.

FIG. 8c schematically depicts essentially the same embodiment as schematically depicted in FIG. 8a. When the switch S is closed: all Fe electrodes in the cell just behave as one big Fe electrode: all charged or discharged together. Cell potential between Ni and Fe may especially be in the range of ~1.6-1.8V for electrolysis. When the switch S is open and current is applied from the electrodes to one of the subsets to the electrodes of the other subset; when the Fe electrodes are charged (so containing Fe metal): at the relative more negative Fe electrodes: $H_2$ production; at the relative less negative ones: Fe oxidizes to Fe(OH)$_2$. We require about 0.2V between the charged Fe electrodes for that.

In FIGS. 8a-8c, the electrical element for applying one or more of (a) one or more potential differences between two or more first cell electrodes 120 and (b) one or more potential differences between two or more second cell electrodes 220 is indicated with reference 7. Note that the electrical element 7, or another electrical element may thus also be present to apply a voltage difference between the first cell electrode(s) and the second cell electrode(s). This voltage difference may be applied during a mode of operation. Hence, as indicated above, the term "electrical element" may also refer to a plurality of electrical elements and/or to an electrical element that is able to provide between different elements different potential differences.

Figure 8D:
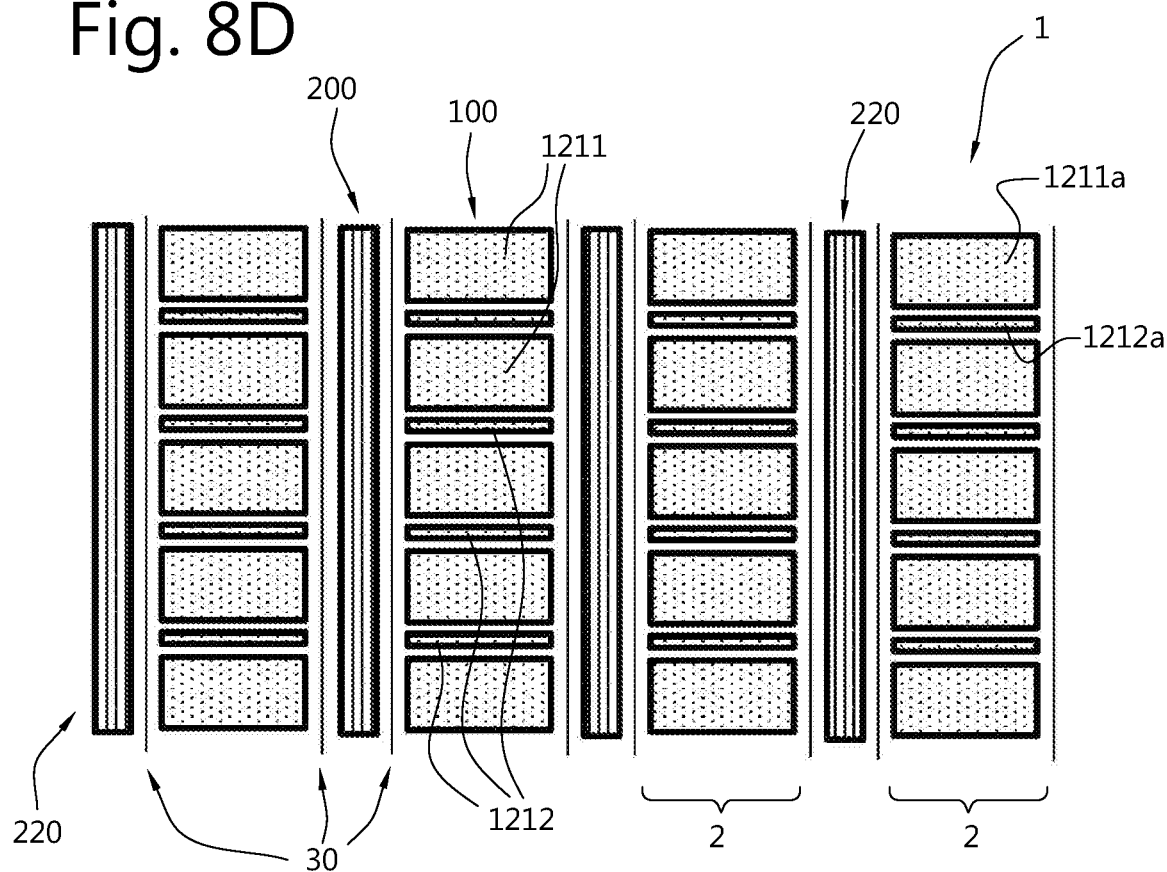

FIG. 8d schematically depict in top view some functional units configured parallel. Reference 1211a may e.g. indicate a Fe$_{OH}$ electrode, large capacity (sum of battery and extra H2 storage). These are all connected and at the same potential. Reference 1212a may e.g. indicate a Fen electrode, small capacity, or H2 evolution catalyst electrode only (e.g. Pt electrode). These are all connected and its potential can be different from the Fe$_{OH}$ electrode(s).

Figure 8E:
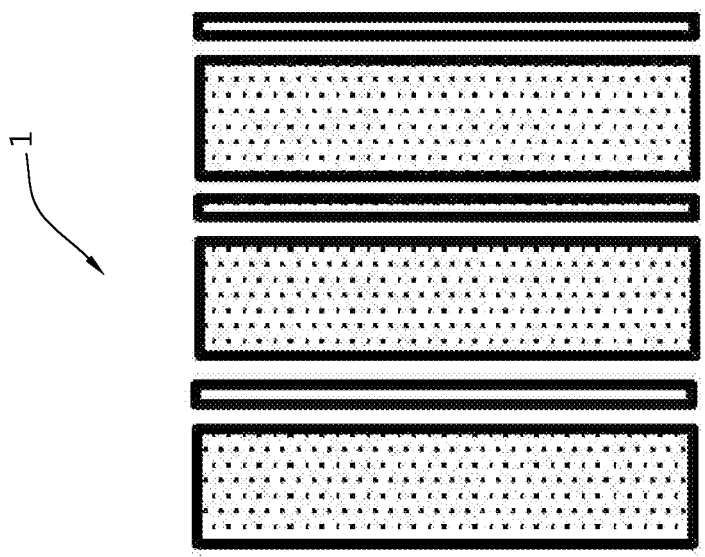
Figure 8E:
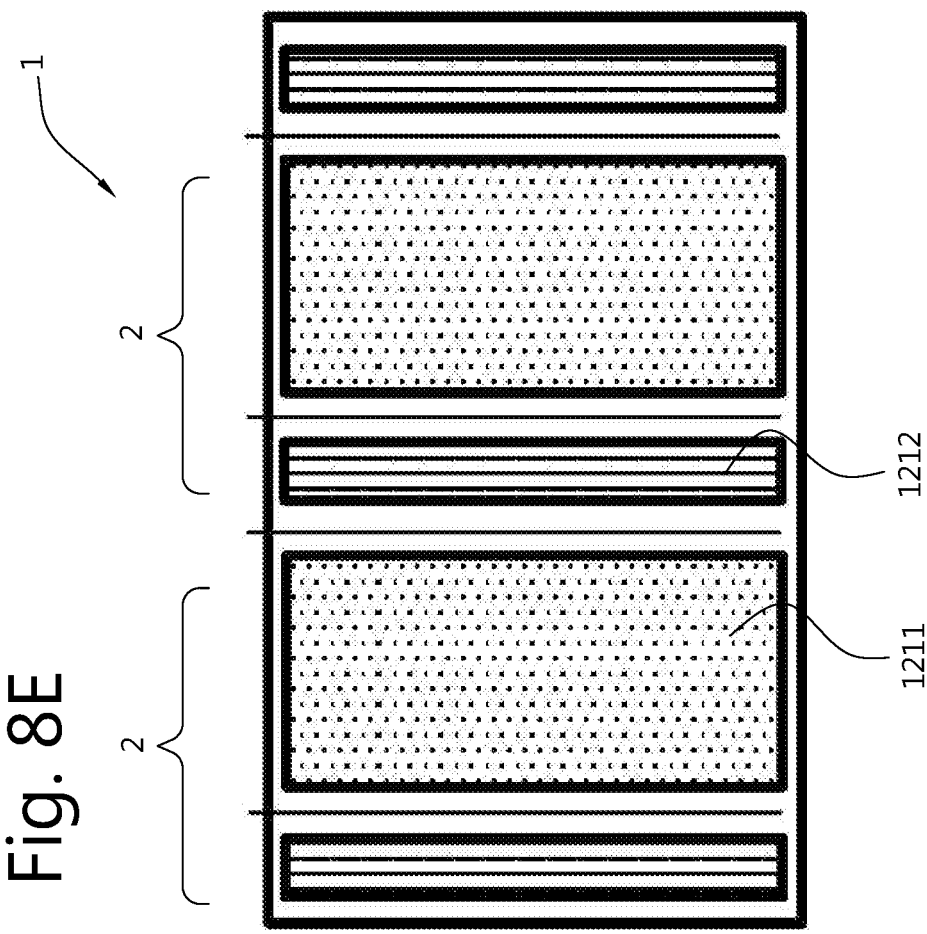

FIG. 8e schematically depicts in side views the same functional units as in 8d with Fe comprising electrodes and Ni comprising electrodes. On the left: view direction from bottom of FIG. 8d upwards, on the right: view from right to left in FIG. 8D.

Figure 9A:
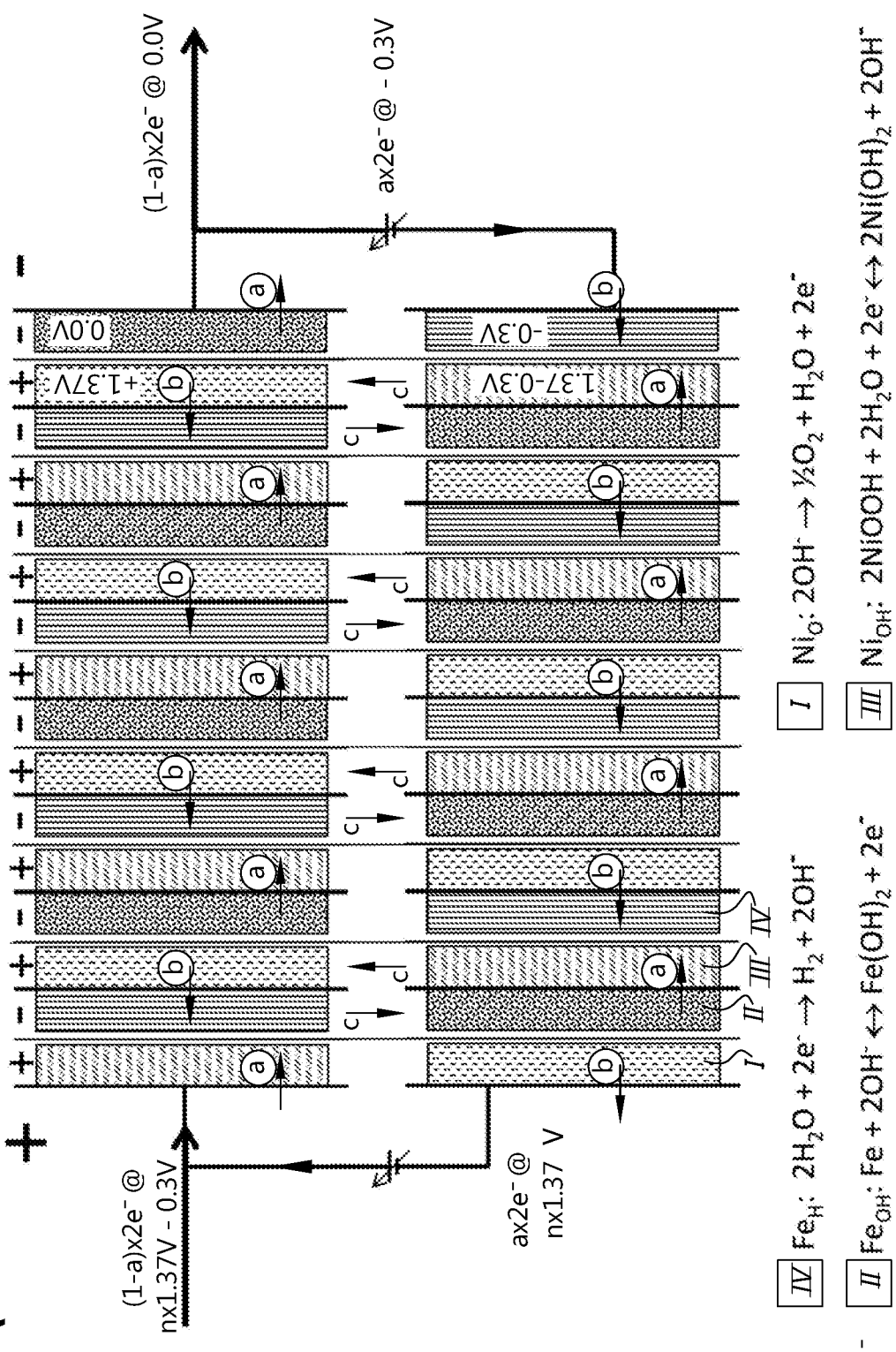

FIG. 9a schematically depicts the Schematics of discharge & $H_2$ plus $O_2$ generation with transport of electrons and ions in a bipolar plate configuration. It is further noted that the electrodes being at different potentials participate in different reactions. The first (indicated with $Fe_{OH}$) and second (indicated with $Fe_H$) subset of electrodes of the first electrode can be brought on potentials of respectively (0.0+ m×$V_{cell}$) and (0.0+m×$V_{cell}$)+(0.0 up to −0.3) V within the $m^{th}$ cell of the bipolar plate configured stack where m=0, 1, 2, ... n−1 for a certain stack with a total of n cells.

$V_{cell}$ is the voltage necessary to operate the individual cell in the stack, so above 1.37V for charging, and below 1.37V for discharging. In this stack the first (indicated with $Ni_{OH}$) and second (indicated with $Ni_O$) subset of electrodes of the second electrode can be brought to potentials of respectively (m+1)×$V_{cell}$ and (m+1)×$V_{cell}$+(0.0 up to 0.3) V within the $m^{th}$ cell of the bipolar plate configured stack where m=0, 1, 2, ... n−1 for a certain stack of n cells.

One can indicate the subsets as follows by their name, potential, and the reactions taking place:

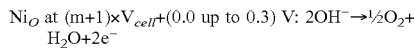

$Ni_O$ at (m+1)×$V_{cell}$+(0.0 up to 0.3) V: $2OH^-\rightarrow\frac{1}{2}O_2+H_2O+2e^-$

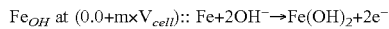

$Fe_{OH}$ at (0.0+m×$V_{cell}$):: $Fe+2OH^-\rightarrow Fe(OH)_2+2e^-$

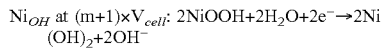

$Ni_{OH}$ at (m+1)×$V_{cell}$: $2NiOOH+2H_2O+2e^-\rightarrow 2Ni(OH)_2+2OH^-$

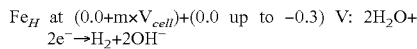

Figure 9C:
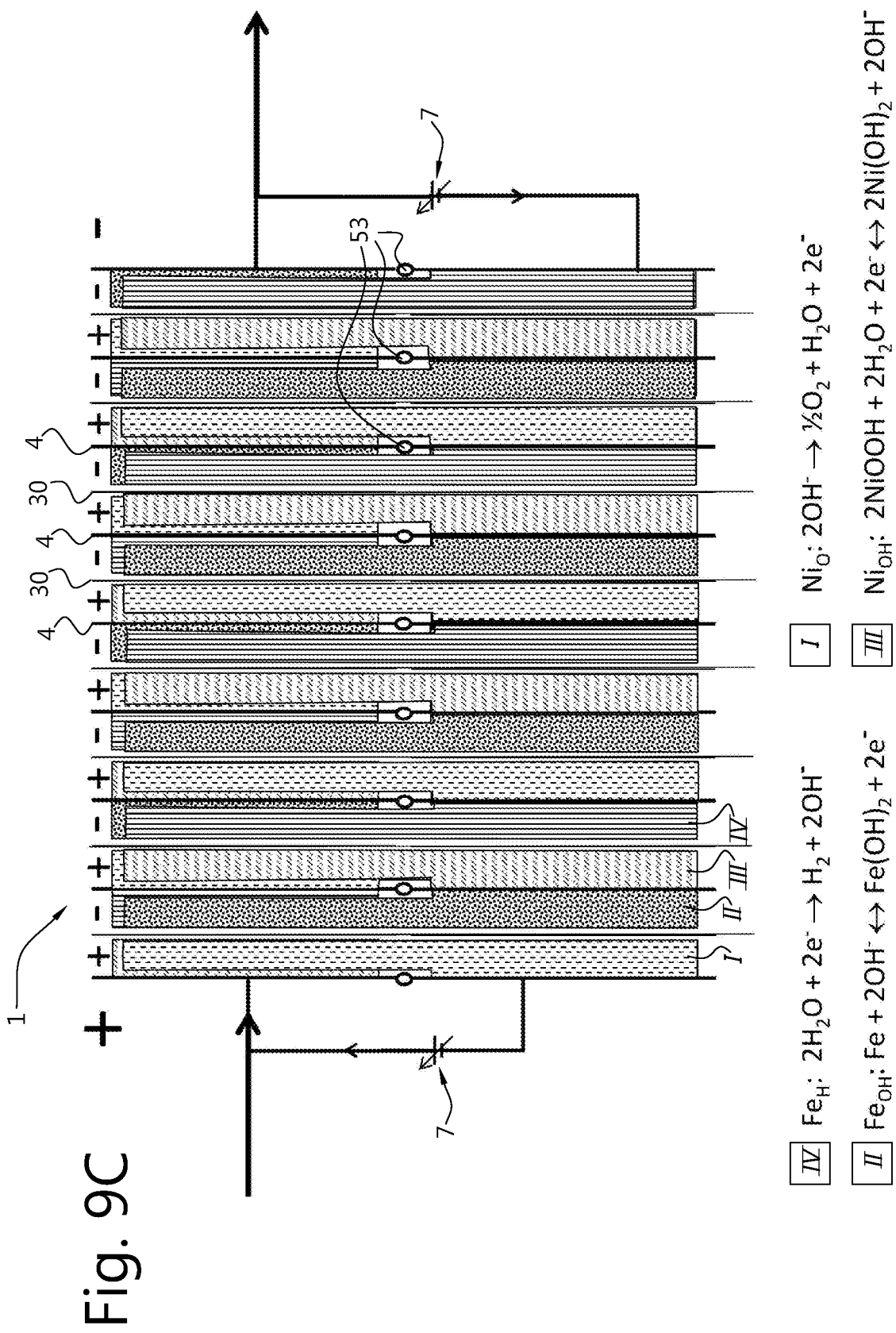

$Fe_H$ at (0.0+m×$V_{cell}$)+(0.0 up to −0.3) V: $2H_2O+2e^-\rightarrow H_2+2OH^-$ These subsets of electrodes are indicated in FIG. 9A for explanation purposes as separated in the vertical direction and electronically insulated from each other but connected externally by a voltage source. In the real device, however, the subsets of the electrodes are extending in each other's vicinity as indicated in FIG. 9C and FIG. 10B.

In a variant on FIG. 9a, the schematics of discharge & $H_2$ plus $O_2$ generation; transport of electrons and ions, could be provided, with the current (A) decoupled. The meaning of the indicated electrical currents is to show that on the cell level the charge flows in a certain way from subset of electrodes to subset of electrodes, and that the current that is transmitted through the bipolar plates between the cells is partly used for discharging and partly for hydrogen and oxygen generation. Then, "(1−a)×2e⁻ @ n×1.37V" will be replaced by "2e⁻ @ n×1.37V, and "(1−a)×2e⁻ @ 0.0V" will be replaced by "2e⁻ @ 0.0V", see FIG. 9b. FIG. 9c schematically depicts the apparatus 1 with bipolar plates 4 in more detail. In FIG. 9a and further, the roman indications I, II, III, and IV are used to further indicate the different hatchings in order to increase understandability.

Figure 9D:
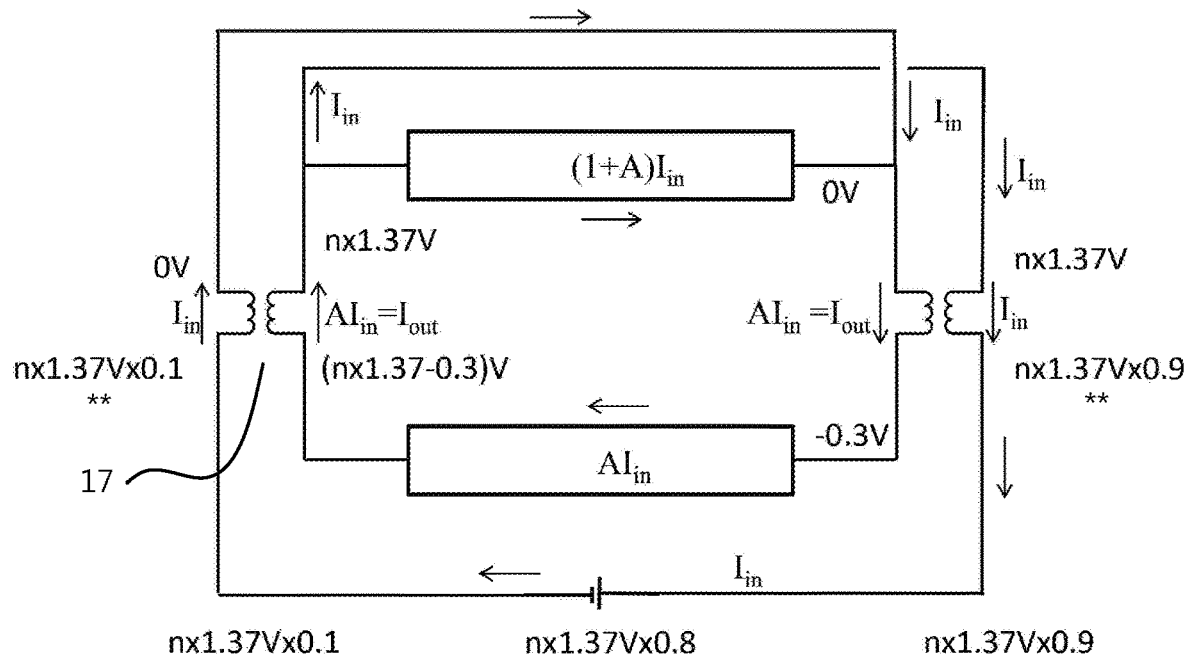

FIG. 9d schematically depicts the Schematics of discharge & $H_2$ plus $O_2$ generation; transport of electrons and ions; current A×I produced using DC-DC transformers (or converters), indicated with reference 17, that are driven by discharge current I. It is noted that:

DC-DC Transformers: $V_{in}\times I_{in}=V_{out}I_{out}$ (when ignoring losses) so $0.1n\times 1.37\times I=0.3\times AI_{in}$; Current for discharge of battery: $I_{in}$; Current for H2 production: $A\times I_{in}$; and System Voltage output: e.g. 1.37V×n×0.8; Discharge power usable as electricity: $P=n\times 1.37\times 0.8\times I in$; Used for $H_2$ generation to overcome overpotentials: $n\times 1.37\times 0.2\times I_{in}$; The value of 0.2 is chosen because 0.3V/1.37V~0.2 about right ratio between measured overpotential and battery cell potential. Further, the reference ** refers to the fact that $V_{in}$ is adjustable.

FIG. 10a schematically depicts in a top view multiple functional units with bipolar configuration. Now the Ni electrode is also in separate parts, connected electrically to the back of the separate Fe parts. A similar electrical connection is required driving H2 and O2 release. (The $Fe_H$ and $Ni_O$ electrodes can be much thinner i.e. have less capacity than the $Fe_{OH}$ and $Ni_{OH}$ when they contain better catalysts).

FIG. 10b schematically depicts in a Side view multiple cells with bipolar configuration. The electrode parts are a kind of lamellae that make electrical contact to either the top or the bottom of the bipolar plate. The bipolar plate is split in the middle with an insulator. In that way the Fe and the Ni parts can all be in a bipolar configuration and still also the Ni and Fe electrode can be divided in two electrically separated parts ($Fe_H$, $Fe_{OH}$ and $Ni_O$, $Ni_{OH}$). The electrolyte is in between the lamellae and transports $OH^-$ between the electrodes in the cells.

FIG. 10c schematically depicts in a perspective view an embodiment of the apparatus 1, with the bipolar plate sections with insulation 53 in between (e.g. EPDM (ethylene propylene diene monomer) rubber, Teflon, PP, or another KOH electrolyte resistant and airtight polymer that is electronically insulating). the top part is connected to $Fe_{OH}$ electrodes; the bottom part is connected to the Fen electrodes.

Figure 11A:
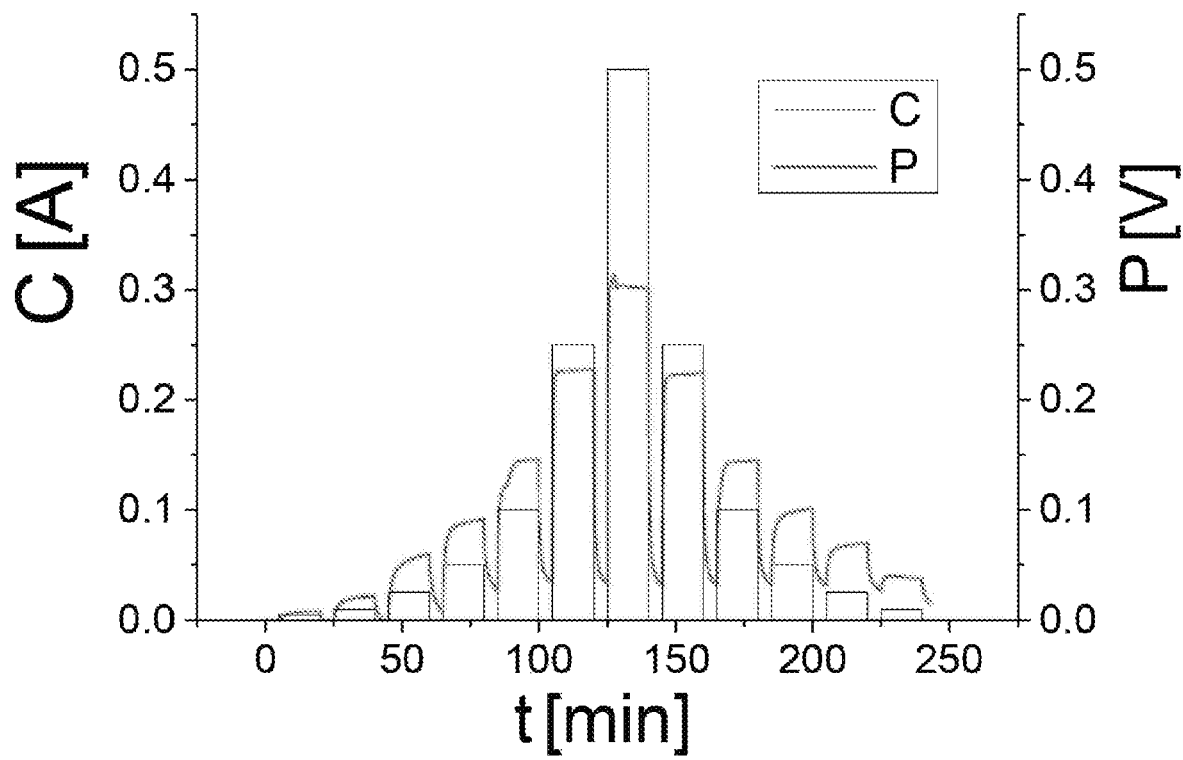
Figure 11B:
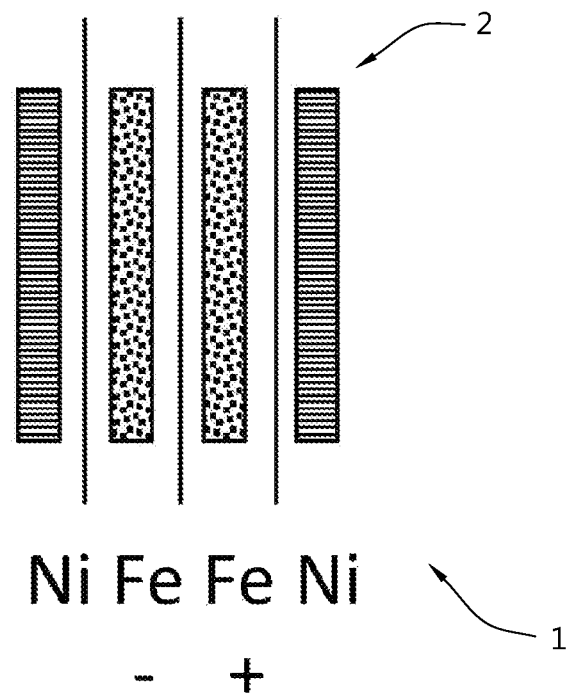
Figure 11C:
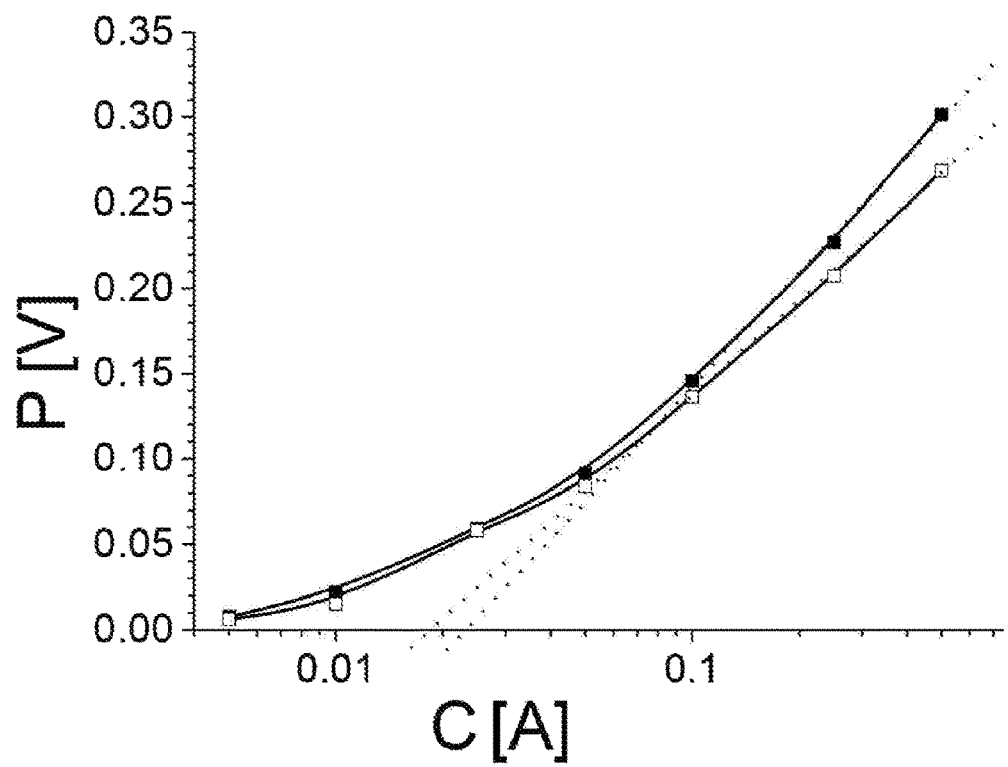
Figure 11D:
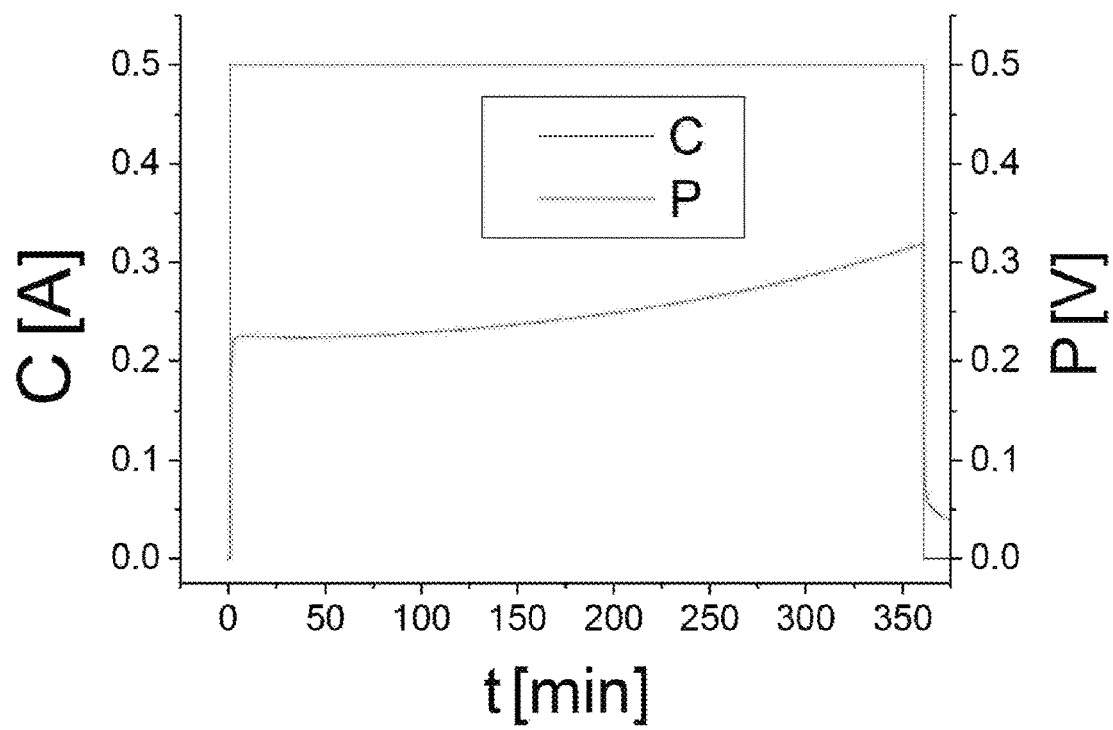

FIG. 11a, c-d show the results of measurements with a functional unit consisting of two Ni and two Fe electrodes. The Ni and Fe electrodes were first fully charged. Then wiring was switched and a current was applied from the one Fe to the other, with current values as indicated in the FIG. 11a. The voltage occurring between one Fe (+) and other Fe (−) is recorded. $H_2$ evolution takes place on the negative electrode (indicated by $Fe_H$) following the reaction $2H_2O+2e^-\rightarrow H_2+2OH^-$, while . at the positive electrode (indicated by $Fe_{OH}$) the normal discharge reaction takes place: $Fe+2OH^-\rightarrow Fe(OH)_2+2e^-$. Electrode surface area: 35.1 cm² effectively, so 0.5 A=500 mA corresponds to 500/35.1=14.25 mA/cm². The line in FIG. 11c indicates that a factor of 10 higher current increases the potential by about 0.22V in this test cell. Open symbols display data corrected for the Ohmic resistance of some internal wiring. In this way we look at the real potential between the electrodes. (The internal wiring is thin in the experiment in the real device it should be thick or in a bipolar plate configuration with very low resistance). The line in the right figure indicates that a factor of 10 higher current increases the potential by about 0.22V for the uncorrected data (filled symbols) and with 0.185V for the corrected data (open symbols). FIG. 11d shows voltages (reference P; at 0.5 A applied current, measured in V) that are measured, but now for longer times, evolving $H_2$ at the negative electrode longer. FIG. 11b schematically depicts the configuration of the electrodes used for this example apparatus with the functional unit 2. Only the position of the Ni and Fe electrodes are shown. The current in FIG. 11A is running between the positive Fe electrode to the negative one, while the Ni electrodes that were used during charging both Fe electrodes are then at rest.

FIGS. 12a-12 schematically depict a comparison of a "standard" battolyser (12a) and the battolyser as further (also) described herein (FIG. 12b). In the latter variant, $H_2$ generation and discharging can be coupled.

FIG. 13 schematically depicts an embodiment of an electrode. In embodiments, the electrode(s) may have an electrode morphology with channels inside for gas export through electrode. Electrolyte insertion may happen through narrow pores perpendicular to electrode surface. This may apply to the first electrodes and/or second electrodes.

In an example, as second electrodes Ni is applied, and as first electrodes a Fe comprising electrode with a relatively thick layer (large capacity) and a Fe comprising electrode with a relatively thin layer (smaller capacity) is applied. In this way a monopolar cell may be provided with an additional H2 functionality (with the thin Fe comprising electrode). In a further example, a plurality of such monopolar cells may be configured parallel. The difference in layer thickness may be at least a factor 2.

In an example, the first electrode or second electrode comprise an electrode material, and additionally a catalyst. For instance, an iron comprising electrode may further comprise a catalyst. The catalyst may be available as nano particles. The nano particles may be embedded in an electrically conductive matrix (especially electrode material). Alternatively or additionally, the catalyst can be applied as coating to the electrode material. Suitable catalysts may be selected from platinum, NiMo, NiFe, FeMo, NiCoFe, a $LaNi_5$ type compound indicated with $MmNi_{5-x-y}Co_xAl_y$, where Mm stands for a mix of lanthanides, tungsten sulfide ($WS_x$) or selenide ($WSe_x$), and molybdenum sulfide ($MoS_x$).

In an example, a first cell has Fe (negative) electrodes and a second cell has one or more Ni (positive) electrodes. Ni may be a relative expensive component and may determine the battery capacity. Fe is relatively inexpensive and can therefore possibly be dimensioned to have greater capacity. Hence, a larger capacity and area Fe comprising electrode can be reduced. Later, against another (small) Fe comprising electrode the larger electrode can be discharged and $H_2$ is produced. When discharging, one or more of the Fe comprising electrodes can be discharged to provide $H_2$ and meanwhile one or more other Fe comprising electrodes can also be discharged against the Ni in order to supply power. In the case where the Fe electrode used for discharging ($Fe_{OH}$) are much larger in capacity than the Ni electrodes, e.g. 2-5 or 5-20 or even up to 100 times larger in capacity the possibility is opened to store energy in the form of reduced Fe in the large capacity Few electrodes and $H_2O$, that can release hydrogen when demanded. Such configuration may additionally be designed to enable the removal of the electrolyte, replacing it with inert gas such as nitrogen or argon. That will be relevant to limit the spontaneous self discharge of the electrodes following the reaction $Fe+2H_2O \rightarrow Fe(OH)_2+H_2$. When hydrogen is subsequently required the electrolyte is re-entered in the cells and the $Fe_{OH}$ can be discharged against the $Fe_H$ electrodes to generate $H_2$. In this way also longer duration storage of energy becomes possible, e.g. with durations up to 100 days. Alternatively the very large capacity electrodes can also be kept under electrolyte and the large battolyser cells can be used for generating $H_2$ more slowly as a result of this self discharge. The self-discharge can be promoted also by administering available (waste) heat to the cell. Depending on the requirements for electricity storage and conversion to hydrogen, also different battolysers can be arranged together to provide the electricity storage and supply and hydrogen and oxygen generation.

In FIG. 14 one example of 6 different battolysers in an electrical circuit (numbers 1 to 6) is given. Numbers 1 and 2 can here have a different number n of cells in its bipolar plate stack and thus a different input and output potential than that of the numbers 3-6. Here for instance 1 and 2 can be charged and discharged independently from a voltage source as indicated, and so can 3-6. The wiring of the electrical circuit is such that the indicated DC-DC converter, indicated with reference 17, can be powered by the output of numbers 3-6. In this way a system can be configured that has large charge and hydrogen generation capacity of 1 to 6 together, but that can also keep producing $H_2$ and $O_2$ in numbers 1 and 2 from the stored electricity in numbers 3-6. Such operation can be important for e.g. solar powered factories that also need hydrogen and power at night. There are many of such configurations possible with battolysers and also with battolysers that are internally configured to have hydrogen generating electrodes. The reference n1 indicates that the left circuit includes n1 battolysers, here 2, and n2 indicates that the right circuit includes n2 battolysers, here 4. An advantage of this system is the flexibility and the fact that electronics is simple. The ratio of the electrodes, such as the ratio of Fe/Ni electrodes is fixed. The battolysers used in this system may be apparatus such as schematically depicted in FIGS. 1a-1b (and 1c and 1d).

FIG. 15 schematically depicts a system wherein e.g. also less Nickel may be present. FIG. 15 schematically shows a bipolar plate configuration wherein the Fen electrodes can be driven independently to produce higher $H_2$ or not, during both charge and discharge. This option is based on a similar principle as schematically depicted in FIG. 12B within each cell that is configured in series. The electrodes are having similar shape and connection to the top and bottom parts of the bipolar plates as in FIGS. 10A-,B and C. The entire stack is configured in a bipolar plate configuration but the Fe electrodes are separated in $Fe_{OH}$ and $Fe_H$ electrode sections. During discharge a part of the discharge current can be supplied to the series of DC-DC converters that are separately connected to each separate cell and drive a current between the $Fe_{OH}$ and $Fe_H$ at a potential difference between these electrodes of up to 0.3V. In this way $H_2$ will be generated at the $Fe_H$ electrodes while also the whole stack is being discharged and delivers electricity to power another application (with the potential indicated by the voltage $nV_{cell}$). The capacity of the $Fe_{OH}$ electrodes is larger than the capacity of the $Fe_H$ and the $Ni_{OH}$ electrodes in order to be able to generate more $H_2$ while also discharging. When the capacity $Fe_{OH}$ is up to ~7 times (as 7=1+(1.2V/0.2V)) larger than the $Ni_{OH}$ capacity the full battery capacity can be discharged while converting the current to hydrogen. When also current from an external source is used to supply a potential of $nV_{cell}$, it is also possible to have larger capacities of the $Fe_{OH}$ electrodes (more than 7 times the $Ni_{OH}$ capacity, up to 50 times) in order to generate more $H_2$.

The electrodes in the series of FIG. 15, but optionally also of other embodiments described herein, may be electrically floating.

Renewable energy systems have the potential to replace fossil fuels, but inherently confront us with the major challenge of storage. Fossil fuels, such as gas, oil, or coal are easy to store, and make for very easy energy production. Renewable energy, on the other hand, is only available when the wind is blowing or the sun is shining while private consumption follows characteristic diurnal and seasonal fluctuations. In a renewable energy future, similar quantities of electricity storage, in batteries and in the production of hydrogen fuels, may be required on an annual basis, to allow adequate short-term and long-term energy storage. Batteries are characterized by a high conversion efficiency, stored electricity comes back as electricity, which makes them appropriate for short-term energy storage. Producing hydrogen is considered to be the best opportunity for long-term energy storage. Hydrogen can be stored directly or it can be synthesized to produce synthetic fuels. Furthermore, hydrogen production enables 'greening' of chemical processes and production of effectively carbon neutral fuels since hydrogen acts as a feedstock for subsequent processes, like the Sabatier $CH_4$ from $H_2$ and $CO_2$), Fischer-Tropsch (alkanes from $CO/CO_2$ and $H_2$), and the Haber-Bosch process ($NH_3$ from $N_2$ to $H_2$).

Nickel-Iron batteries were invented by Edison and Jungner and are known for their extreme durability. Conventional nickel-iron batteries suffer from low energy efficiency, unwanted hydrogen is produced and charge is lost. Therefore we assembled and designed the battolyzer, a combined battery and electrolyzer. Hydrogen is now a product, and no charge is lost which makes the Nickel-Iron system energy efficient. However, the hydrogen production follows the renewable intermittency while industry favors continuous operation. Moreover, storage facilities are required to buffer fluctuations. The new configuration of the battolyser allows for controlled hydrogen production and hydrogen storage, features necessary for continuous industrial operation and long-term energy storage. The new configuration of the battolyzer is depicted in FIG. 16c.

The new battolyser configuration consist of a positive "Nickel" electrode and two negative "Iron" electrodes, one for storage and one for hydrogen production. The Nickel electrode utilizes the nickel-hydroxide ($Ni(OH)_2$)/nickel-oxyhydroxide (NiOOH) couple and the Iron "storage" electrodes the iron-hydroxide ($Fe(OH)_2$)/iron (Fe) couple. Only one "Iron-storage" electrode participates in the battery operation while the "Additional iron-electrode" is hold under anodic potential controlling the hydrogen production rate. Iron is thus the active hydrogen evolution reaction (HER) catalyst. Applying an iron-electrode for the HER is no necessity, other more efficient HER catalysts could serve for this purpose which could increase the efficiency.

The overall reaction for battery operation is given by:

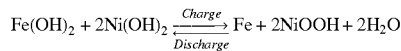

In the discharged state one iron atom stores two hydroxyl ions (OH−) and one Nickel atom stores a proton. Upon charge water is released and the catalysts for the HER (Fe) and the oxygen evolution reaction (OER, NiOOH) are formed. The positive electrode is usually the limiting electrode and stoichiometry defines the ratio for Nickel to Iron as two for Nickel-Iron batteries. Certainly Iron is more abundant and lower-priced than Nickel. Supersizing the capacity of the iron electrode causes that upon charge insertion NiOOH is formed, going alone with oxygen evolution when the storage capacity for the Nickel electrode is reached, while at the iron electrode Fe(OH)2 is still reduced to iron (Fe). The following reaction takes place:

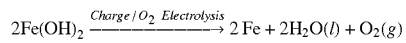

Adding a third electrode for hydrogen production to the system allows for controlled hydrogen production. While hydrogen is produced at this electrode the "supersized" iron storage electrode is discharged:

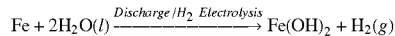

Hydrogen evolution and oxygen evolution are uncoupled, hydrogen is stored in the "supersized" iron electrode together with water from the electrolyte. Furthermore hydrogen can be produced, even when discharging the battery. Hence, the "supersized" iron electrode provides for electricity and hydrogen storage. An equivalent setup with a "supersized" Nickel-electrode and additional oxygen evolution electrode is feasible to control oxygen production.

The battolyser setup allows for electrical energy storage and for electrolysis. The new setup with this specific configuration consisting of the storage and the electrolysis electrodes at the hydrogen site enables controlled hydrogen production and hydrogen storage. The storage electrode will always produce a certain amount of hydrogen upon charge insertions. The fraction of electrons contributing to hydrogen production increases with increasing the state of charge of the electrode and charge rate. No hydrogen will be released upon discharge.

Hence, referring to the battery system wherein a battery can be charged (see FIG. 16a) or electrolysis can take place (FIG. 16b), a third electrode is added to the existing setup. This electrode is connected to the "storage electrode", such as an "iron storage" electrode. The new electrode and the storage electrode may be located next to each other and submitted in the electrolyte. The external circuit enables, that the iron storage electrode is discharged and hydrogen is produced at the electrolysis electrode. By doing so, it is possible to store hydrogen in the system. The following reaction take place: Iron storage electrode (discharging): (Fe+2OH−)→Fe(OH)$_2$+2e−; electrolysis electrode (charging): 2H$_2$O+2e−→H$_2$+2OH−; overall: Fe+2H$_2$O→Fe(OH)$_2$+H$_2$; Hence, in embodiments the iron storage electrode is not only used as "battery electrode" but also as electrode for hydrogen storage. Overall the system is balanced. This means that water is split. O$_2$ evolves immediately when the nickel electrode is fully charged. However in this moment in time charging still continuous at the iron storage electrode, the hydrogen is released when needed. Overall stoichiometric water splitting takes place. (2H$_2$O→2H$_2$+O$_2$).

Therefore, whereas in a normal electrolyser these gasses are produced when charge is running through the system, in the presently proposed configuration(s), first the battery electrodes may be charged. When the electrodes are fully charged, oxygen and hydrogen evolve. The third electrode allows that the iron electrode can be "supersized" with respect to the nickel electrode. The third electrode enables to use this extra capacity to store hydrogen in the supersized iron electrode and to release it when wanted in the electrolysis electrode. Without the third electrode supersizing would not be (very) useful, because the stored hydrogen cannot be retrieved. Without third electrode only electricity can be retrieved and the capacity is limited to the lower capacity of the existing electrodes. Only the electrolysis electrode allows for utilisation of the stored hydrogen in the supersized electrode. The total concept makes for easy storage and production of hydrogen. So far the setup is tested with an iron electrode as electrolysis electrode. But this electrode can be exchange with another more efficient electrode for hydrogen evolution to increase the overall efficiency.

Figure 16A:
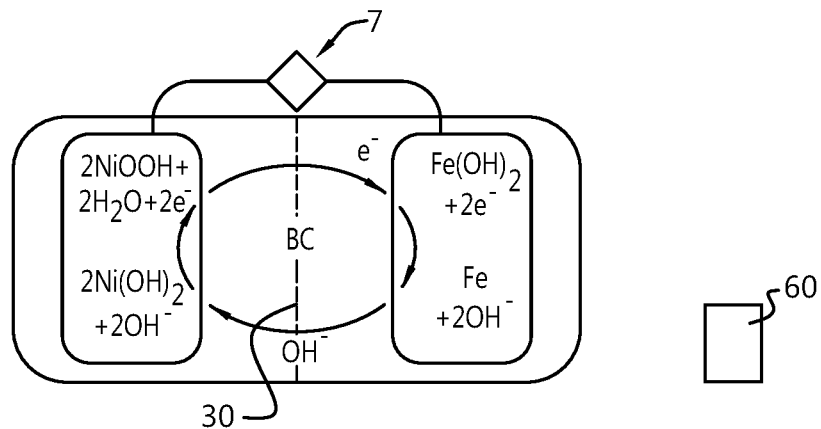
Figure 16B:
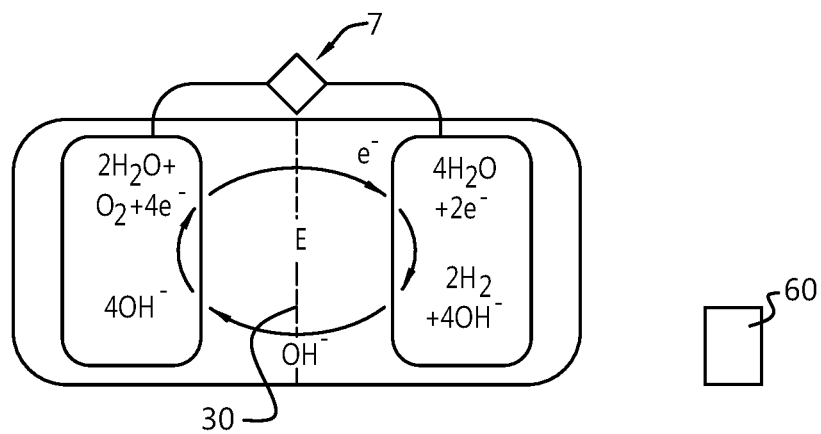
Figure 16C:
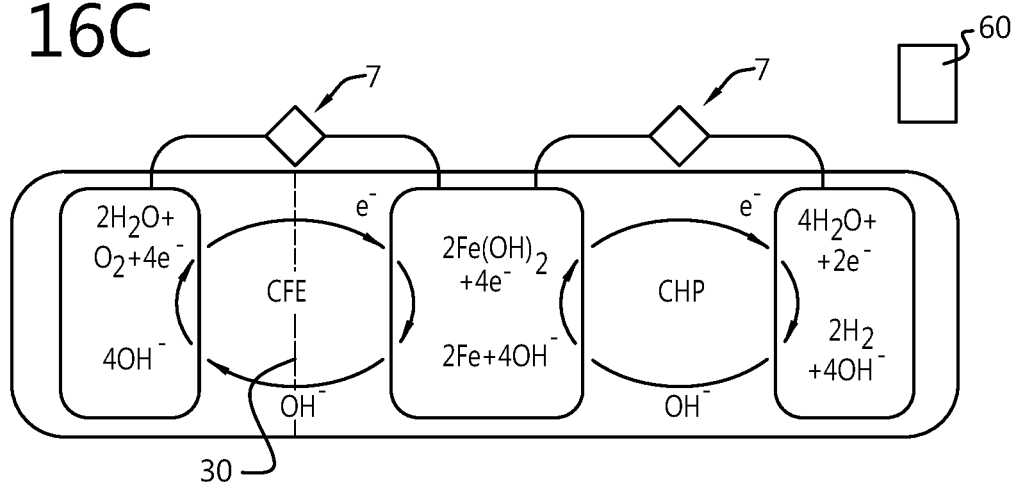

In FIG. 16a, reference BC indicates battery charging; reference E in FIG. 16b indicates electrolysis. By way of example, in FIGS. 16a-16b, the left electrode may a nickel based electrode; the right electrode may be an iron based electrode. This iron based electrode may be supersized, i.e. this electrode may have a much larger surface area than the nickel electrode. In FIG. 16c, the additional electrode ("further electrode" or "third electrode") on the right, where $H_2$ is formed, may also be an iron based electrode.

Hence, the invention may bridge intermittent renewable electricity generation and efficient energy storage.

Note that the (−|+) voltage signs herein are only displayed to indicate the presence of an electrical element that may impose a voltage difference, irrespective of the sign of such voltage difference. An arrow through such sign stresses the possibility that such electrical element may impose different voltage differences (such as a variable voltage difference) (irrespective of the sign of such difference).

The term "substantially" herein, such as in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. An energy apparatus having battery functionality and hydrogen and oxygen generation funtionality, the energy apparatus comprising one or more functional units, each functional unit comprising:
   a first cell comprising one or more first cell openings for a first cell aqueous liquid and for a first cell gas;
   a second cell comprising one or more second cell openings for a second cell aqueous liquid and for a second cell gas; and
   a separator, wherein the first cell and the second cell share the separator, wherein the separator is configured to block transport of one or more of $O_2$ and $H_2$ from one cell to another while having permeability for at least one or more of hydroxide ions ($OH^-$) monovalent sodium ($Na^+$), monovalent lithium ($Li^+$), and monovalent potassium ($K^+$);
   wherein the energy apparatus further comprises an electrical element, wherein
   (i) the first cell comprises two or more first cell electrodes, the second cell comprises a second cell electrode, and the electrical element is configured for applying one or more potential differences between the two or more first cell electrodes; or
   (ii) the first cell comprises a first cell electrode, the second cell comprises two or more second cell electrodes, and the electrical element is configured for applying one or more potential differences between the two or more second cell electrodes; or
   (iii) the first cell comprises the two or more first cell electrodes, the second cell comprises the two or more second cell electrodes, and the electrical element is configured for applying one or more of (a) one or more potential differences between two or more first cell electrodes and (b) one or more potential differences between two or more second cell electrodes,
   wherein first cell electrodes of a first subset comprise iron-based electrodes, and
   wherein the one or more second cell electrodes comprise nickel-based electrodes.

2. The energy apparatus according to claim 1, wherein at least one of the functional units comprises two or more first cell electrodes, and wherein said electrical element is configured for applying a potential difference between the first subset of the two or more first cell electrodes and a second subset of the two or more first cell electrodes.

3. The energy apparatus according to claim 2, wherein the first cell electrodes of the second subset comprise iron-based electrodes.

4. The energy apparatus according to claim 2, wherein the first cell electrodes of the second subset comprise hydrogen gas generating electrodes.

5. The energy apparatus according to claim 1, wherein the one or more functional units comprise a functional unit that comprises two or more first cell electrodes and one or more second cell electrodes.

6. The energy apparatus according to claim 1, wherein the one or more functional units comprise at least two functional units, wherein a first electrode of a first functional unit and a second electrode of a second functional unit are separated from each other by a bipolar plate, and wherein the bipolar plate is electrically conductive.

7. The energy apparatus according to claim 6, wherein the bipolar plate comprises at least two bipolar plate sections that are configured electrically separated from each other, wherein one or more first cell electrodes are associated with a first bipolar plate section, wherein one or more first cell electrodes are associated with a second bipolar plate section, wherein one or more second cell electrodes are associated with said first bipolar plate section, and wherein one or more second cell electrodes are associated with said second bipolar plate section.

8. The energy apparatus according to claim 1, comprising the first cell, the second cell, and a further cell, comprising either a further first electrode, to provide the two or more first cell electrodes, or a further second electrode, to provide the two or more second cell electrodes.

9. The energy apparatus according to claim 1, wherein said electrical element comprises a variable voltage supply.

10. The energy apparatus according to claim 9, further comprising a source of energy configured to generate a voltage difference and/or a different current between (a) the second electrode and the first electrodes of the first subset and (b) the second electrode and the first electrodes of the second subset in the second setting.

11. The energy apparatus according to claim 1, wherein at least one functional unit comprises:
- a first cell comprising a plurality of first cell electrodes and one or more first cell openings for said first cell aqueous liquid and for said first cell gas, wherein the plurality of first electrodes comprise iron-based electrodes, wherein the plurality of first cell electrodes comprise a first subset of the first cell electrodes and a second subset of the first cell electrodes;
- a second cell comprising said second cell electrode and one or more second cell openings for said second cell aqueous liquid and for said second cell gas, wherein the second electrode comprises a nickel-based electrode;
- said separator, wherein the first cell and the second cell share the separator, wherein the separator is configured to block transport of one or more of $O_2$ and $H_2$ from one cell to another while having permeability for at least one or more of hydroxide ions ($OH^-$) monovalent sodium ($Na^+$), monovalent lithium ($Li^+$) and monovalent potassium ($K^+$);
- a first electrical connection in electrical connection with a first subset of the first cell electrodes, a second electrical connection in electrical connection with a second subset of the first cell electrodes, and a third electrical connection in electrical connection with the second cell electrode; and
- a connector element, comprising said electrical element, switchable in a first setting wherein the first electrodes of the first subset and the first electrodes of the second subset are short circuited, and a second setting wherein different voltage differences can exist and/or different electrical currents can flow between (a) the second electrode and the first electrodes of the first subset and (b) the second electrode and the first electrodes of the second subset.

12. The energy apparatus according to claim 1, wherein the second electrode has a second electrode capacity ($Ah2$), and wherein the plurality of first electrodes has an integrated first subset electrode capacity ($Ah11$) of all first electrodes within the first subset and an integrated second subset electrode capacity ($Ah12$) of all first electrodes within the second subset, wherein $Ah11/Ah2 \geq 2$, wherein $Ah11/Ah12 \geq 1$, and $Ah11+Ah12 \geq Ah2$.

13. The energy apparatus according to claim 1, further comprising a first electrical connection in electrical connection with the first cell electrode, and a second electrical connection in electrical connection with the second cell electrode.

14. The energy apparatus according to claim 1, further comprising an aqueous liquid control system configured to control introduction of one or more of the first cell aqueous liquid and the second cell aqueous liquid into the functional unit, wherein the first cell aqueous liquid and the second cell aqueous liquid comprise at least 3 mol/l OH.

15. The energy apparatus according to claim 14, further comprising a pressure system configured to control one or more of (a) the pressure of the first cell gas in the functional unit, (b) the pressure of the first cell gas in the storage system, (c) the pressure of the second cell gas in the functional unit, and (d) the pressure of the second cell gas in the storage system.

16. The energy apparatus according to claim 1, further comprising a storage system configured to store one or more of the first cell gas and the second cell gas external from said functional unit.

17. The energy apparatus according to claim 1, further comprising
- a first electrical connection in electrical connection with the first cell electrode and a second electrical connection in electrical connection with the second cell electrode;
- an aqueous liquid control system configured to control introduction of one or more of the first cell aqueous liquid and the second cell aqueous liquid into the functional unit;
- a storage system configured to store one or more of the first cell gas and the second cell gas external from said functional unit;
- a pressure system configured to control one or more of (a) the pressure of the first cell gas in the functional unit, (b) the pressure of the first cell gas in the storage system, (c) the pressure of the second cell gas in the functional unit, and (d) the pressure of the second cell gas in the storage system;
- a charge control unit configured to receive electrical power from an external electrical power source and configured to provide said electrical power to said functional unit during at least part of a charging time at a potential difference between the first cell electrode and the second cell electrode selected from the range of 1.37-2.0 V;
- a first connector unit for functionally coupling to a receiver to be electrically powered and the electrical connection, and a second connector unit for functionally connecting a device to be provided with one or more of the first cell gas and the second cell gas with said storage system; and a control system configured to control the aqueous liquid control system, the storage system, the pressure system, and the charge control unit.

18. The energy apparatus according to claim 1, wherein the first electrode has a first capacity and wherein the second electrode has a second capacity, wherein the second capacity is less than 90% of the first capacity.

19. An energy system comprising the energy apparatus according to claim 1 and an external power source.

20. A method of storing electrical energy and one or more of hydrogen ($H_2$) and oxygen ($O_2$) with the energy apparatus according to claim 1, the method comprising: providing the first cell aqueous liquid, the second cell aqueous liquid, and electrical power from an external power source to the functional unit thereby providing an electrically charged functional unit and one or more of hydrogen ($H_2$) and oxygen ($O_2$) stored in said storage system, wherein during at least part of a charging time the functional unit is charged at a potential difference between the first cell electrode and the second cell electrode of more than 1.37 V.

21. The method according to claim 20, wherein during at least part of a charging time a potential difference between the first cell electrode and the second cell electrode is selected from the range of 1.6-2.0 V, said method further comprising maintaining a first pressure in the first cell and a second pressure in the second cell at a pressure of at least 30 bar.

22. The method according to claim 20, further comprising simultaneously discharging the energy apparatus and generating hydrogen ($H_2$) by applying one or more of (a) one or more potential differences between two or more first cell electrodes and (b) one or more potential differences between two or more second cell electrodes.

23. The method according to claim 22, further comprising applying a potential difference selected from the range of 0.001-0.5 V between at least two first cell electrodes in a first cell.

24. The method according to claim 20, further comprising applying a potential difference between a first subset of one or more first cell electrodes and a second subset of one or more first cell electrodes, wherein said potential difference is selected from the range of 0.001-0.5 V.

25. The method according to claim 20, further comprising providing one or more of electrical power, hydrogen ($H_2$), and oxygen ($O_2$) to a receiver.

26. The method according to claim 25, further comprising providing one or more of electrical power, hydrogen ($H_2$), and oxygen to (i) a motorized vehicle comprising an engine deriving its propulsion energy from one or more of a hydrogen source and an electrical power source, or (ii) a device comprised by an industrial object that is configured to utilize one or more of electrical power, hydrogen and oxygen.

27. The method according to claim 25, further comprising simultaneously generating hydrogen ($H_2$) and providing or storing electrical energy.

* * * * *